United States Patent
Yamamoto et al.

(10) Patent No.: US 8,032,574 B2
(45) Date of Patent: Oct. 4, 2011

(54) PROBABILITY GENERATING APPARATUS

(75) Inventors: Hiroyasu Yamamoto, Tokyo (JP); Hatsumi Nakano, Tokyo (JP); Takakuni Shimizu, Tokyo (JP); Misako Koibuchi, Tokyo (JP)

(73) Assignee: FDK Corporation, Tokyo (JP)

( * ) Notice: Subject to any disclaimer, the term of this patent is extended or adjusted under 35 U.S.C. 154(b) by 2395 days.

(21) Appl. No.: 10/757,369

(22) Filed: Jan. 14, 2004

(65) Prior Publication Data

US 2004/0230406 A1 Nov. 18, 2004

Related U.S. Application Data

(63) Continuation of application No. PCT/JP02/06775, filed on Jul. 4, 2002.

(30) Foreign Application Priority Data

| Jul. 18, 2001 | (JP) | 2001-217896 |
| Aug. 8, 2001 | (JP) | 2001-240404 |
| Aug. 22, 2001 | (JP) | 2001-251120 |

(51) Int. Cl.
G06F 1/02 (2006.01)
G06F 17/18 (2006.01)
(52) U.S. Cl. .......................... 708/250; 463/16
(58) Field of Classification Search .......... 708/250–256; 463/16

See application file for complete search history.

(56) References Cited

U.S. PATENT DOCUMENTS

| 4,206,920 A * | 6/1980 | Weatherford et al. .......... 463/18 |
| 4,573,681 A * | 3/1986 | Okada ............................. 708/250 |
| 5,380,008 A * | 1/1995 | Mathis et al. ................... 463/18 |
| 5,511,784 A * | 4/1996 | Furry et al. ................. 273/143 R |
| 5,830,064 A * | 11/1998 | Bradish et al. ................ 708/250 |
| 6,360,183 B1 * | 3/2002 | Shilton ......................... 708/250 |
| 6,798,883 B1 * | 9/2004 | Buller ........................... 708/250 |
| 2002/0010015 A1 * | 1/2002 | Acres ............................... 463/18 |
| 2003/0028567 A1 * | 2/2003 | Carlson ........................ 708/250 |

FOREIGN PATENT DOCUMENTS

| JP | 2-109586 | 4/1990 |
| JP | 2-145010 | 6/1990 |
| JP | 4-161180 | 6/1992 |
| JP | 07-162275 | 6/1995 |
| JP | 08-071213 | 3/1996 |
| JP | 08-173597 | 7/1996 |
| JP | 9-225102 A | 9/1997 |
| JP | 10-179860 | 7/1998 |
| JP | 11-290535 | 10/1999 |
| JP | 2000-229158 A | 8/2000 |
| JP | 2000-254304 | 9/2000 |

* cited by examiner

*Primary Examiner* — Chuong D Ngo
(74) *Attorney, Agent, or Firm* — Martin Fleit; Paul D. Bianco; Fleit Gibbons Gutman Bongini & Bianco PL

(57) ABSTRACT

The present invention provides a probability generating apparatus offering unexpectedness and an excellent unfair act preventing function. The probability generating apparatus includes a parallel random number generator offering uniformity and consecutively generating random numbers.

5 Claims, 75 Drawing Sheets

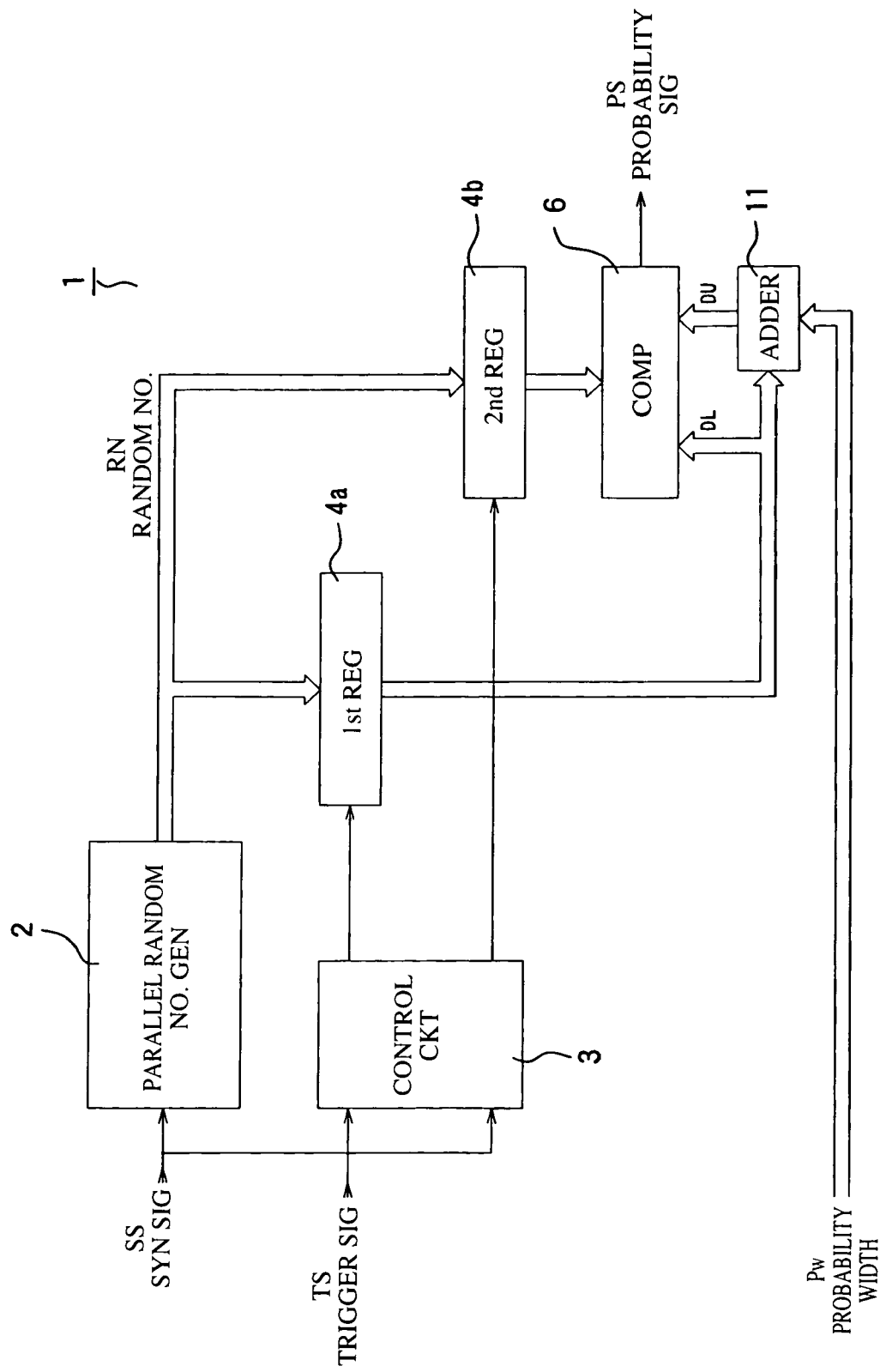
F I G. 25

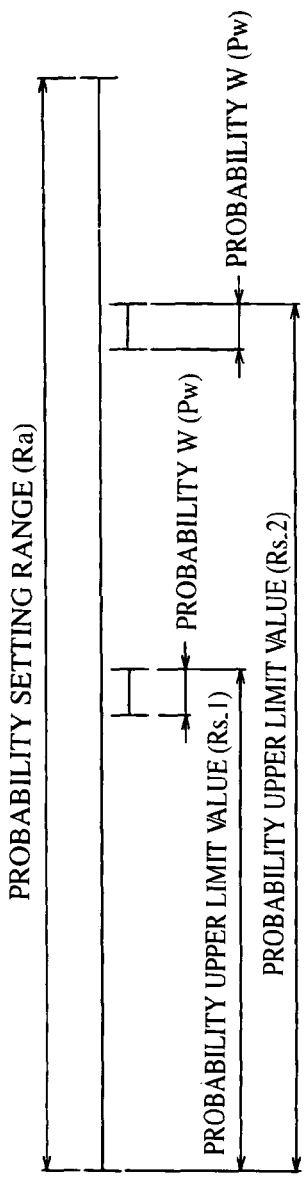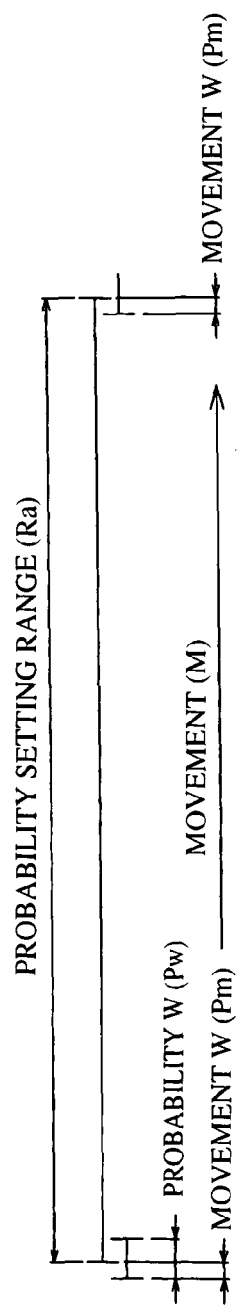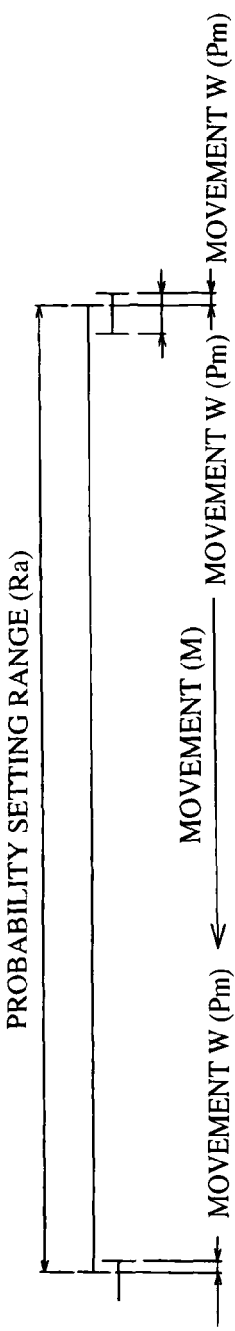
F I G. 5 0
F I G. 5 1 A
F I G. 5 1 B

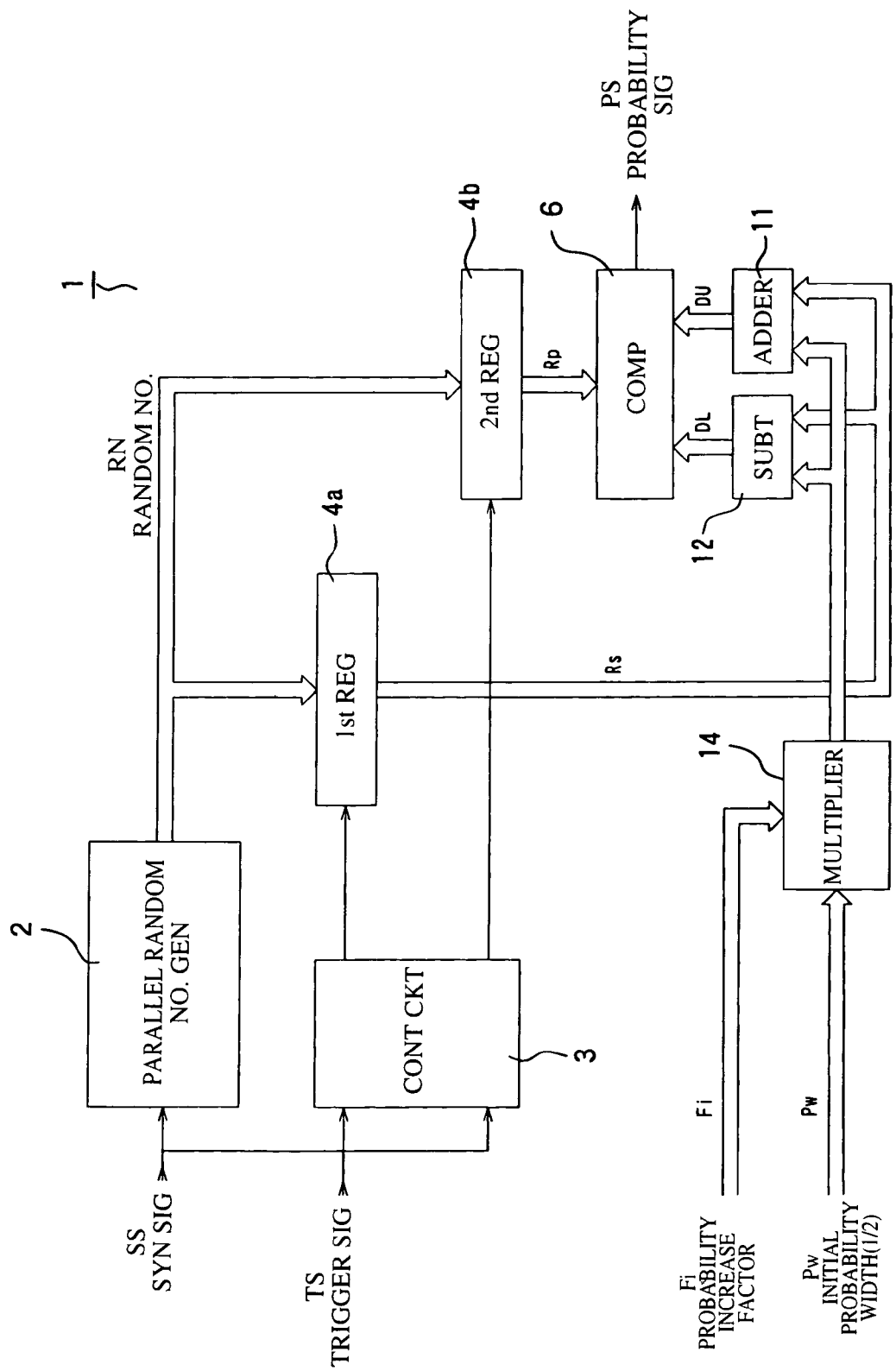

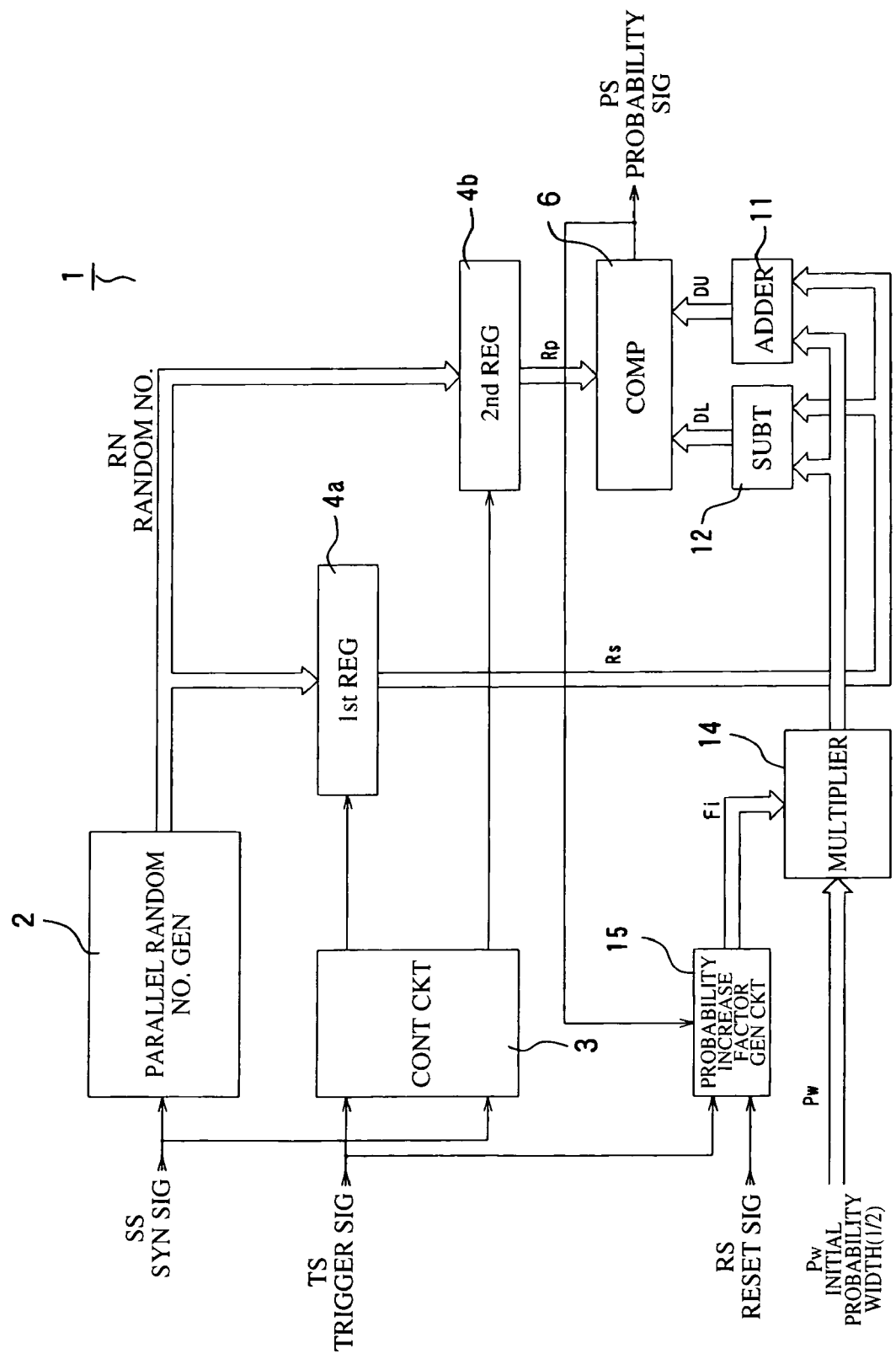
F I G. 56

US 8,032,574 B2

PROBABILITY GENERATING APPARATUS

RELATED APPLICATION

This application is a continuation of International Patent Application No. PCT/JP02/06775 filed Jul. 4, 2002, which is here incorporated by reference in its entirety.

TECHNICAL FIELD

The present invention relates to a probability generating apparatus using a random number generator offering uniformity, and in particular, a probability generating apparatus used in applications to game machines or the like to enhance the unexpectedness of win data and an unfair-act preventing function, so that a player has more hope of prizewinning and enjoys fair speculativeness (prevention of a heavy loss).

BACKGROUND ART

The use of random numbers is essential in advanced technical calculations, game machines, enciphering processes, or the like. In recent years, there has been a growing demand for a probability generating apparatus using a very accurate natural random number (essential random number) generator which offers uniformity (no variations in the probability value and incidence of random numbers) and which is free from the regularity of appearance of random numbers, the correlation between consecutive random numbers, periodicity, or the like.

FIG. 47 schematically shows the common configuration of such a probability generating apparatus 1. The probability generating apparatus 1 is composed of a parallel random number generator 2 that consecutively generates uniform random numbers each composed of n bits, in synchronization with a synchronous signal (clock) SS, a register 4 that sets a random number PS when a trigger signal TS is generated (for example, in the case of a game machine, the trigger signal TS is generated on the basis of a hit signal generated by prize-winning sensor), and a comparator 6 which compares the set data in the register 4 with range data specified by probability lower limit data DL and probability upper limit data DU and which outputs a probability signal PS by generating a High signal, which is indicative of a "win", if the set data is within this range, while generating a Low signal, which is indicative of a "loss", if the set data is out of this range.

In particular, for a probability generating apparatus 1 used for pinball machines, pinball slot machines, games, or the like, it is very important to offer the unexpectedness of win data based on random numbers, which enhances the gambling nature of the game machine, as well as an unfair-act preventing function of inhibiting external unfair acts.

However, with the probability generating apparatus 1, as shown in the timing waveform diagram in FIG. 48, a random number corresponding to the time (t0) when a trigger signal is generated is used directly as data for generation of probability. Accordingly, for example, timings for reading data can be easily set, and the contents of data can be easily determined because the probability lower limit data (DL) and probability upper limit data (DU), required to generate probability, are fixed and always have the same values. Thus, disadvantageously, external unfair acts are easily committed.

It is thus an object of the present invention to provide a probability generating apparatus which solves these problems, offers enhanced unexpectedness and an excellent unfair-act preventing function.

Furthermore, in general, for game machines (for example, pinball machines), the popularity of a certain machine type depends significantly on the level of a player's interest in that pinball machine (how the player can enjoy the pinball game). On the other hand, the popularity also depends markedly on the gambling nature of the pinball machine. Thus, in recent years., efforts have been made to increase the number of visitors by enhancing the gambling nature of the game, while maintaining players' interests in the game.

However, in general, with a probability generating apparatus configured as described above, when the relationship between the number of lotteries and the value of the probability of a loss at a specified probability is calculated, the results indicate that the probability of a loss tends to be high compared to the number of lotteries as shown in Table 6. Table 6 shows that, for example, at a probability of 1/500, even if 1,000 lots are drawn, no prizes are won in 13.5% of all the cases.

When the probability value is defined as p and the number of lotteries (the number of consecutive losses) is defined as n, the probability of a loss P0 at a specified probability as described above can be calculated as follows:

$$P0=(1-p)^n$$

The above tendency indicates that conventional game machines may cause players heavy losses, thus impairing fair speculativeness. Consequently, to further increase the number of visitors, it is a very important object to solve these problems while enhancing the gambling nature, so that a player has much hope of prizewinning and enjoys fair speculativeness (prevention of a heavy loss).

The present invention is provided in view of these circumstances. It is an object of the present invention to provide a probability generating apparatus which offers enhanced unexpectedness and an excellent unfair-act preventing function as well as an additional function of increasing probability on the basis of the number of lotteries (the number of consecutive losses), so that not only unexpectedness is enhanced but also the player has much hope of prizewinning and enjoys fair speculativeness (prevention of a heavy loss) notably when the apparatus is used for applications such as game machines.

Moreover, it is an object of the present invention to provide a probability generating apparatus which offers enhanced unexpectedness and an excellent unfair-act preventing function as well as an additional function of fluctuating a win probability, so that a player has much hope of prizewinning and gets a thrill out of a game, while ensuring a fair probability notably when the apparatus is used for applications such as game machines.

DISCLOSURE OF THE INVENTION

According to Embodiment 1 of the present invention, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that using data (n) generated on the basis of a random number obtained using the trigger signal as a start point, the (n)-th random number from this random number is set as the data for the generation of probability.

With the present arrangement, the data for generation of probability is a random number generated at an indeterminate time after a trigger signal is generated. It is thus virtually impossible to determine a timing for committing an unfair act. Furthermore, this data varies every time a trigger signal is generated. This serves to offer sufficient unexpectedness and a sufficient unfair-act preventing function.

According to Embodiment 2 of the present invention, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that the data for generation of probability is obtained by using data (n) and data (k) each generated on the basis of a random number obtained using the trigger signal as a start point, to rotate the (n)-th random number from this random number using a rotating direction and a rotation length set on the basis of the data (k).

With the present arrangement, uniform random numbers remain uniform even after the data has been rotated (right shift/left shift). It is thus possible to enhance the unexpectedness and the unfair-act preventing function.

According to Embodiment 3 of the present invention, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that the data for generation of probability is obtained by using data (n) and data (j) each generated on the basis of a random number obtained using the trigger signal as a start point, and scrambling the (n)-th and (j)-th random numbers from this random number.

With the present arrangement, uniform random numbers remain uniform even after the data has been scrambled. It is thus possible to enhance the unexpectedness and the unfair-act preventing function.

The phrase "scrambling data" as used herein means that arbitrary ones of a plurality of data lines are subjected to a logical calculation (e.g. an exclusive OR or an exclusive OR of two other exclusive ORs) and thus converted into data different from original data.

According to Embodiment 4 of the present invention, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that the data for generation of probability is obtained by using data (n0) and data (j0) each generated on the basis of a random number obtained using the trigger signal as a start point, to generate data (n1, j1) and data (n2, j2) on the basis of the (n0)-th and (j0)-th random numbers from the random number obtained using the trigger signal as the start point, using the data (n1, j1) and the data (n2, j2) as well as a rotating direction and a rotation length set on the basis of the data (n2, j2) to rotate the (n0+n1)-th and (j0+j1)-th random numbers from the random number obtained using the trigger signal as the start point, and scrambling the rotated (n0+n1)-th and (j0+j1)-th random numbers.

This arrangement further enhances the unexpectedness and the unfair-act preventing function.

According to Embodiment 5 of the present invention, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that using data (n) and data (j) each generated on the basis of a random number obtained using the trigger signal as a start point, the (j)-th random number from this random number is set as the data for generation of probability, and the range data is obtained by comparing predetermined selection comparison data with the (n)-th data from the above described random number, selecting one of two sets of probability upper limit data and probability lower limit data in accordance with results of the comparison, and setting a range specified by the selected probability upper limit data and probability lower limit data, as the range data.

With the present arrangement, two types of probabilities are synthesized to further enhance the unexpectedness.

According to Embodiment 6, the above probability generating apparatus is characterized in that the data for generation of probability is obtained by inverting or non-inverting the above data for generation of probability in accordance with contents of the random number obtained using the trigger signal as the start point. This arrangement further enhances the unexpectedness and the unfair-act preventing function.

According to Embodiment 7, the above probability generating apparatus is characterized in that random number data is obtained by using data (x) generated on the basis of the random number obtained using the trigger signal as the start point, to set the (x)-th random number from this random number as the random number data, and the random number data is outputted together with the probability signal.

According to Embodiment 8, the above probability generating apparatus is characterized in that random number data is obtained by using data (x) and data (y) each generated on the basis of the random number obtained using the trigger signal as the start point, to set, as the random number data, data obtained by using a rotating direction and a rotation length set on the basis of the data (y) to rotate the (x)-th random number from the above described random number, and the random number data is outputted together with the probability signal.

According to Embodiment 9, the above probability generating apparatus is characterized in that random number data is obtained by using data (x) and data (y) each generated on the basis of the random number obtained using the trigger signal as the start point, to set, as the random number data, data obtained by scrambling the (x)-th and (y)-th random numbers from the above described random number, and the random number data is outputted together with the probability signal.

According to Embodiment 10, the above probability generating apparatus is characterized in that the random number data is obtained by using data (x0) and data (y0) each generated on the basis of the random number obtained using the trigger signal as the start point, to generate data (x1, y1) and data (x2, y2) on the basis of the (x0)-th and (y0)-th random numbers from the above described random number, using the data (x1, y1) and the data (x2, y2) as well as a rotating direction and a rotation length set on the basis of the data (x2, y2) to rotate the (x0+x1)-th and (y0+y1)-th random numbers from the random number obtained using the trigger signal as the start point, and then scrambling the rotated (x0+x1)-th and (y0+y1)-th random numbers, and the random number data is outputted together with the probability signal.

With the arrangements described in Embodiments 7 to 10, described above, gambling nature can be improved by outputting an unexpected random number together with a probability signal and using this random number for a win mode, a flower pattern, or a probability variation for game machines or the like. With Embodiment 11 of the present invention, the above probability generating apparatus is characterized in that a timing for generating the trigger signal is obtained by adding a preset variable offset value to a timing for generating the trigger signal. This arrangement further enhances the unexpectedness and the unfair-act preventing function.

According to Embodiment 12, there is provided a probability generating apparatus comprising a parallel random number generator offering uniformity and consecutively generating random numbers, the apparatus setting, as data for generation of probability, data generated using a trigger signal as a start point on the basis of the random numbers, the apparatus comparing the data for generation of probability with range data to output a win/loss probability signal, the apparatus being characterized in that the range data is specified by probability lower limit data having a probability lower limit value that can be varied within a probability setting range and probability upper limit data obtained by adding a predetermined probability width to the probability lower limit value.

According to Embodiment 13, there is provided a probability generating apparatus comprising a parallel random number generator offering uniformity and consecutively generating random numbers, the apparatus setting, as data for generation of probability, data generated using a trigger signal as a start point on the basis of the random numbers, the apparatus comparing the data for generation of probability with range data to output a win/loss probability signal, the apparatus being characterized in that the range data is specified by probability upper limit data having a probability upper limit value that can be varied within a probability setting range and probability lower limit data obtained by subtracting a predetermined probability width from the probability upper limit value.

According to Embodiment 14, there is provided a probability generating apparatus comprising a parallel random number generator offering uniformity and consecutively generating random numbers, the apparatus setting, as data for generation of probability, data generated using a trigger signal as a start point on the basis of the random numbers, the apparatus comparing the data for generation of probability with range data to output a win/loss probability signal, the apparatus being characterized in that the range data is specified by probability lower limit data obtained by subtracting a predetermined probability width from a value for a probability generation position that can be varied within a probability setting range and probability upper limit data obtained by adding the probability width to the value for the probability generation position.

According to Embodiment 15, the probability generating apparatus set forth in Embodiment 12 is characterized in that the probability lower limit value is the random number obtained using the trigger signal as the start point.

According to Embodiment 16, the probability generating apparatus set forth in Embodiment 13 is characterized in that the probability upper limit value is the random number obtained using the trigger signal as the start point.

According to Embodiment 17, the probability generating apparatus set forth in Embodiment 14 is characterized in that the value for the probability generation position is the random number obtained using the trigger signal as the start point.

According to Embodiment 18, the probability generating apparatus set forth in Embodiment 12 is characterized in that using the data (n) generated on the basis of the random number obtained using the trigger signal as the start point, the (n)-th random number from this random number is set as the probability lower limit value.

According to Embodiment 19, the probability generating apparatus set forth in Embodiment 13 is characterized in that using the data (n) generated on the basis of the random number obtained using the trigger signal as the start point, the (n)-th random number from this random number is set as the probability upper limit value.

According to Embodiment 20, the probability generating apparatus set forth in Embodiment 14 is characterized in that using the data (n) generated on the basis of the random number obtained using the trigger signal as the start point, the (n)-th random number from this random number is set as the value for the probability generation position.

According to Embodiment 21, the probability generating apparatus set forth in Embodiment 12 is characterized in that the probability lower limit value is obtained by using the data (n) and data (k) each generated on the basis of the random number obtained using the trigger signal as the start point, to rotate the (n)-th random number from this random number using a rotating direction and a rotation length set on the basis of the data (k).

According to Embodiment 22, the probability generating apparatus set forth in Embodiment 13 is characterized in that the probability upper limit value is obtained by using the data (n) and data (k) each generated on the basis of the random number obtained using the trigger signal as the start point, to rotate the (n)-th random number from this random number using a rotating direction and a rotation length set on the data (k).

According to Embodiment 23, the probability generating apparatus set forth in Embodiment 14 is characterized in that the value for the probability generation position is obtained by using the data (n) and data (k) each generated on the basis of the random number obtained using the trigger signal as the start point, to rotate the (n)-th random number from this random number using a rotating direction and a rotation length set on the data (k).

According to Embodiment 24, the probability generating apparatus set forth in Embodiment 12, characterized in that the probability lower limit value is obtained by using the data (n) and data (j) each generated on the basis of the random number obtained using the trigger signal as the start point, to scramble the (n)-th and (j)-th random numbers from this random number.

According to Embodiment 25, the probability generating apparatus set forth in Embodiment 13 is characterized in that the probability upper limit value is obtained by using the data (n) and data (j) each generated on the basis of the random number obtained using the trigger signal as the start point, to scramble the (n)-th and (j)-th random numbers from this random number.

According to Embodiment 26, the probability generating apparatus set forth in Embodiment 14 is characterized in that the value for the probability generation position is obtained by using the data (n) and data (j) each generated on the basis of the random number obtained using the trigger signal as the start point, to scramble the (n)-th and (j)-th random numbers from this random number.

According to Embodiment 27, the probability generating apparatus set forth in Embodiment 12 is characterized in that the probability lower limit value is obtained by using the data (n0) and data (j0) each generated on the basis of the random number obtained using the trigger signal as the start point, to generate the data (n1, j1) and data (n2, j2) on the basis of the (n0)-th and (j0)-th random numbers from this random number, using the data (n1, j1) and the data (n2, j2) as well as the rotating direction and rotation length set on the basis of the data (n2, j2) to rotate the (n0+n1)-th and (j0+j1)-th random numbers from the random number obtained using the trigger signal as the start point, and then scrambling the rotated (n0+n1)-th and (j0+j1)-th random numbers.

According to Embodiment 28, the probability generating apparatus set forth in Embodiment 13 is characterized in that the probability upper limit value is obtained by using the data (n0) and data (j0) each generated on the basis of the random number obtained using the trigger signal as the start point, to generate the data (n1, j1) and data (n2, j2) on the basis of the (n0)-th and (j0)-th random numbers from this random number, using the data (n1, j1) and the data (n2, j2) as well as the rotating direction and rotation length set on the basis of the data (n2, j2) to rotate the (n0+n1)-th and (j0+j1)-th random numbers from the random number obtained using the trigger signal as the start point, and then scrambling the rotated (n0+n1)-th and (j0+j1)-th random numbers.

According to Embodiment 29, the probability generating apparatus set forth in Embodiment 14 is characterized in that the value for the probability generation position is obtained by using the data (n0) and data (j0) each generated on the basis of the random number obtained using the trigger signal as the start point, to generate the data (n1, j1) and data (n2, j2) on the basis of the (n0)-th and (j0)-th random numbers from this random number, using the data (n1, j1) and the data (n2, j2) as well as the rotating direction and rotation length set on the basis of the data (n2, j2) to rotate the (n0+n1)-th and (j0+j1)-th random numbers from the random number obtained using the trigger signal as the start point, and then scrambling the rotated (n0+n1)-th and (j0+j1)-th random numbers.

According to Embodiment 30, the probability generating apparatus set forth in Embodiment 12 is characterized in that the probability lower limit value, the probability upper limit value, and the value for the probability generation position are inverted or non-inverted in accordance with the contents of the random number obtained using the trigger signal as the start point.

According to Embodiment 31, the probability generating apparatus set forth in Embodiment 12 is characterized in that if the probability width is moved and as a result, lies out of the probability setting range, a part of the probability width which lies out of the probability setting range is moved to an opposite side of the probability setting range.

According to Embodiment 32, the probability generating apparatus set forth in Embodiment 12 is characterized in that the data for generation of probability is the data for generation of probability generated by the probability generating apparatus as previously set forth.

Here, provided that the range data (probability width) is always fixed within the probability setting range, the probability obtained is always fixed even if the position varies at which the range data is set within the probability setting range. With the arrangements according to the present invention, as the position at which the range data is set varies sequentially within the probability setting range using an arbitrary timing, win data contained in the random number data for generation of probability, which provides a fixed probability, is varied. These arrangements offer unexpectedness and an excellent unfair-act preventing function, thus providing an ideal apparatus as a probability generator for game machines or the like.

According to Embodiment 33, the probability generating apparatus set forth in Embodiment 1 is characterized in that the parallel random number generator comprises a 1-bit serial random number generator offering uniformity and consecutively generating random numbers and a register circuit which retains every predetermined bit length of serial random numbers generated and which outputs the serial random numbers in parallel. This simplifies the configuration of the parallel random number generator.

According to Embodiment 34, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability lower limit data obtained by setting, as a value for a probability generation position, a random number obtained using the trigger signal as the start point and subtracting a product of a predetermined probability width and a probability increase factor, from the value for the probability generation position, and probability upper limit data obtained by adding the product of the probability width and the probability increase factor, to the value for the probability generation position, and in that the probability increase factor increases from its initial value consistently with the number of consecutive losses in the probability signal and returns to the initial value when prizewinning occurs.

According to Embodiment 35, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability lower limit data containing, as a probability lower limit value, a random number obtained using the trigger signal as the start point and probability upper limit data obtained by adding a product of a predetermined probability width and a probability increase factor, to the probability lower limit value, and in that the probability increase factor increases from its initial value consistently with the number of consecutive losses in the probability signal and returns to the initial value when prizewinning occurs.

According to Embodiment 36, there is provided a probability generating apparatus comprising a parallel random number generator offering uniformity and consecutively generating random numbers, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability upper limit data containing, as a probability upper limit value, a random number obtained using the trigger signal as the start point and probability lower limit data obtained by subtracting a product of a predetermined probability width and a probability increase factor, from the probability upper limit value, and in that the probability increase factor increases from its initial value consistently with the number of consecutive losses in the probability signal and returns to the initial value when prizewinning occurs.

According to Embodiment 37, the probability generating apparatus set forth in Embodiment 34 is characterized by further comprising a probability increase factor generating circuit that outputs the probability increase factor on the basis of the trigger signal and the probability signal, the probability increase factor increasing in accordance with a predetermined pattern consistently with the number of consecutive losses.

According to Embodiment 38, the probability generating apparatus set forth in Embodiment 37 is characterized in that the probability increase factor generating circuit has a function of selecting and outputting one of a plurality of preset probability increase factor patterns in accordance with the contents of the random number obtained using the trigger signal as the base point.

According to Embodiment 39, the probability generating apparatus set forth in Embodiment 37 is characterized in that the probability increase factor increases linear-functionally at a uniform increase rate from beginning until prizewinning occurs.

According to Embodiment 40, the probability generating apparatus set forth in Embodiment 37 is characterized in that the probability increase factor increases step by step at a fixed increase rate at fixed intervals from beginning until prizewinning occurs.

According to Embodiment 41, the probability generating apparatus set forth in Embodiment 37 is characterized in that the probability increase factor is set at its initial value from beginning until a specified number of losses and subsequently increases linear-functionally at a uniform increase rate until prizewinning occurs.

According to Embodiment 42, the probability generating apparatus set forth in Embodiment 37 is characterized in that the probability increase factor is set at its initial value from beginning until a specified number of losses and is subsequently like one step and remains fixed at a high probability until prizewinning occurs.

According to Embodiment 43, the probability generating apparatus set forth in Embodiment 37 is characterized in that the probability increase factor is set at its initial value from beginning until a specified number of losses and subsequently increases step by step at a fixed increase rate at fixed intervals until prizewinning occurs.

According to Embodiment 44, the probability generating apparatus set forth in Embodiment 34 is characterized in that a probability increase amount is used in place of said probability increase factor, and data obtained by adding the probability increase amount to the probability width is used for a probability variation. In this case, increase factor patterns for a probability increase amount may tend to exhibit increases similar to those as previously set forth.

According to Embodiment 45, the probability generating apparatus set forth in Embodiment 34 is characterized in that if the trigger signal is not generated for a specified period of time, the probability increase factor or the probability increase amount is returned to its initial value.

With some embodiments, the probability of a loss decreases sharply with increasing number of lotteries (increasing number of consecutive losses). This substantially eliminates the possibility of causing a player a heavy loss. Therefore, the player has much hope of prizewinning and enjoys fair speculativeness (prevention of a heavy loss).

Once prizewinning occurs, one cycle of the first probability variation is completed. Then, the probability increase factor or the probability increase amount returns to its initial value to return the probability width to an initial value. Then, the next probability variation cycle is started with an initial probability width. This process is repeated.

In particular, if the trigger signal is not generated for a specified time as in the case with Embodiment 45, an unfair act such as an unfair increase in the probability of prizewinning can be reliably hindered by performing the same operation as that preformed when prizewinning occurs to forcedly return the probability width to its initial value.

According to Embodiment 46, there is provided a probability generating apparatus comprising a parallel random number generator offering uniformity and consecutively generating random numbers on the basis of a synchronous signal, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability lower limit data obtained by setting, as a value for a probability generation position, a random number obtained using the trigger signal as a start point and subtracting a sum of a fluctuation width and a predetermined probability width, from the value for the probability generation position, and probability upper limit data obtained by adding the sum of the fluctuation width and the predetermined probability width, to the value for the probability generation position.

According to Embodiment 47, there is provided a probability generating apparatus comprising a parallel random number generator offering uniformity and consecutively generating random numbers on the basis of a synchronous signal, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability lower limit data containing, as a probability lower limit value, a random number obtained using the trigger signal as a start point and probability upper limit data obtained by adding a sum of a fluctuation width and a predetermined probability width, to the probability lower limit value.

According to Embodiment 48, there is provided a probability generating apparatus comprising a parallel random number generator offering uniformity and consecutively generating random numbers on the basis of a synchronous signal, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability upper limit data containing, as a probability upper limit value, a random number obtained using the trigger signal as a start point and probability lower limit data obtained by subtracting a sum of a fluctuation width and a predetermined probability width, from the probability upper limit value.

According to Embodiment 49, there is provided a probability generating apparatus comprising a parallel random number generator offering uniformity and consecutively generating random numbers on the basis of a synchronous signal, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability lower limit data obtained by setting, as a value for a probability generation position, a random number obtained using the trigger signal as a start point and subtracting a product of a predetermined probability width and a fluctuation rate, from the value for the probability generation position, and probability upper limit data obtained by adding the product of the probability width and the fluctuation rate, to the value for the probability generation position.

According to Embodiment 50, there is provided a probability generating apparatus comprising a parallel random number generator offering uniformity and consecutively generating random numbers on the basis of a synchronous signal, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability lower limit data containing, as a probability lower limit value, a random number obtained using the trigger signal as a start point and probability upper limit data obtained by adding a product of a predetermined probability width and a fluctuation rate, to the probability lower limit value.

According to Embodiment 51, there is provided a probability generating apparatus comprising a parallel random number generator offering uniformity and consecutively generating random numbers on the basis of a synchronous signal, the apparatus setting, as data for generation of probability, data generated using a trigger signal as a base point on the basis of the random numbers, the apparatus comparing the data for generation of probability with range data to output a win/loss probability signal, the apparatus being characterized in that the range data is specified by probability upper limit data containing, as a probability upper limit value, a random number obtained using the trigger signal as a start point and probability lower limit data obtained by subtracting a product of a predetermined probability width and a fluctuation rate, from the probability upper limit value.

According to Embodiment 52, the probability generating apparatus set forth in Embodiment 46 is characterized by further comprising a fluctuation waveform generating circuit that outputs the fluctuation width or the fluctuation rate as a fluctuation waveform based on a time based on the synchronous signal.

According to Embodiment 53, the probability generating apparatus set forth in Embodiment 46 is characterized by further comprising a fluctuation waveform generating circuit that outputs the fluctuation width or the fluctuation rate as a fluctuation waveform based on the number of trigger signals.

According to Embodiment 54, the probability generating apparatus set forth in Embodiment 46 is characterized by further comprising a fluctuation waveform generating circuit that outputs the fluctuation width or the fluctuation rate as a fluctuation waveform based on a time based on the synchronous signal or as a fluctuation waveform based on the number of trigger signals, depending on contents of the random number obtained using the trigger signal as the base point.

According to Embodiment 55, the probability generating apparatus set forth in Embodiment 52 is characterized in that the fluctuation waveform generating circuit has a function of multiplying a time used as a base unit of a fluctuation time axis or the number of trigger signals by a predetermined factor, depending on the contents of the random number obtained using the trigger signal as the base point.

According to Embodiment 56, the probability generating apparatus set forth in Embodiment 52 is characterized in that the fluctuation waveform generating circuit has a function of moving a phase of the fluctuation cycle a predetermined amount in accordance with the contents of the random number obtained using the trigger signal as the base point.

According to Embodiment 57, the probability generating apparatus set forth in Embodiment 52 is characterized in that the fluctuation waveform generating circuit has a function of selecting one of a plurality of preset fluctuation waveforms in accordance with the contents of the random number obtained using the trigger signal as the base point.

According to Embodiment 58, the probability generating apparatus set forth in Embodiment 52 is characterized in that the fluctuation waveform generating circuit has a function of inverting or non-inverting the fluctuation waveform depending on the contents of the random number obtained using the trigger signal as the base point.

According to Embodiment 59, the probability generating apparatus set forth in Embodiment 52 is characterized in that the waveform generating circuit generates a fluctuation waveform under new fluctuation conditions set for each fluctuation cycle on the basis of the contents of the random number obtained using the trigger signal as the base point.

According to Embodiment 60, the probability generating apparatus set forth in Embodiment 52 is characterized in that a fluctuation waveform generated by the fluctuation waveform generating circuit is a sine wave or a cosine wave or a waveform obtained by deforming the sine or cosine wave.

According to Embodiment 61, the probability generating apparatus set forth in Embodiment 52 is characterized in that a fluctuation waveform generated by the fluctuation waveform generating circuit is a square wave or a waveform obtained by deforming the square wave.

According to Embodiment 62, the probability generating apparatus set forth in Embodiment 52 is characterized in that a fluctuation waveform generated by the fluctuation waveform generating circuit is a triangular wave or a waveform obtained by deforming the triangular wave.

According to Embodiment 63, the probability generating apparatus set forth in Embodiment 52 is characterized in that a fluctuation waveform generated by the fluctuation waveform generating circuit is a saw-tooth-wave or a waveform obtained by deforming the saw-tooth-wave.

According to Embodiment 64, the probability generating apparatus set forth in Embodiment 52 is characterized in that a fluctuation waveform generated by the fluctuation waveform generating circuit is a trapezoidal wave or a waveform obtained by deforming the trapezoidal wave.

According to Embodiment 65, the probability generating apparatus set forth in Embodiment 52 is characterized in that a fluctuation waveform generated by the fluctuation waveform generating circuit is a normal distribution waveform or a deformed normal distribution wave.

According to Embodiment 66, the probability generating apparatus set forth in Embodiment 52 is characterized in that a fluctuation waveform generated by the fluctuation waveform generating circuit is a parabolic waveform or a deformed parabolic wave.

According to Embodiment 67, the probability generating apparatus set forth in Embodiment 52 is characterized in that a fluctuation waveform generated by the fluctuation waveform generating circuit is a cubic root waveform or a deformed cubic root waveform.

According to Embodiment 68, the probability generating apparatus set forth in Embodiment 52 is characterized in that a fluctuation waveform generated by the fluctuation waveform generating circuit is an attenuating vibration waveform, an amplifying vibration waveform, or a deformed attenuating or amplifying vibration waveform.

The deformed waveforms described previously in Embodiments 60 to 68 are obtained by modifying the ratio of the heights or widths of the crest and valley in the corresponding fluctuation waveform, the inclination of the crest or valley, or the like to the extent that a probability increase region and probability decrease region in the fluctuation waveform are equivalent to each other within one fluctuation cycle.

According to Embodiment 69, the probability generating apparatus set forth in Embodiment 52 is characterized by further comprising a plurality of the fluctuation waveform generating circuits and a synthesizer that synthesizes fluctuation waveforms generated by the fluctuation waveform generating circuits, and in that a synthesized output from the synthesizer is the fluctuation width or the fluctuation rate.

According to Embodiment 70, the probability generating apparatus set forth in Embodiment 52 is characterized in that the fluctuation waveform generating circuit has a ROM that stores fluctuation waveform data or a RAM that stores fluctuation waveform data.

According to Embodiment 71, the probability generating apparatus set forth in Embodiment 46 is characterized in that using data generated on the basis of the random number obtained using the trigger signal as the base point, a random number used to generate the range data is set as a random number corresponding to a timing obtained by adding an offset value based on the above described data to a timing for the generation of the random number obtained using the trigger signal as the base point.

According to Embodiment 72, the probability generating apparatus set forth in Embodiment 46 is characterized in that a random number used to generate the range data is obtained by using data generated on the basis of the random number obtained using the trigger signal as the base point, to rotate, on the basis of this data, a random number corresponding to a timing obtained by adding an offset value based on the above mentioned data to a timing for the generation of the random number obtained using the trigger signal as the base point.

According to Embodiment 73, the probability generating apparatus set forth in Embodiment 46 is characterized in that a random number used to generate the range data is obtained by using data generated on the basis of the random number obtained using the trigger signal as the base point as well as a plurality of data generated on the basis of this random number, to scramble a random number corresponding to a timing obtained by adding an offset value based on the above mentioned data to a timing for the generation of the random number obtained using the trigger signal as the base point.

The phrase "scrambling data" as used herein means that arbitrary ones of a plurality of data lines are subjected to a logical calculation (e.g. an exclusive OR or an exclusive OR of two other exclusive ORs) and thus converted into data different from original data.

According to Embodiment 74, the probability generating apparatus set forth in Embodiment 46 is characterized in that a random number used to generate the range data is obtained by using data generated on the basis of the random number obtained using the trigger signal as the base point as well as a plurality of data generated on the basis of this random number, to rotate and scramble a random number corresponding to a timing obtained by adding an offset value based on the above mentioned data to a timing for the generation of the random number obtained using the trigger signal as the base point.

According to Embodiment 75, the probability generating apparatus set forth in Embodiment 46 is characterized in that the random number obtained using the trigger signal as the base point corresponds to a timing for generation of the trigger signal or a timing obtained by adding a preset fixed or variable offset value to the timing for the generation of the trigger signal.

With the arrangements described in Embodiments 46 to 75, for example, in applications such as game machines, the fluctuation width, rate, cycle, waveform, or the like is sequentially varied. Accordingly, unexpectedness is offered and the player has much hope of prizewinning and gets a thrill out of the game. Furthermore, the probability increase region and probability decrease region in the fluctuation waveform is set to be equivalent to each other within one fluctuation cycle. Consequently, the probability is generally averaged to equal the probability width. Therefore, a fair probability is always ensured.

BRIEF DESCRIPTION OF THE DRAWINGS

FIG. 25 is a diagram showing the configuration of the probability generating apparatus according to the second embodiment of the present invention, the configuration being different from that shown in FIG. 23;

FIG. 50 is a diagram showing the relationship between the probability setting position and probability width of the probability generating apparatus in FIG. 49;

FIG. 51 is a diagram showing movement of a part of the probability width which lies out of the probability setting range;

FIG. 52 is a diagram showing the configuration of a probability generating apparatus according to a third embodiment of the present invention;

FIG. 56 is a diagram showing the configuration of a probability generating apparatus according to a fourth embodiment of the present invention;

BEST MODE FOR CARRYING OUT THE INVENTION

Figure 82:
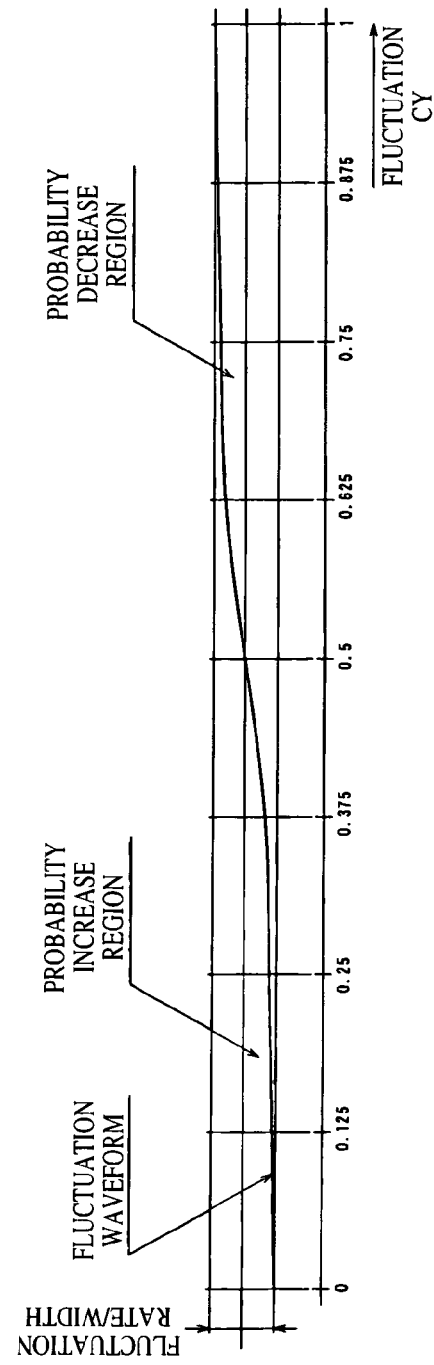
FIG. 82 is a graph showing a fluctuation waveform of a cubic root waveform.
Figure 83:
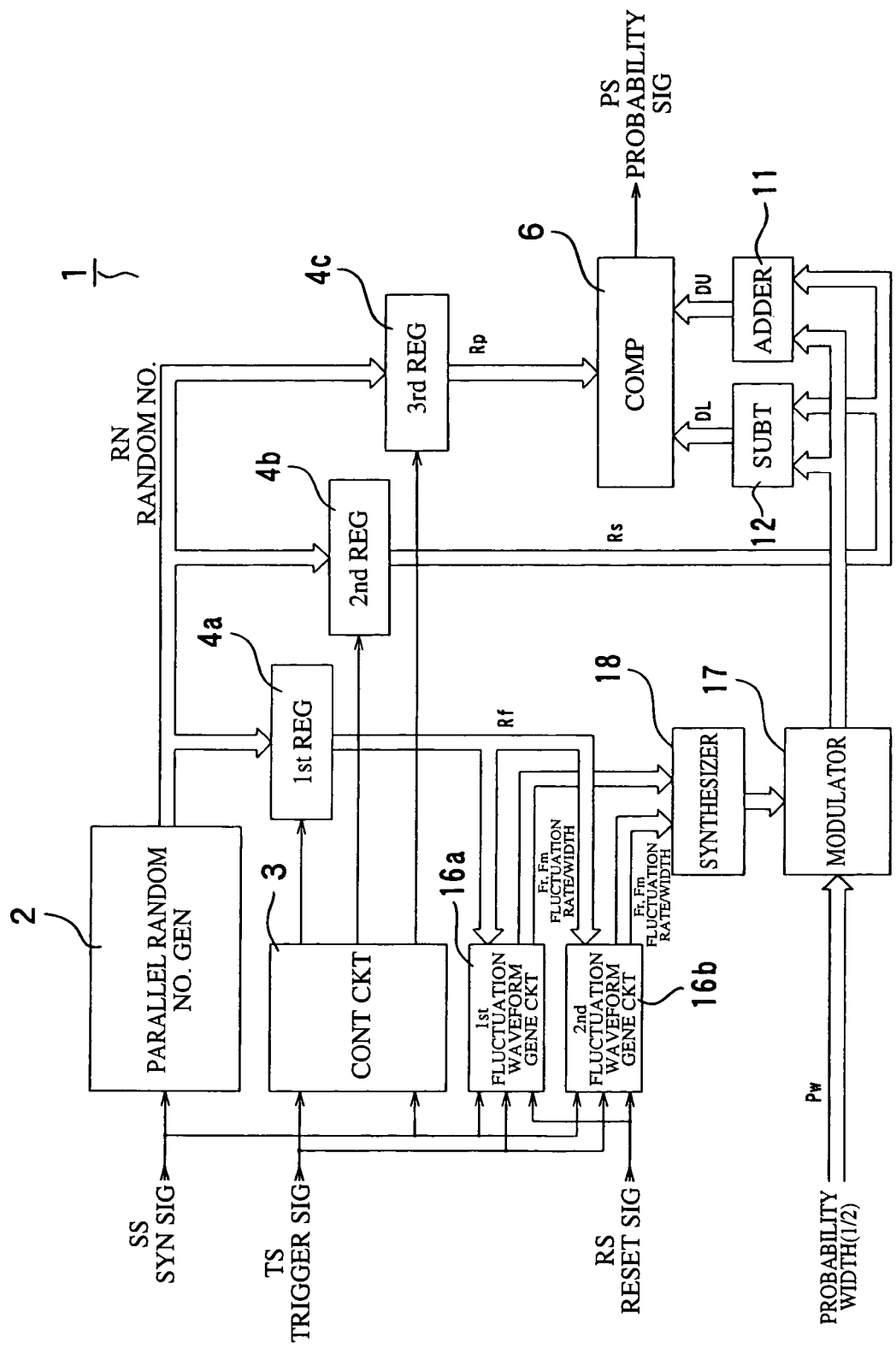
FIG. 83 is a graph showing a probability variation made by a probability generating apparatus according to a tenth embodiment of the present invention.

First, the preferred embodiments of the present invention include a first embodiment (FIGS. 1 to 18), a second embodiment (FIGS. 19 to 51), a third embodiment (FIGS. 53 to 55), a fourth embodiment (FIG. 56), a fifth embodiment (FIGS. 57 to 63), a sixth embodiment (FIGS. 64 to 67), a seventh embodiment (FIGS. 68 and 69), an eighth embodiment (FIGS. 70 and 71), a ninth embodiment (FIGS. 72 to 82), and a tenth embodiment (FIG. 83).

As already described, a common probability generating apparatus uses a random number corresponding to a timing for generation of a trigger signal, as data for generation of probability. Accordingly, the common probability generating apparatus is disadvantageous in that it allows users to unfairly determine the timing easily. The present invention solves this problem by, for example, (1) using a random number that can never be synchronized with the trigger signal, as data for generation of probability or (2) sequentially varying the position at which range data is set, within a probability setting range to vary win data contained in the data for generation of probability, or merging these steps, to offer unexpectedness and an excellent unfair-act preventing function.

With reference to FIGS. 1 to 18, the measures in item (1) will be described as a first embodiment of the present invention.

Basically, a probability generating apparatus 1 according to the present invention comprises a parallel random number generator 2, a control circuit 3, a register 4, a shift register 5, a comparator 6, a counter 7, a scramble circuit 8, a selector 9, an adder 11, a subtractor 12, and the like. In the drawings, alphabets added to reference numerals denote a first, second, and third devices with the same name. For example, reference numeral 6 denotes the comparator, so that for example, reference numerals 6a, 6b, . . . designate a first comparator, a second comparator, . . . , respectively.

Figure 1:
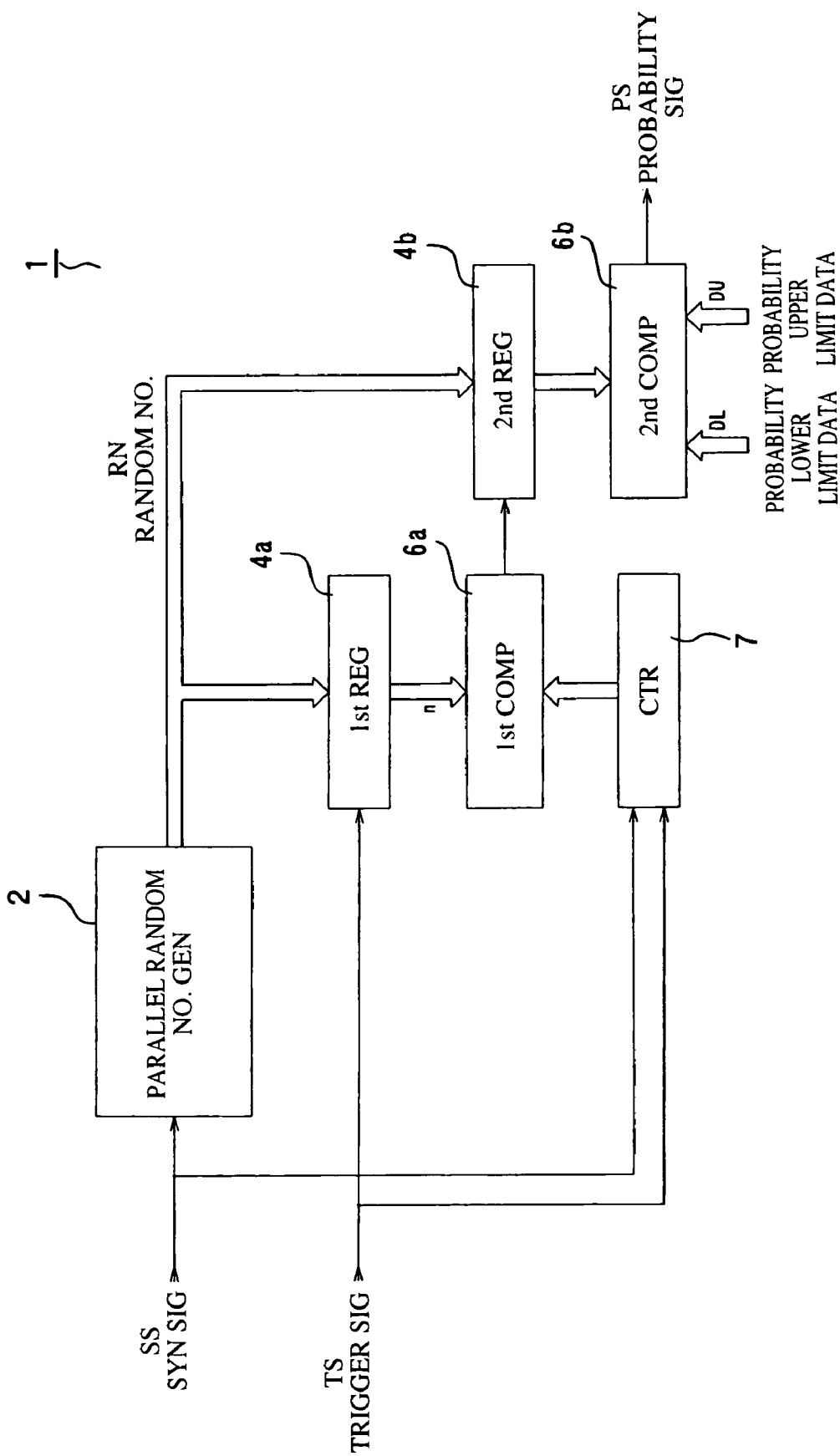
FIG. 1 is a diagram showing the configuration of a probability generating apparatus according to a first embodiment of the present invention.
Figure 2:
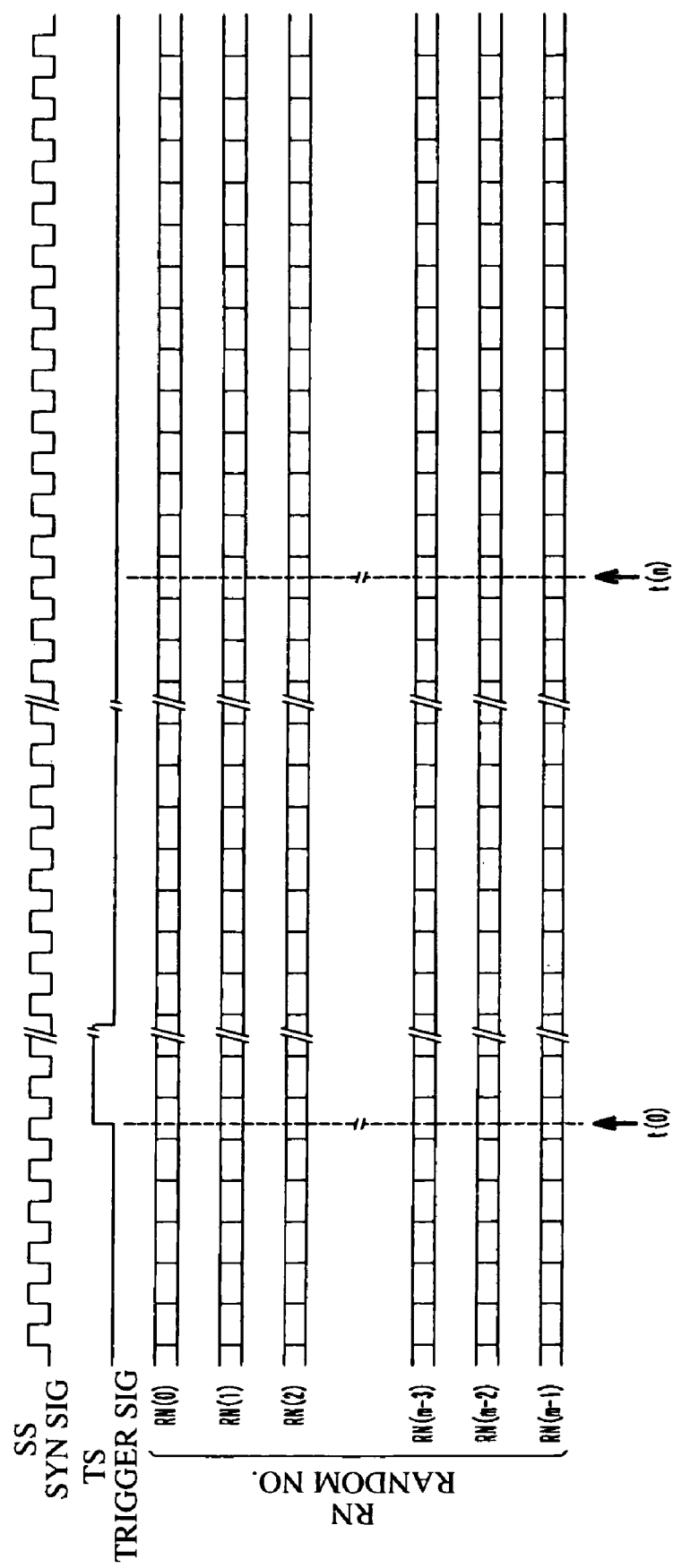
FIG. 2 is a timing waveform diagram of the probability generating apparatus in FIG. 1.

First, the embodiment shown in FIGS. 1 and 2 is an example in which the parallel random number generator 2 offers uniformity and generates consecutive random numbers RN each composed of consecutive n bits RN(0) to RN(n-1), in synchronization with a synchronous signal SS (for example, in the present embodiment, the synchronous signal SS is a 10-MHz clock pulse). In this example, of the random number RN corresponding to a time t(0) when a trigger signal TS is generated, data (n) composed of some bits (for example, lower 8 bits) is used to set the (n)-th random number from the trigger signal TS which number corresponds to a time t(n), as data for generation of probability.

Specifically, the first comparator 6a compares a set data value (n) in a first register 4a with a count in the counter. A comparison output (match output) from the first comparator 6a operates as the trigger signal TS to set a random number for generation of probability in a second register 4b. Thus, data for generation of probability is generated. Then, a second comparator 6b compares the data for generation of probability with range data composed of probability lower limit data DL and probability upper limit data DU. A comparison output from the second comparator 6b is a probability signal PS.

With the probability generating apparatus 1, the data for generation of probability is the random number RN generated the time t(n) after the time t(0) when the trigger signal is generated. Furthermore, the data (n) varies every time the trigger signal TS is generated, and is indeterminate. It is thus virtually impossible to determine a timing for committing an unfair act such as an unfair external read of data. Thus, sufficient unexpectedness and a sufficient unfair-act preventing function are offered. Reference numeral 7 denotes a counter.

Figure 3:
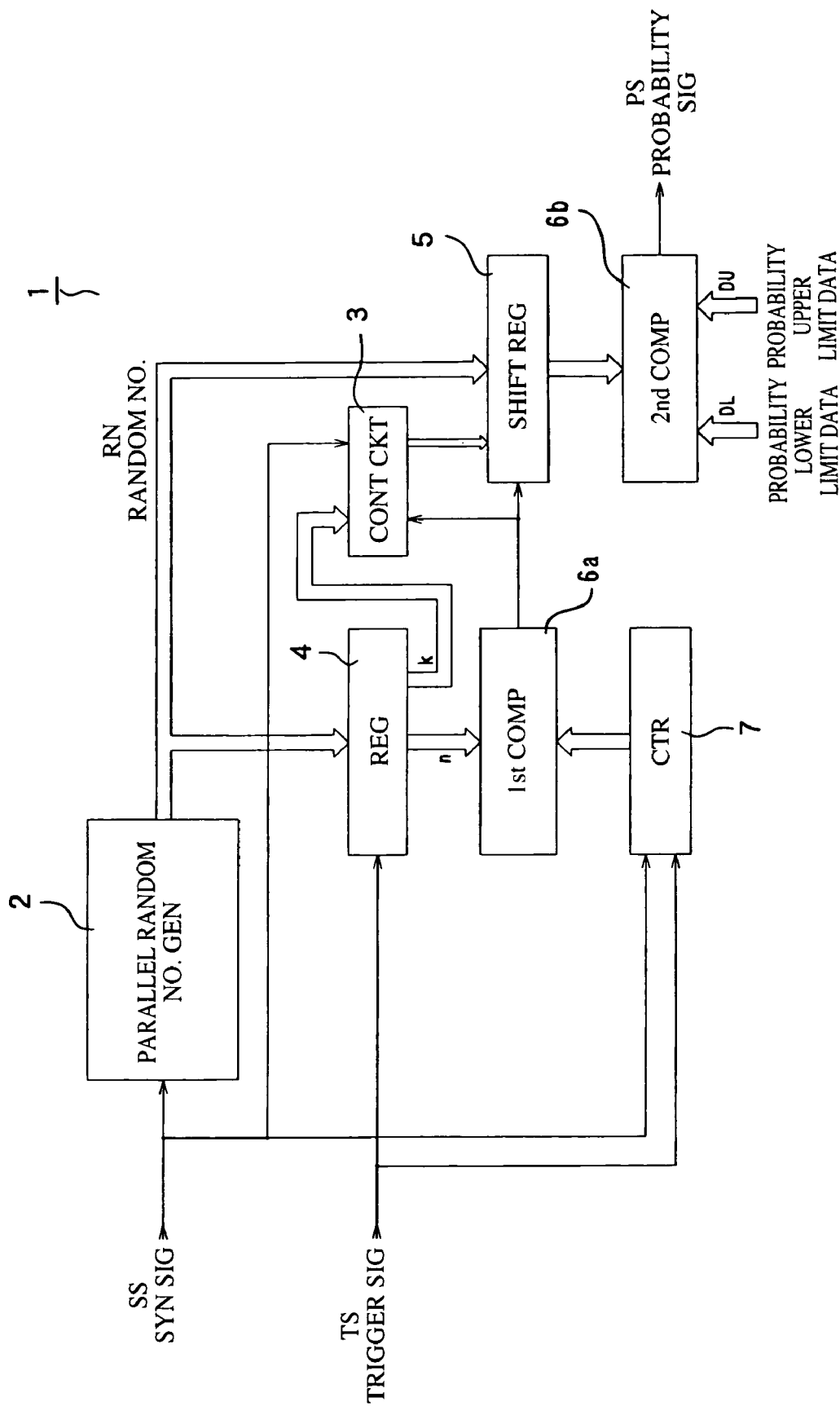
FIG. 3 is a diagram showing the configuration of the probability generating apparatus according to the first embodiment of the present invention, the configuration being different from that shown in FIG. 1.
Figure 4:
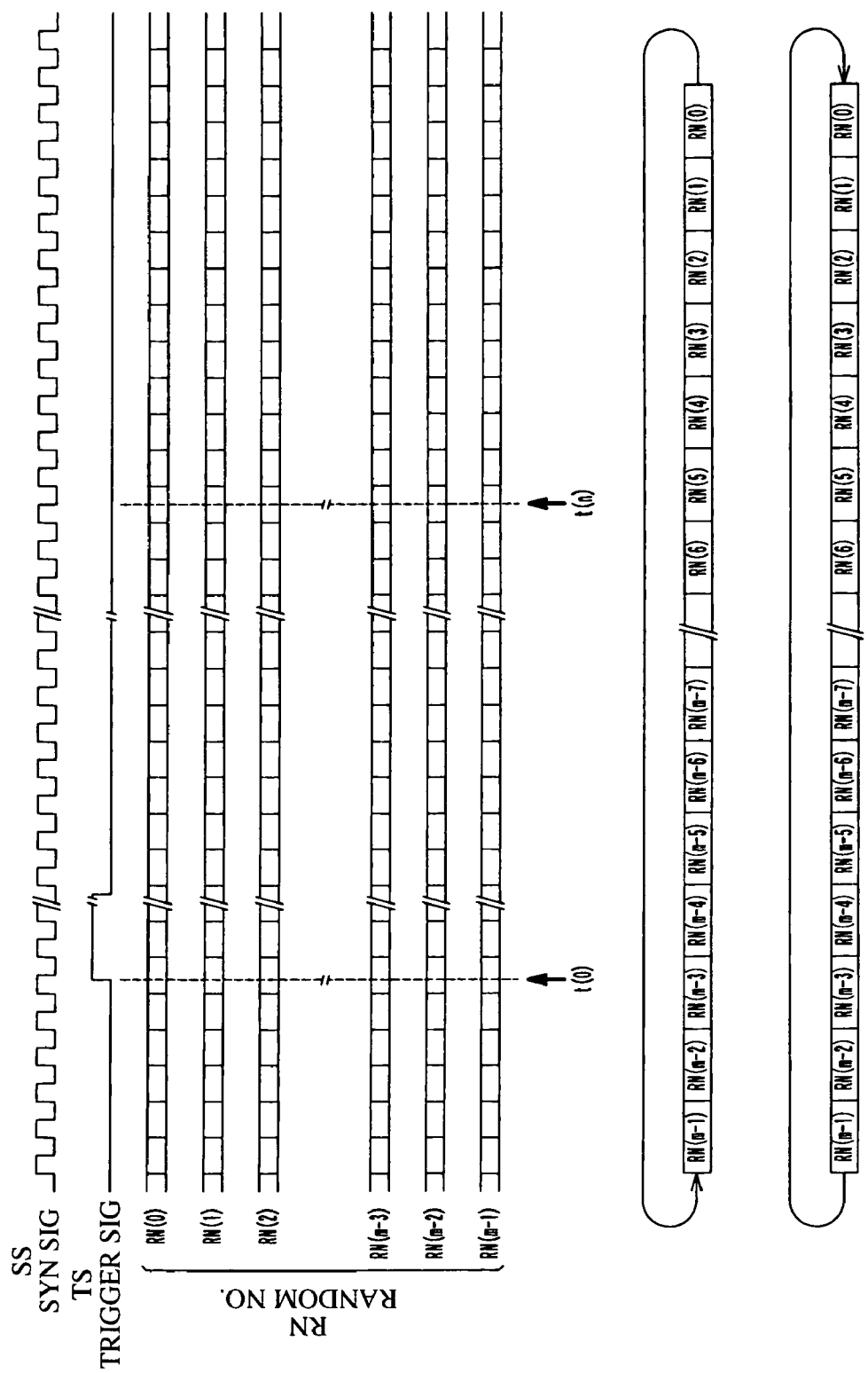
FIG. 4 is a timing waveform diagram of the probability generating apparatus in FIG. 3.

The embodiment shown in FIGS. 3 and 4 is an example in which of the random number RN corresponding to the time t(0) when the trigger signal is generated, data (n) composed of some bits (for example, lower 8 bits) and data (k) composed of some bits (for example, upper 5 bits) are used to rotate the n-th random number RN from the one corresponding to the time t(0) which number corresponds to the time t(n) when the trigger signal is generated, on the basis of the data (k). Thus, data for generation of probability is obtained.

Here, the control circuit 3 utilizes predetermined bits of the set data (k) in the register 4 to determine the direction and speed of the data rotation. The control circuit 3 uses the timing t(n) to control the shift direction and number of the random number data set in the shift register 5.

For example, the right shift/left shift operation of the shift register 5 is set depending on the state (1 or 0) of the most or least significant bit of the data k. The shift number is set on the basis of the number of remaining bits in the data k.

With the probability generating apparatus 1, uniform random numbers remain uniform even after the data has been rotated (shifted). This enhances the unexpectedness and the unfair-act preventing function.

Figure 5:
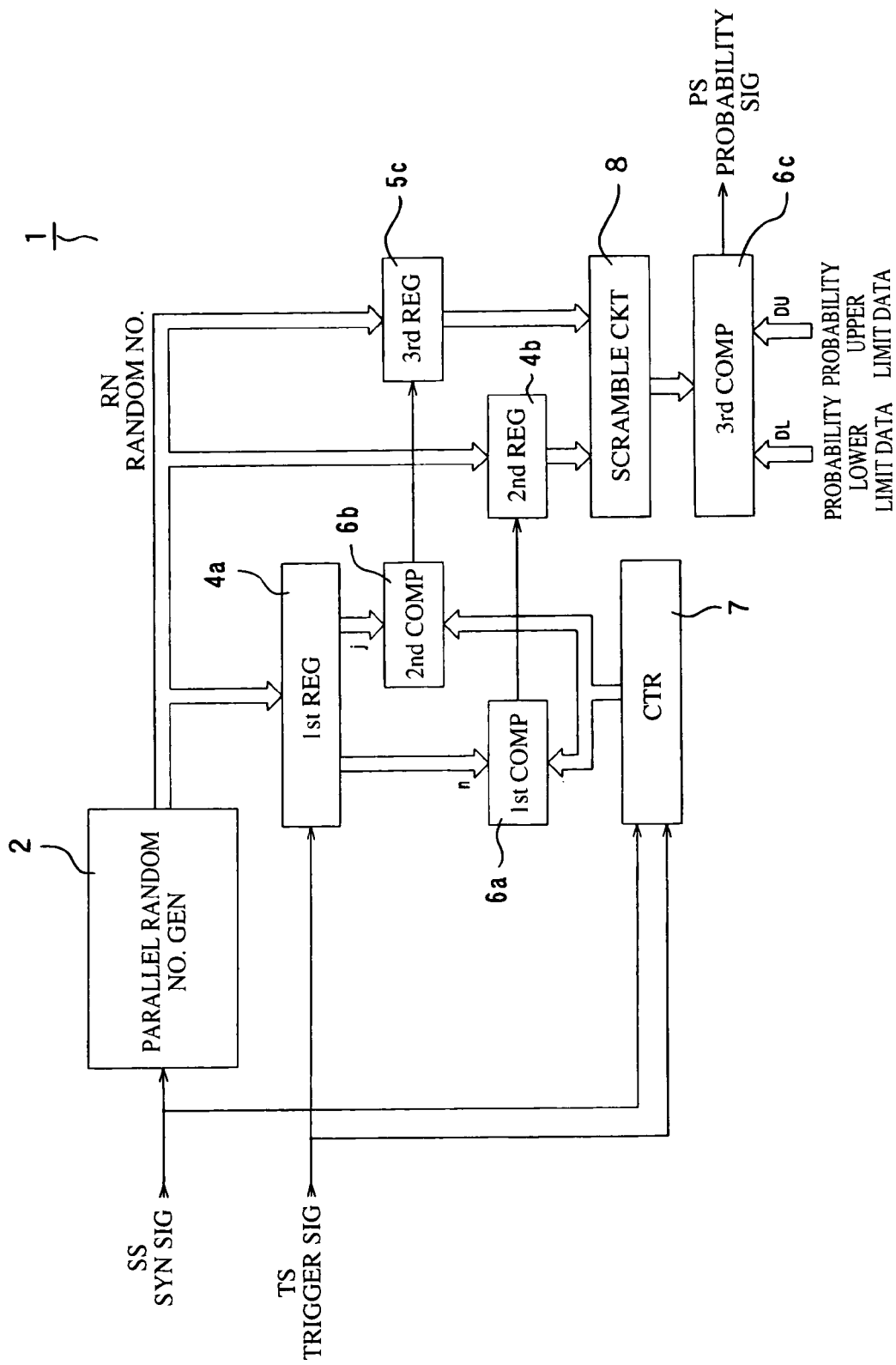
FIG. 5 is a diagram showing the configuration of the probability generating apparatus according to the first embodiment of the present invention, the configuration being different from that shown in FIG. 3.
Figure 6:
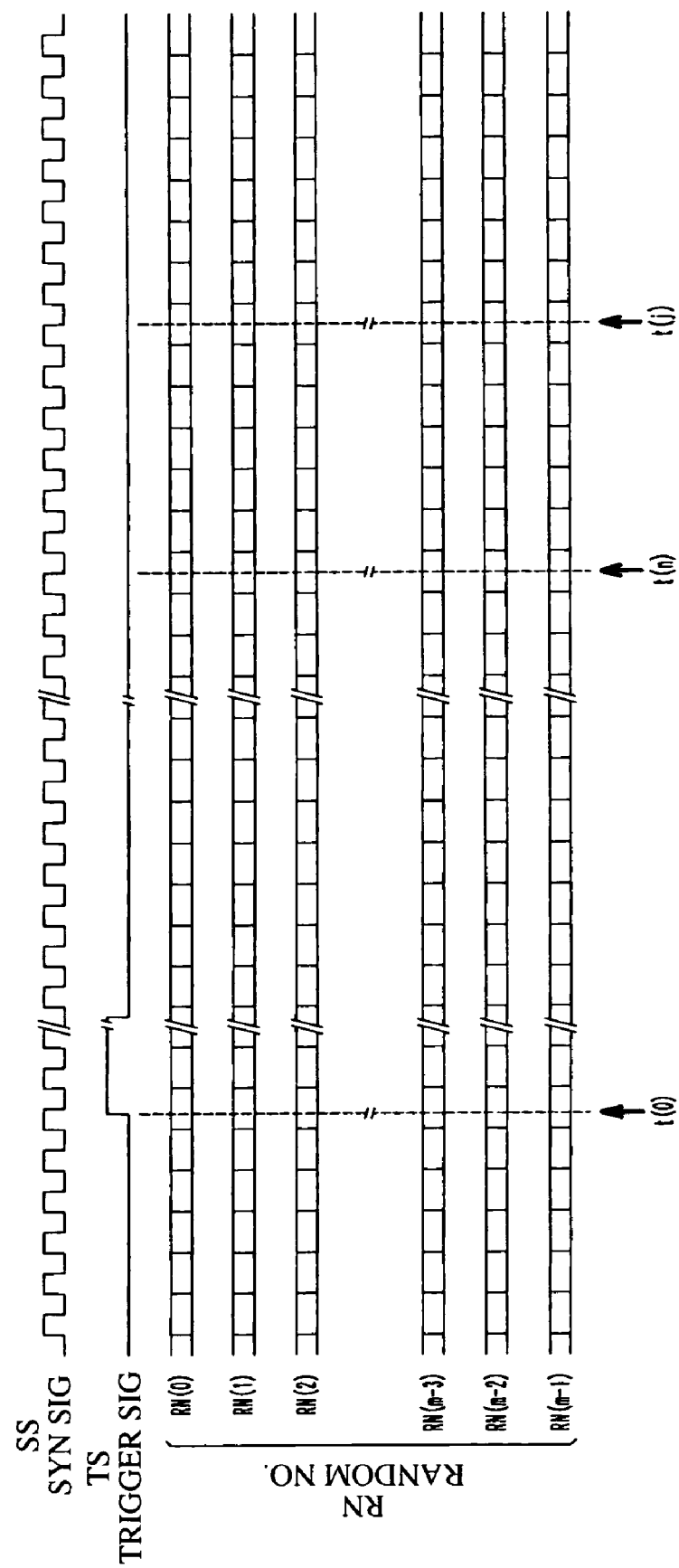
FIG. 6 is a timing waveform diagram of the probability generating apparatus in FIG. 5.

The embodiment shown in FIGS. 5 and 6 is an example in which of the random number corresponding to the time t(0) when the trigger signal is generated, data (n) composed of some bits (for example, lower 8 bits) and data (j) composed of some bits (for example, upper 8 bits) are used to scramble the n-th random number from the trigger signal TS which number corresponds to the time t(n) and the j-th random number from the trigger signal TS which number corresponds to a time t(j). Thus, data for generation of probability is obtained.

The scramble circuit 8 executes a logical calculation (for example, a logical OR or a logical OR of two other logical ORs) on the random number data set in the second register 4b at the time t(n) and the random number data set in a third register 4c at the time t(j), to convert these data into a data row totally different from the original data.

With the probability generating apparatus 1, even after uniform random numbers RN have been scrambled, the data obtained remains uniform. This enhances the unexpectedness and the unfair-act preventing function.

Figure 7:
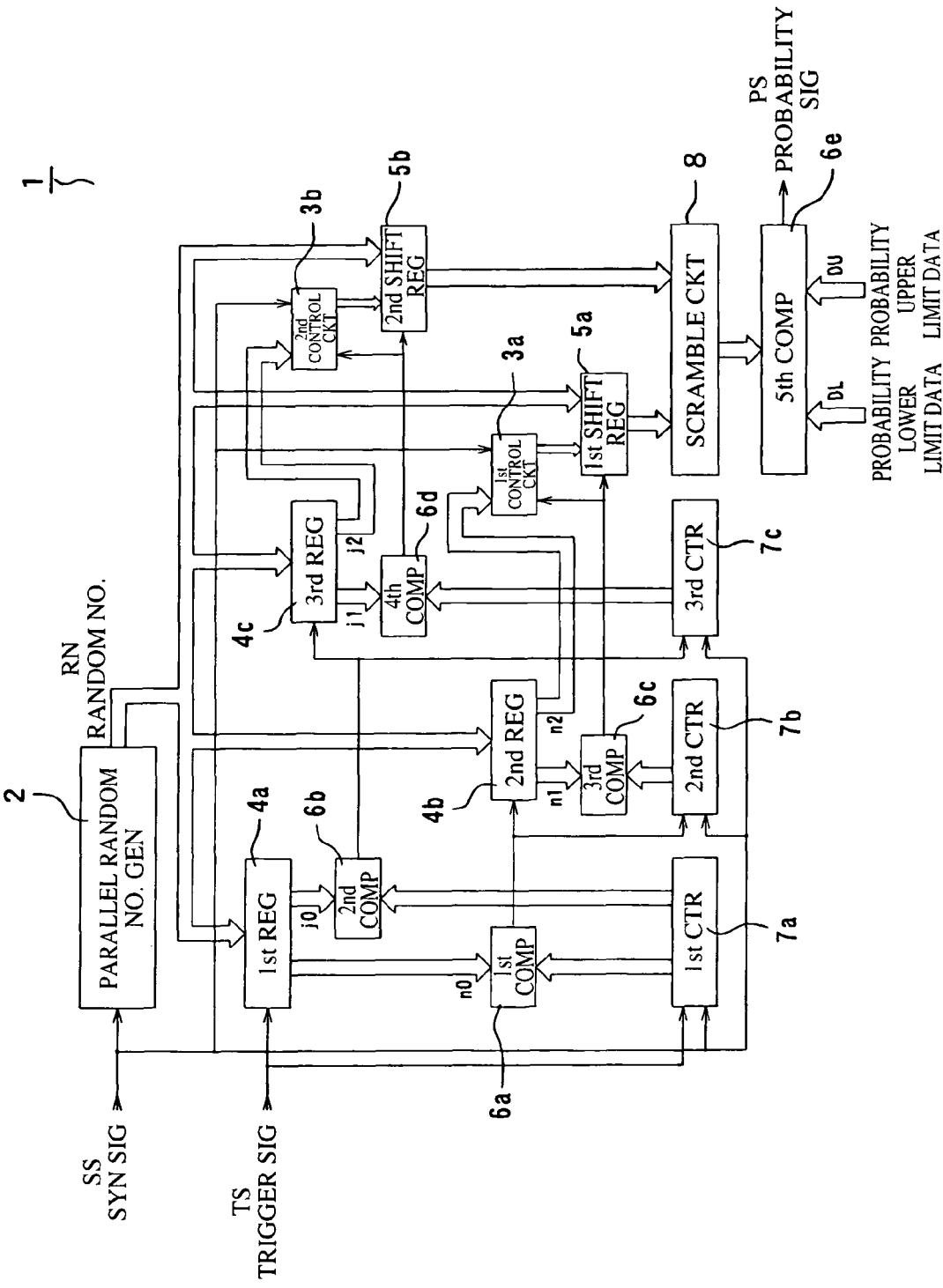
FIG. 7 is a diagram showing the configuration of the probability generating apparatus according to the first embodiment of the present invention, the configuration being different from that shown in FIG. 5.
Figure 8:
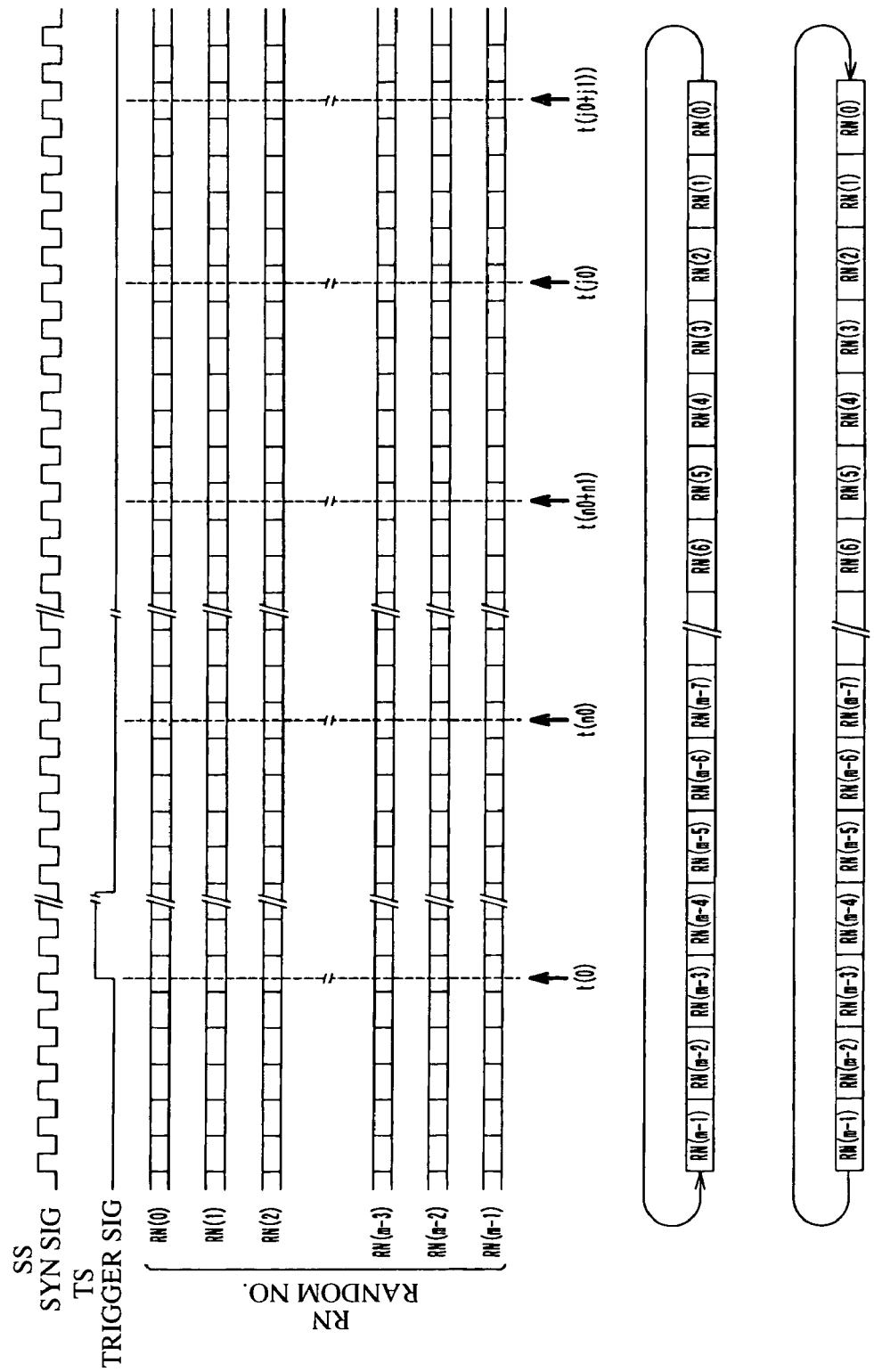
FIG. 8 is a timing waveform diagram of the probability generating apparatus in FIG. 7.

The embodiment shown in FIGS. 7 and 8 is obtained by merging the probability generating apparatuses 1 in FIGS. 3 and 5 with each other. Of the random number RN corresponding to the time t(0) when the trigger signal TS is generated, data (n0) composed of some bits (for example, lower 8 bits) and data (j0) composed of some bits (for example, upper 8 bits) are used to generate data (n1, j1) using, for example, the lower 8 bits, while generating data (n2, j2) using, for example, the upper 5 bits, on the basis of the (n0)-th random number RN from the trigger signal which number corresponds to a time t(n0) and the (j0)-th random number RN from the trigger signal which number corresponds to a time t(j0). Then, the data (n1, j1) and the data (n2, j2) as well as a rotating direction and a rotation length set on the basis of the data (n2, j2) are used to rotate the (n0+n1)-th random number RN from the trigger signal TS which number corresponds to a time t(n0+n1) and the (j0+j1)-th random number RN from the trigger signal TS which number corresponds to a time t(j0+j1). Then, the rotated random numbers are scrambled to obtain data for generation of probability.

Figure 9:
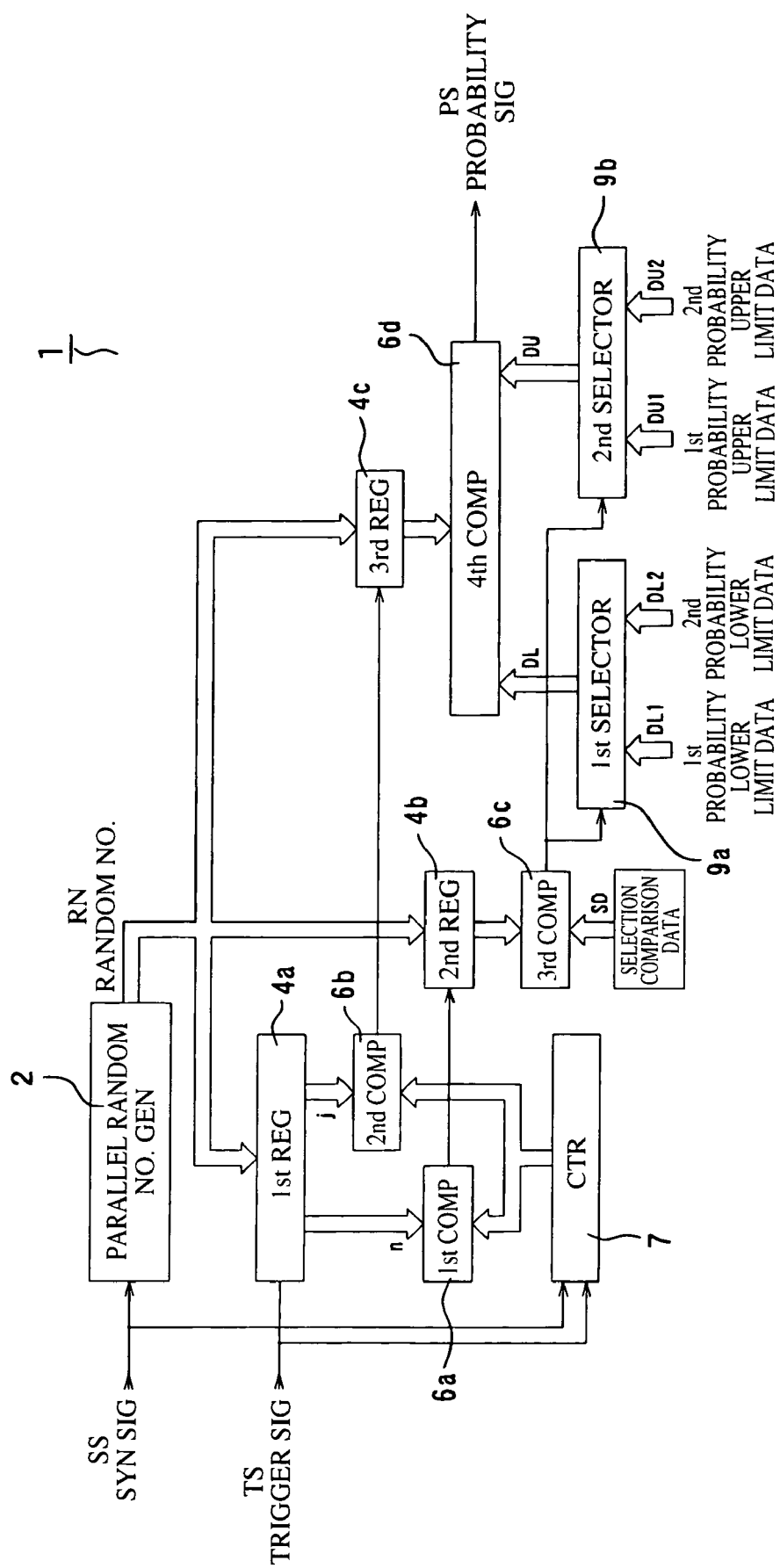
FIG. 9 is a diagram showing the configuration of the probability generating apparatus according to the first embodiment of the present invention, the configuration being different from that shown in FIG. 7.
Figure 10:
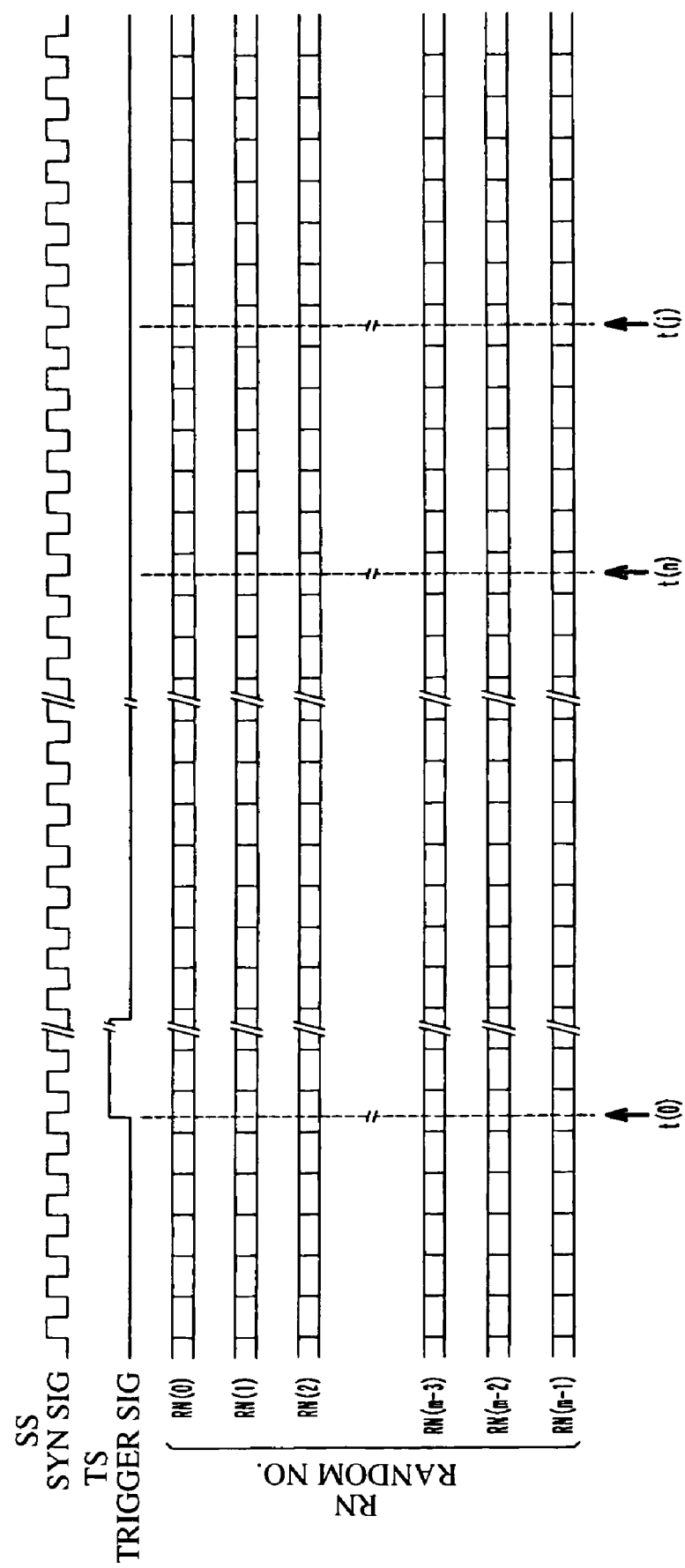
FIG. 10 is a timing waveform diagram of the probability generating apparatus in FIG. 9.

The embodiment shown in FIGS. 9 and 10 is an example in which of the random number RN corresponding to the time t(0) when the trigger signal TS is generated, the data (n) composed of some bits (for example, lower 8 bits) and the data (j) composed of some bits (for example, upper 8 bits) are used to set the (j)-th random number from the trigger signal TS which number corresponds to the time t(j), as data for generation of possibility. Then, changeable preset selection comparison data (SD) is compared with the (n)-th data from the trigger signal TS which number corresponds to the time t(n). On the basis of a comparison output, a first selector 9a and a second selector 9b cooperatively select one of changeable preset two sets of probability upper limit data (DU1, DU2) and probability lower limit data (DL1, DL2). Thus, a data range specified by the selected probability upper limit data DU and probability lower limit data (DL) is set as range data for generation of probability.

Specifically, the probability is determined by the data for generation of probability and the range data for comparison. However, in the present embodiment, the probability lower limit data and probability upper limit data specifying the range data vary between the two sets of values depending on the comparison output (L/H) from the third comparator. As a result, a probability signal is obtained by synthesizing two types of probability values. Furthermore, the percentages of the total probability signal taken up by the probability values can be arbitrarily varied by the selection comparison data SD. The probability lower limit data (DL1, DL2) and the probability upper limit data (DU1, DU2) can also be varied.

Thus, with the probability generating apparatus 1, timings for generating data for generation of probability are indeterminate as in the case with the above embodiment. Furthermore, generated win data is variable, thus further enhancing the unexpectedness.

With the probability generating apparatus 1 described above in FIGS. 1 to 10, although not shown in the drawings, the data for generation of probability may be inverted in accordance with the contents of the random number (for example, the 1/0 state of a predetermined bit) corresponding to the time t(0) when the trigger signal is generated. The inverted data may then be set as data for generation of probability. The inverted data for generation of probability also offers uniformity.

In the probability generating apparatus shown below, a random number generating section 10 is newly added to the already described probability generating apparatus 1 offering uniformity and offering enhanced unexpectedness and an excellent unfair-act preventing function. Thus, in addition to the probability signal PS, random number data RND is outputted and used for a win mode, a flower pattern, or a probability variation for game machines or the like. The random number data is also uniform and offers enhanced unexpectedness and an excellent unfair-act preventing function.

This embodiment will be described below. As shown in the figure, the random number generating section 10 comprises a control circuit 13, a register 14, a shift register 15, a comparator 16, and a counter 17. Also in this case, alphabets a, b, and c added to the same reference numeral indicate a first, second, and third pieces of equipment with the same name.

Figure 11:
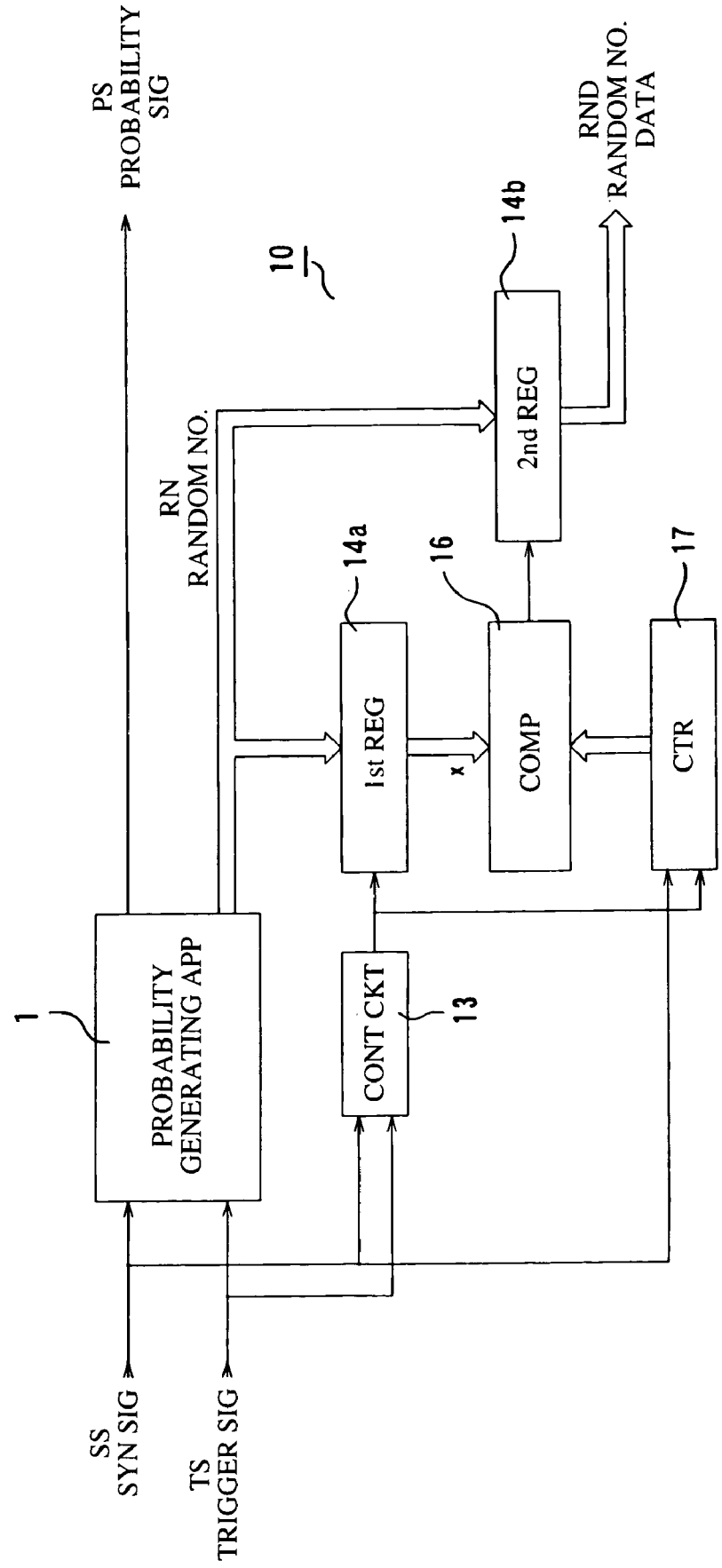
FIG. 11 is a diagram showing the configuration of the probability generating apparatus according to the first embodiment of the present invention, the configuration being different from that shown in FIG. 9.
Figure 12:
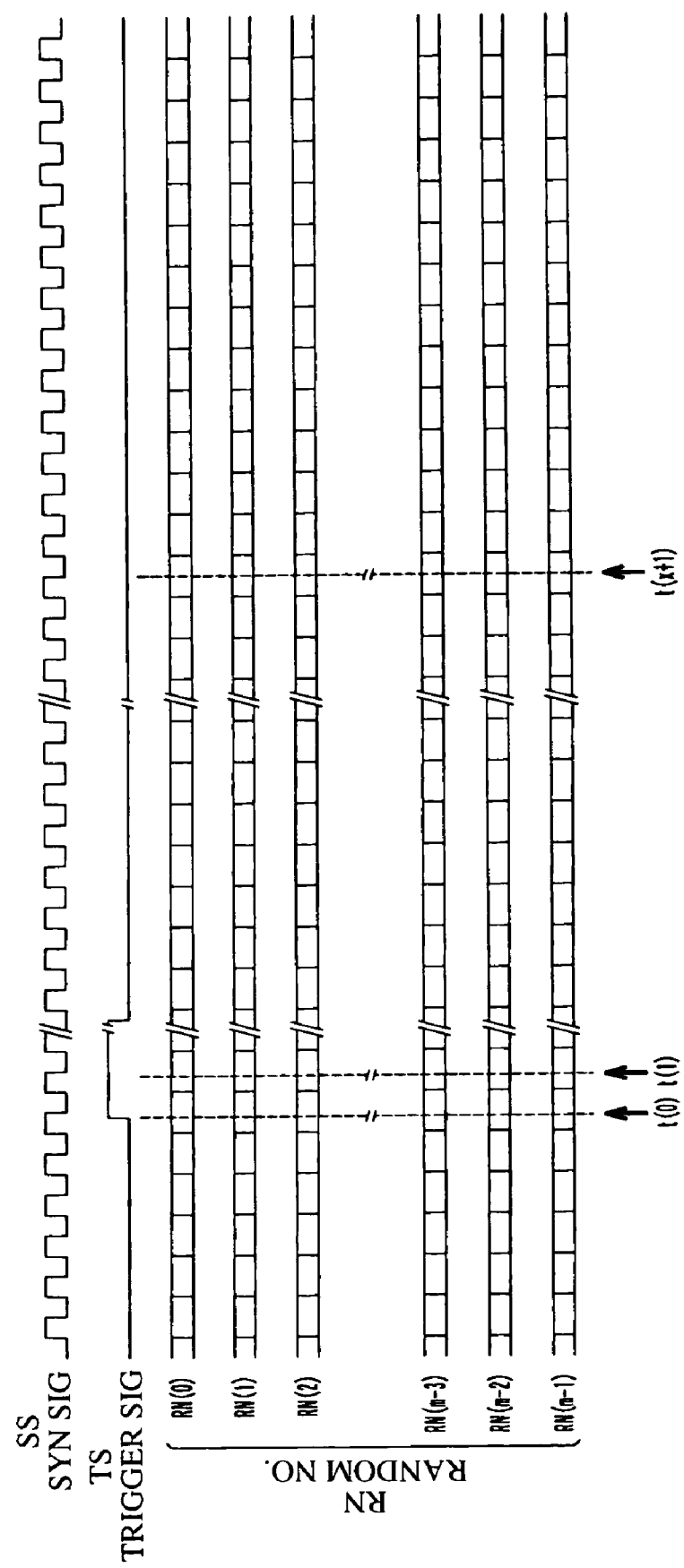
FIG. 12 is a timing waveform diagram of the probability generating apparatus in FIG. 11.

First, the random number generating section 10 shown in FIGS. 11 and 12 has a configuration similar to that of the section of probability generating apparatus 1 shown in FIG. 1 which section generates data for generation of probability. In this example, using data (x) generated on the basis of, for example, the lower 8 bits of the random number next to the trigger signal which number corresponds to a time t(1), the (x+1)-th random number data RND from the trigger signal t(0) which data corresponds to a time t(x+1) is outputted together with the probability signal PS.

The present embodiment differs from FIG. 1 in that a control circuit 13 to which the synchronous signal SS and the trigger signal TS are inputted is newly added in order to obtain a timing (i.e. output timing of the random number data) for the time t(1) succeeding the trigger signal TS. However, the other operations of the present embodiment are exactly the same as those of the preceding embodiment.

Figure 13:
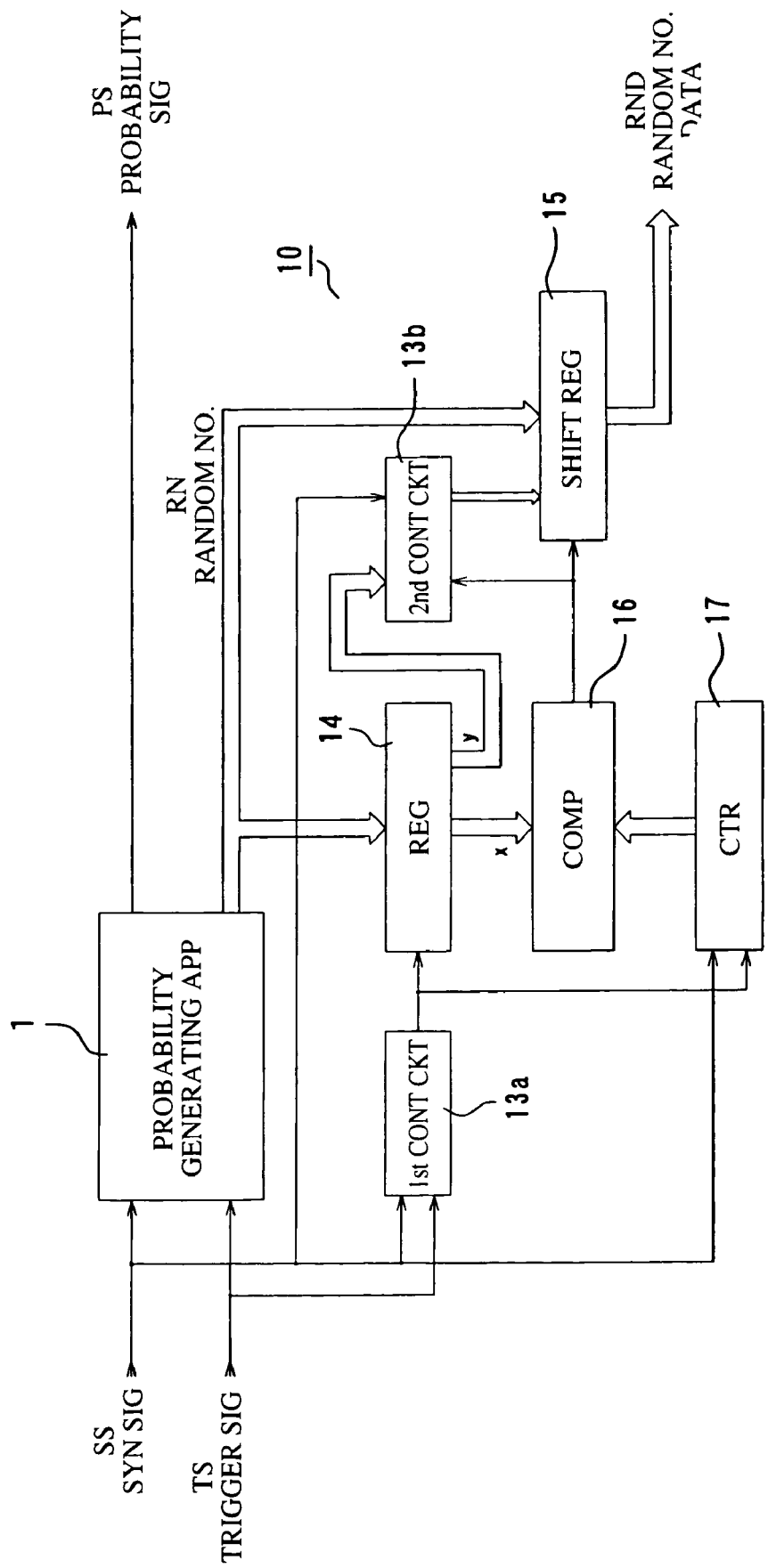
FIG. 13 is a diagram showing the configuration of the probability generating apparatus according to the first embodiment of the present invention, the configuration being different from that shown in FIG. 11.
Figure 14:
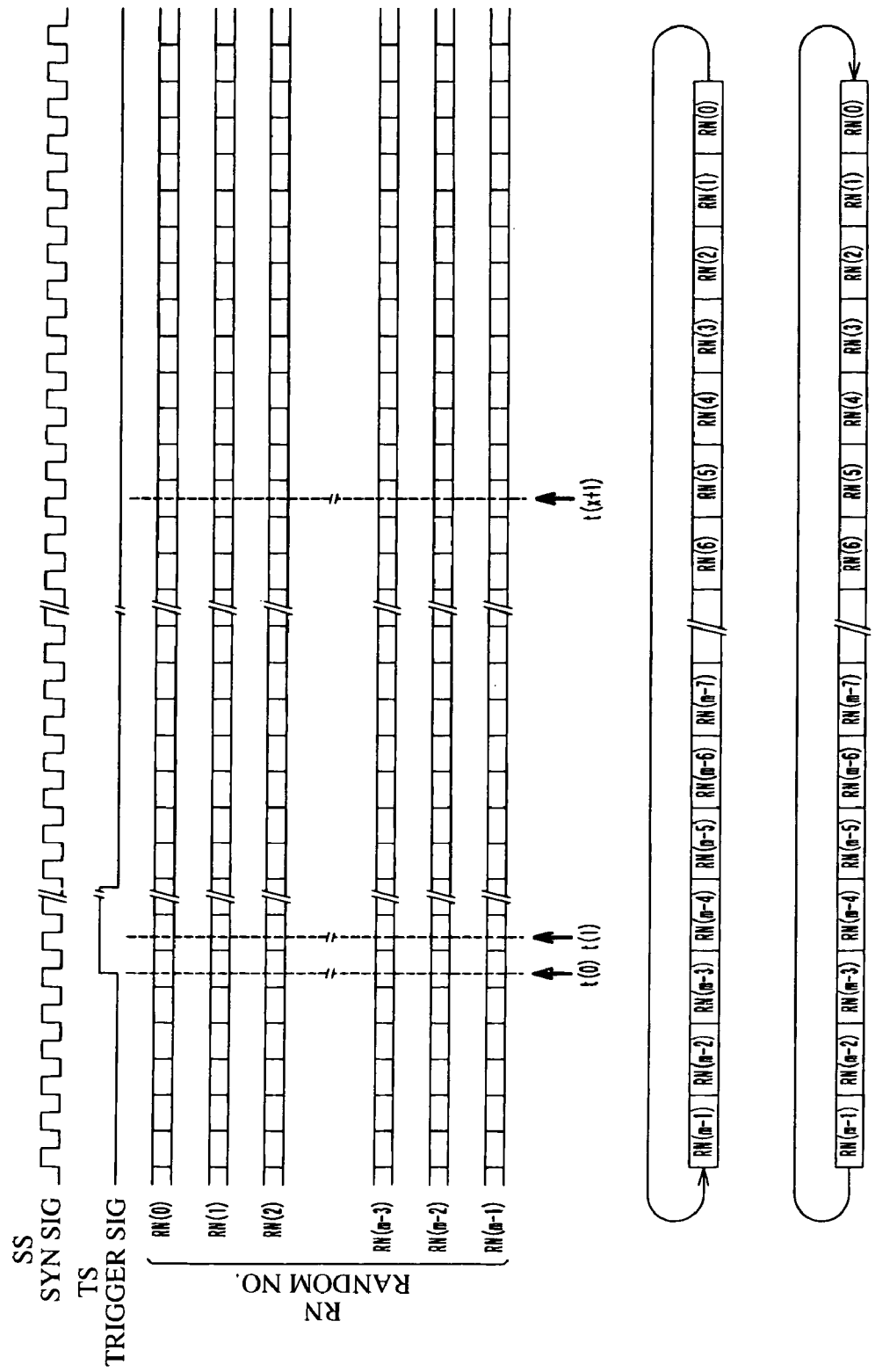
FIG. 14 is a timing waveform diagram of the probability generating apparatus in FIG. 13.

The random number generating section 10 shown in FIGS. 13 and 14 has a configuration similar to that of the section of probability generating apparatus 1 shown in FIG. 3 which section generates data for generation of probability, except for the addition of a first control circuit 13a that controls the timing for the trigger signal TS. In this example, using data (x) generated on the basis of, for example, the lower 8 bits of the random number RN succeeding the trigger signal which number corresponds to the time t(1) and data (y) generated on the basis of, for example, the upper 5 bits, the (x+1)-th random number from the trigger signal t(0) which number corresponds to the time t(x+1) is rotated using a rotating direction and a rotation length set on the basis of the data (y). The data obtained is outputted as random number data RND.

Figure 15:
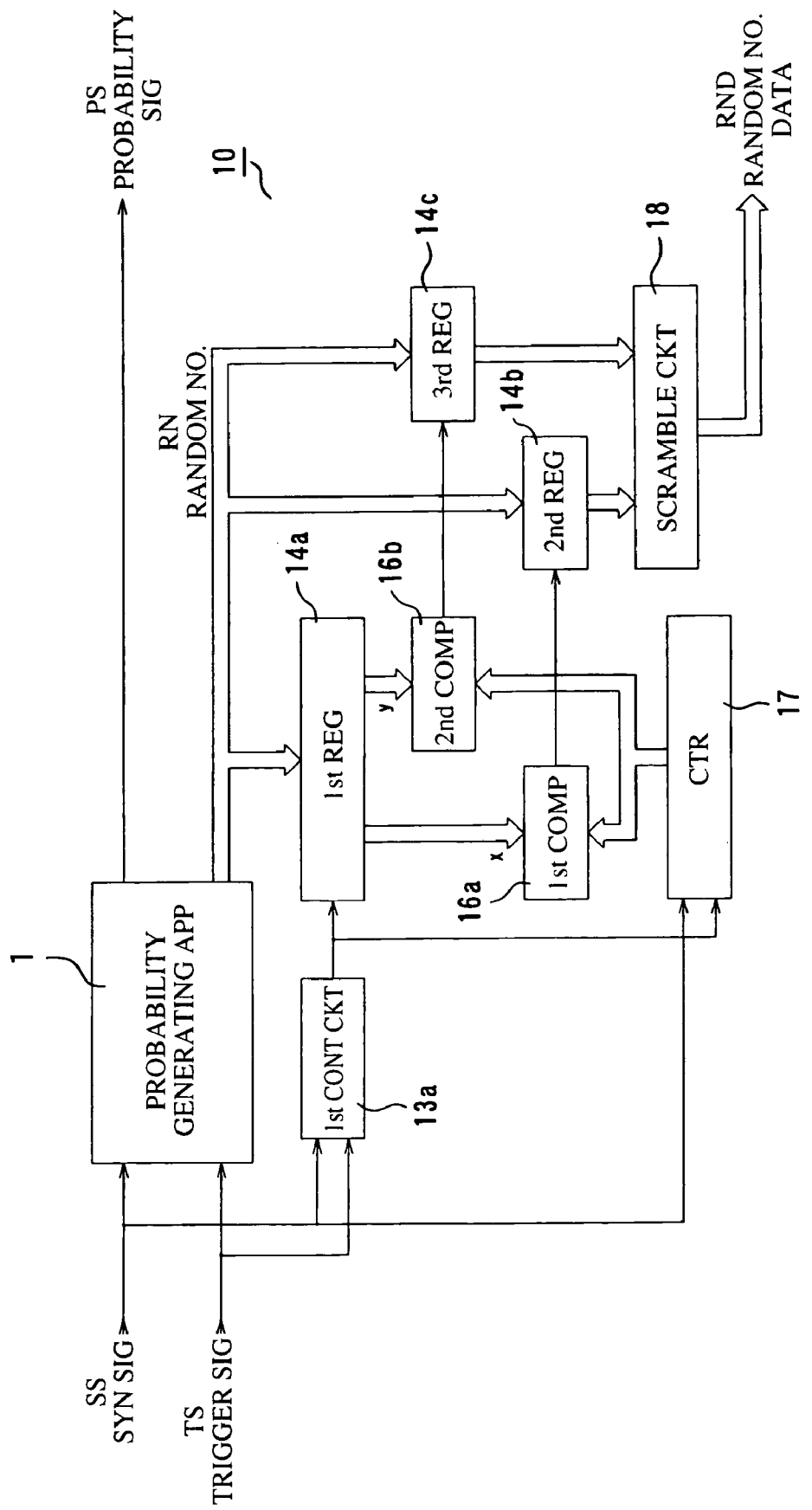
FIG. 15 is a diagram showing the configuration of the probability generating apparatus according to the first embodiment of the present invention, the configuration being different from that shown in FIG. 13.
Figure 16:
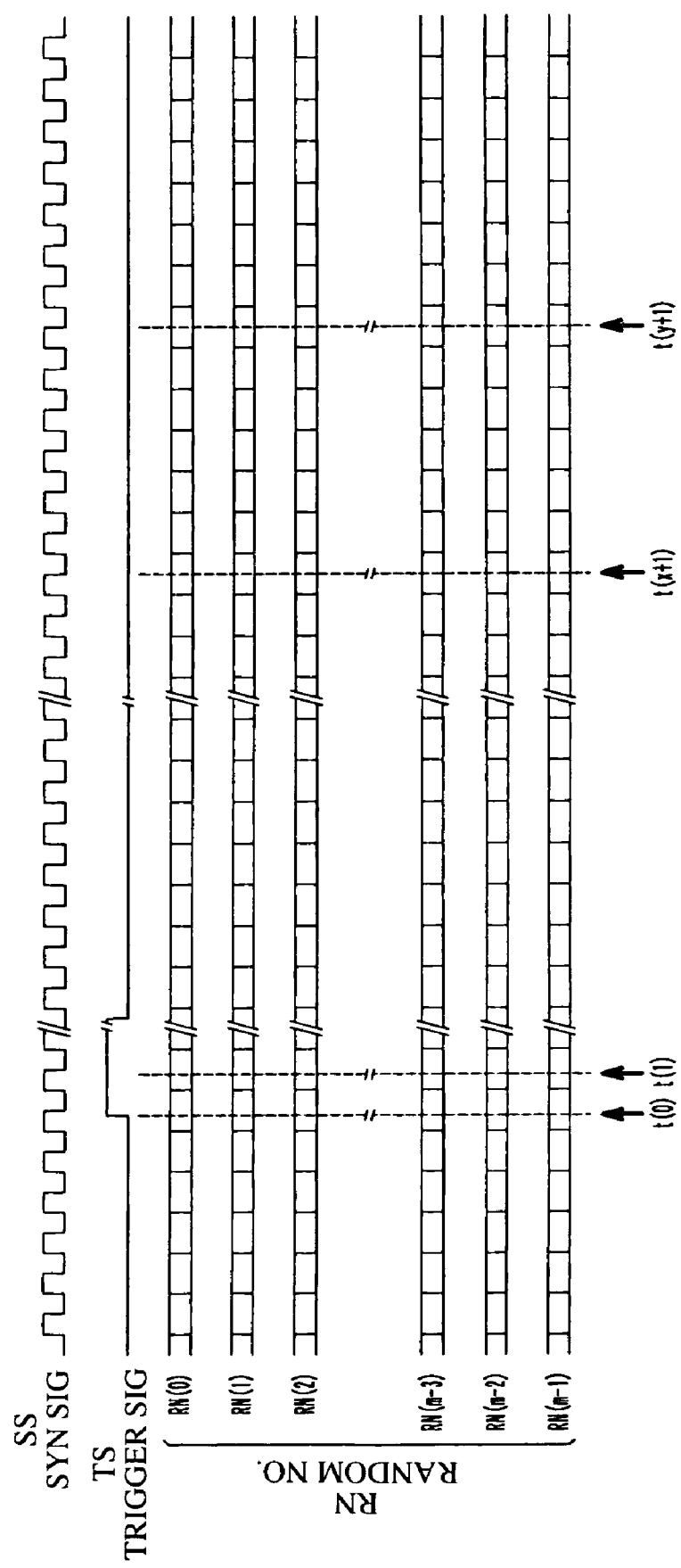
FIG. 16 is a timing waveform diagram of the probability generating apparatus in FIG. 15.

The random number generating section 10 shown in FIGS. 15 and 16 has a configuration similar to that of the section of probability generating apparatus 1 shown in FIG. 5 which section generates data for generation of probability, except for the addition of the first control circuit 13a. In this example, using the data (x) generated on the basis of, for example, the lower 8 bits of the random number RN succeeding the trigger signal TS which number corresponds to the time t(1) and the data (y) generated on the basis of, for example, the upper 5 bits is obtained by scrambling the (x+1)-th random number RN from the trigger signal t(0) which number corresponds to the time t(x+1) and the (y+1)-th random number RN from the trigger signal t(0) which number corresponds to the time t(y+1). In the figures, reference numeral 18 denotes a scramble circuit.

Figure 17:
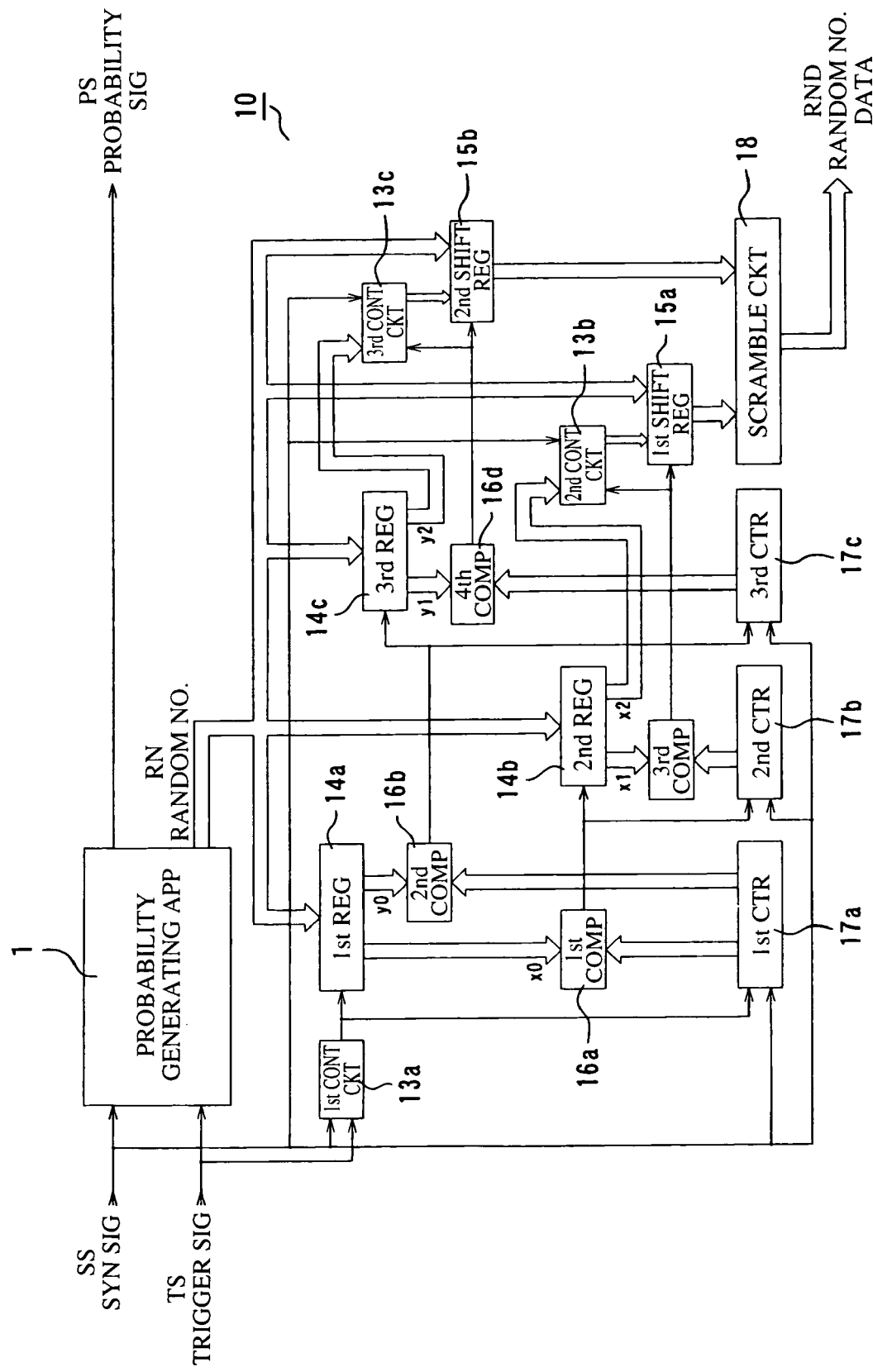
FIG. 17 is a diagram showing the configuration of the probability generating apparatus according to the first embodiment of the present invention, the configuration being different from that shown in FIG. 15.
Figure 18:
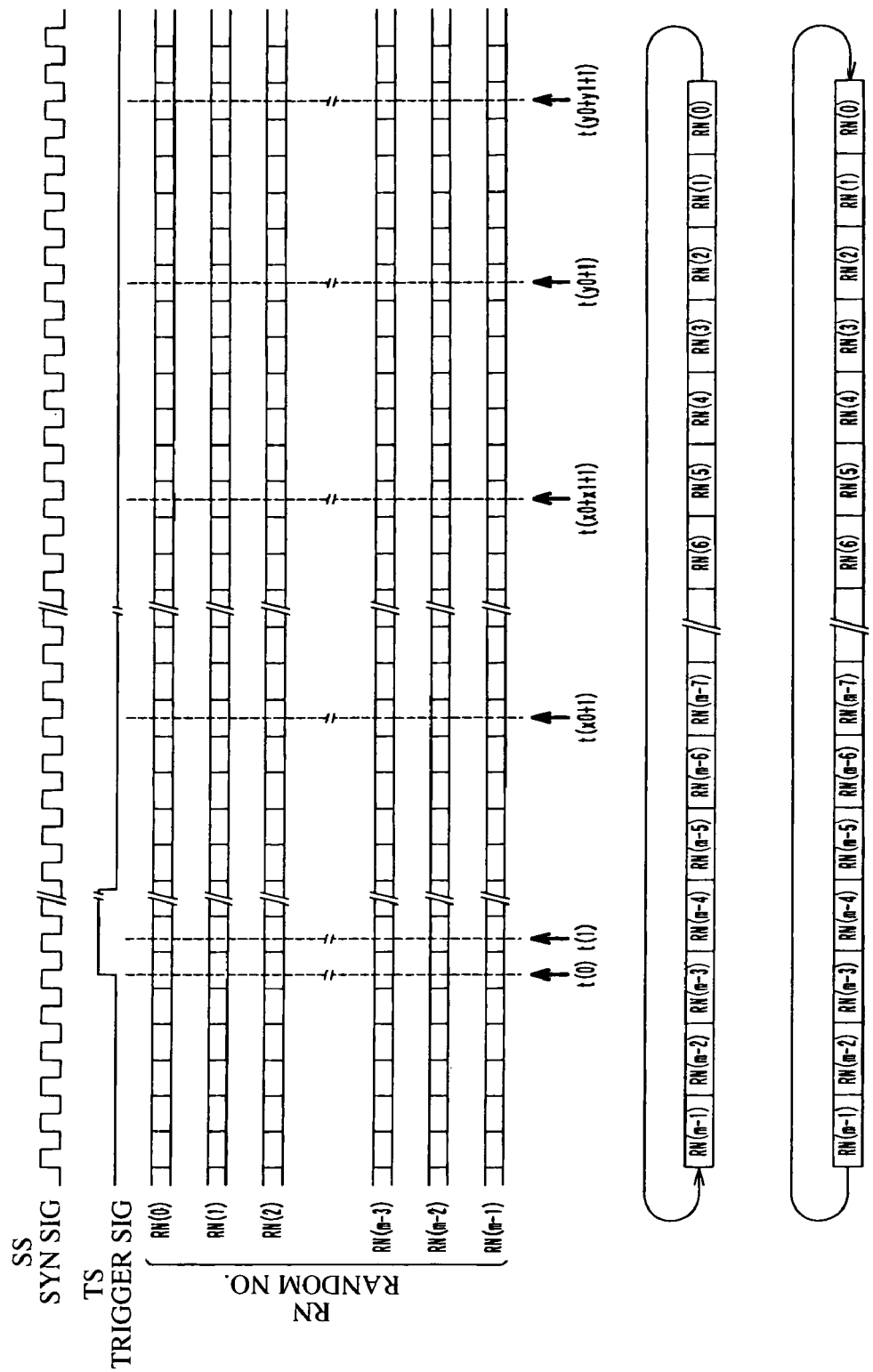
FIG. 18 is a timing waveform diagram of the probability generating apparatus in FIG. 17.

The random number generating section 10 shown in FIGS. 17 and 18 has a configuration similar to that of the section of probability generating apparatus 1 shown in FIG. 7 which section generates data for generation of probability, except for the addition of a first control circuit 13a that controls the timing for the trigger signal TS. In this example, using data (x0) generated on the basis of, for example, the lower 8 bits of the random number RN succeeding the trigger signal TS which number corresponds to the time t(1) and data (y0) generated on the basis of, for example, the upper 8 bits, data (x1, y1) is generated using, for example, the lower 8 bits, while data (x2, y2) is generated using, for example, the upper 5 bits, on the basis of the (x0+1)-th random number RN from the trigger signal t(0) which number corresponds to a time t(x0+1) and the (y0+1)-th random number RN from the trigger signal t(0) which number corresponds to a time t(y0+1). Then, the data (x1, y1) and the data (x2, y2) as well as a rotating direction and a rotation length set on the basis of the data (x2, y2) are used to rotate the (x0+x1+1)-th random number RN from the time t(0) when the trigger signal TS is generated, the random number corresponding to a time t(x0+x1+1), and the (y0+y1+1)-th random number RN from the time t(0) which number corresponds to a time t(y0+y1+1). Then, the rotated random numbers are scrambled to obtain random number data RND.

In the first embodiment, shown in FIGS. 1 to 18, described above, in determining a probability signal and a timing for generating random number data outputted together with the probability signal, the time t(0) when the trigger signal is generated or the succeeding time t(1) is used as the start point. However, the present invention is not limited to this aspect. Although not shown in the drawings, it is of course possible to consider a timing t(0+k) obtained by adding a preset fixed or variable offset value to the timing for generation of the trigger signal, to be a new trigger signal generation timing t(0). Thus the timing for generation of the probability signal PS becomes more indeterminate. This enhances the unexpectedness and the unfair-act preventing function.

Now, with reference to FIGS. 19 to 45, description will be given of a second embodiment of the present invention that offers enhanced unexpectedness and an excellent unfair-act preventing function by sequentially varying the position where range data is set within the probability setting range, to vary win data contained in the data for generation of probability, as already described in item (2).

As shown below, by varying a probability lower limit value Rl, a probability upper limit value Ru, and a value for a probability generation position every time the trigger signal TS is generated, the position where range data is set is sequentially varied to correspondingly vary the win data contained in the random number data for generation of possibility which data provides a specified probability. The resulting probability generating apparatus offers unexpectedness and an excellent unfair-act preventing function. This probability generating apparatus acts as an ideal probability generator for game machines or the like.

Figure 19:
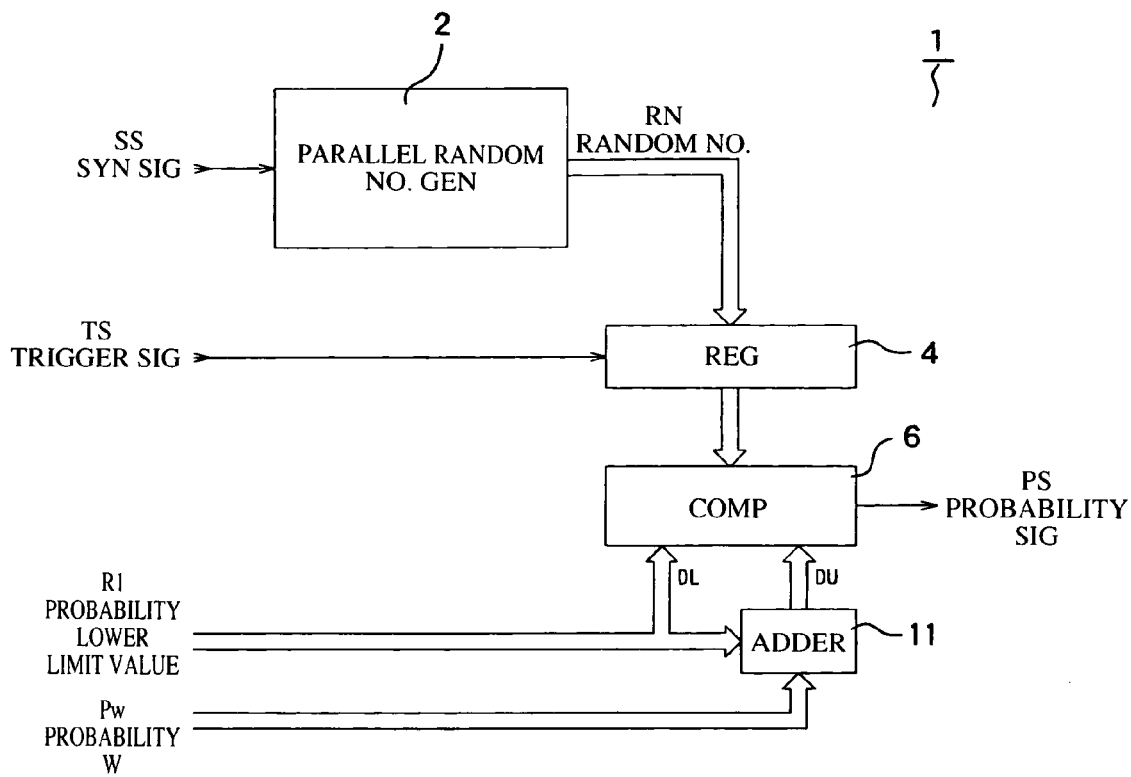
FIG. 19 is a diagram showing the configuration of a probability generating apparatus according to a second embodiment of the present invention.
Figure 20:
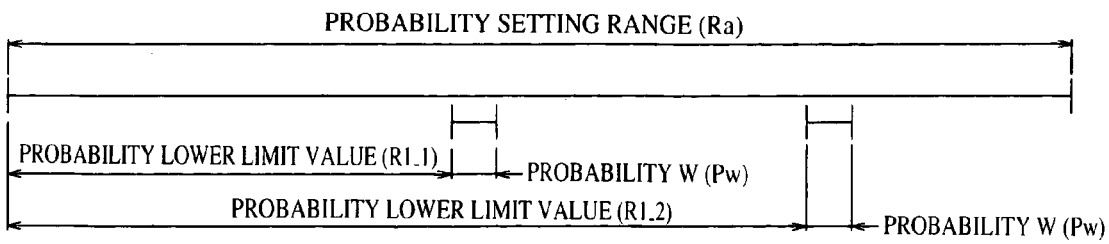
FIG. 20 is a diagram showing the relationship between the probability setting position and probability width of the probability generating apparatus in FIG. 19.

First, the embodiment shown in FIGS. 19 and 20 is similar to the first embodiment in that it uses the parallel random number generator 2 of an n-bit configuration, which has uniformity and generates consecutive random numbers in synchronization with the synchronous signal SS (for example, the synchronous signal in the present embodiment is a 10-MHz clock pulse), and in that data for generation of probability is random number data generated when the trigger signal is inputted. However, this embodiment is different from the first embodiment in the generation of range data (specified by probability lower limit data and probability upper limit data) to be compared with the data for generation of probability in generating a probability signal PS.

Specifically, in the present embodiment, as shown in FIG. 19, probability lower limit data (DL) of the range data is composed of a probability lower limit value (Rl) that can be freely varied within a probability setting range (Ra) at an arbitrary time or using an arbitrary timing. Probability upper limit data (DU) is obtained by adding a preset probability width (Pw) to the probability lower limit value (Rl). Reference numeral 11 denotes an adder.

FIG. 20 shows the relationship between the probability (P) and both the probability width (Pw) and probability lower limit value (Rl) within the probability setting range (Ra). This figure indicates that with uniform data for generation of probability, the probability obtained (P=Pw/Ra) is always fixed even if the probability lower limit value (Rl) varies arbitrarily as with probability lower limit values (Rl-1) and (Rl-2), shown in FIG. 20, as long as the probability setting range (Ra) and the probability width (Pw) are always fixed within the probability setting range (Ra). Naturally enough, the probability lower limit value (Rl) must be set so that the probability lower limit data (DL) and the probability upper limit data (DU), i.e. the probability width (Pw) is always present within the probability setting range (Ra).

Figure 21:
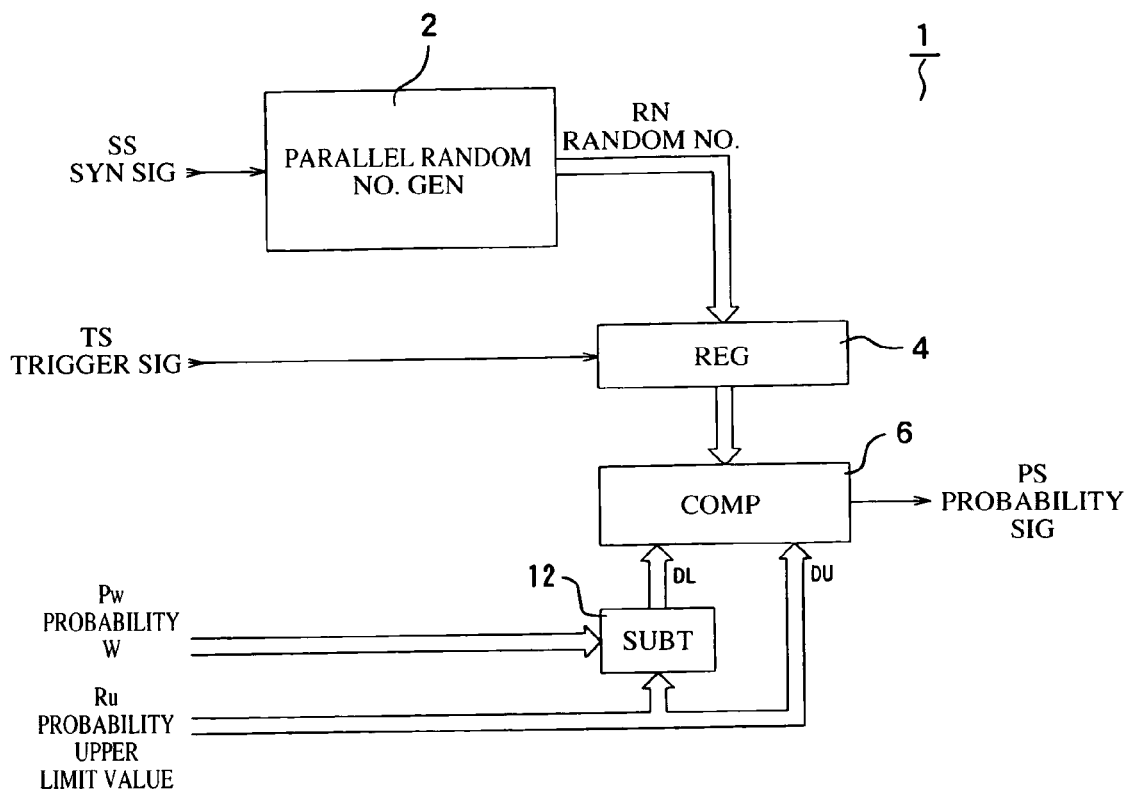
FIG. 21 is a diagram showing the configuration of the probability generating apparatus according to the second embodiment of the present invention, the configuration being different from that shown in FIG. 19.
Figure 22:
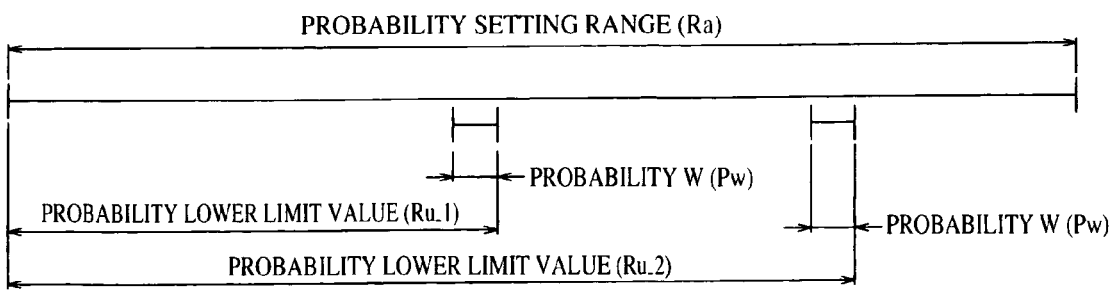
FIG. 22 is a diagram showing the relationship between the probability setting position and probability width of the probability generating apparatus in FIG. 21.

The embodiment shown in FIGS. 21 and 22 is an example in which the probability upper limit data (DU) of the range data is composed of a probability upper limit value (Ru) that can be freely varied within the probability setting range (Ra) at an arbitrary time or using an arbitrary timing. The probability lower limit data (DL) is obtained by subtracting the preset probability width (Pw) from the probability upper limit value (Ru). Reference numeral 12 denotes a subtractor.

As shown in FIG. 22, the probability obtained (P=Pw/Ra) is always fixed even if the probability upper limit value (Ru) varies arbitrarily as with probability upper limit values (Ru-1) and (Ru-2), shown in FIG. 22, as long as the probability setting range (Ra) and the probability width (Pw) are always fixed within the probability setting range (Ra). Again, naturally enough, the probability upper limit value (Ru) must be set so that the probability lower limit data (DL) and the probability upper limit data (DU) are always present within the probability setting range (Ra).

Figure 23:
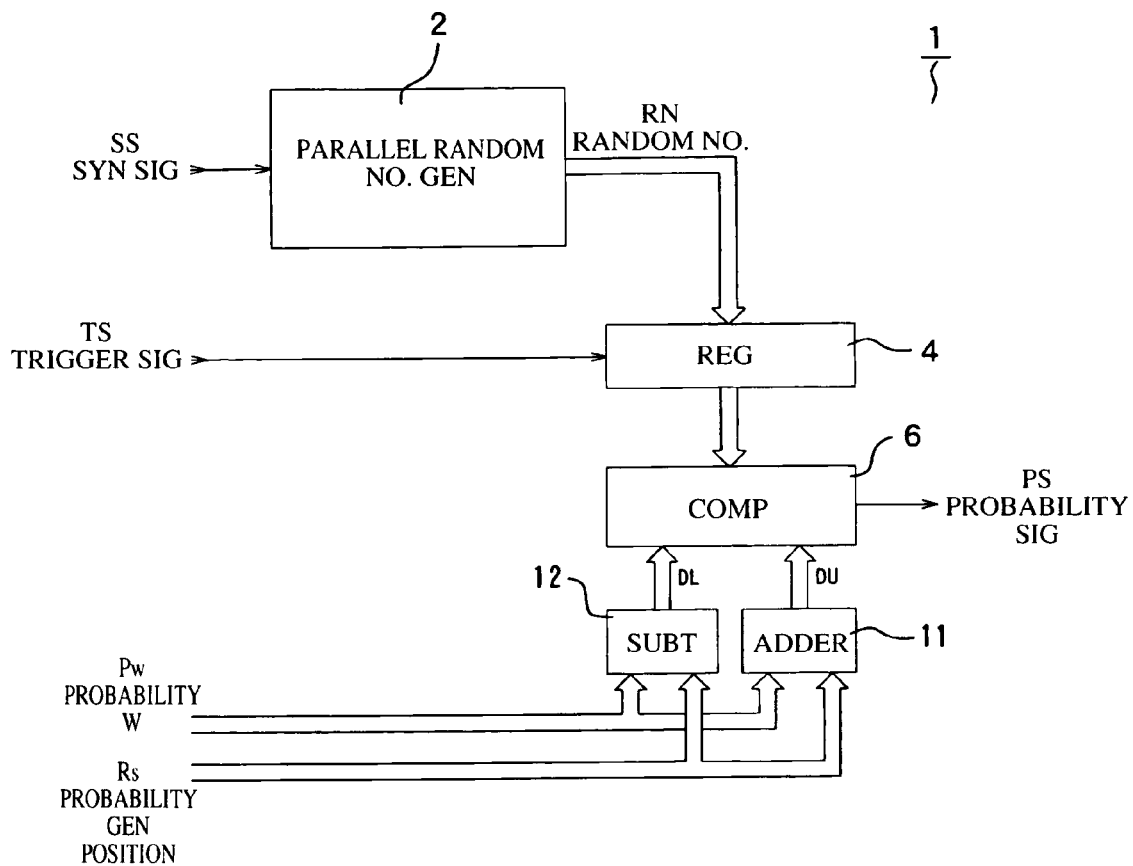
FIG. 23 is a diagram showing the configuration of the probability generating apparatus according to the second embodiment of the present invention, the configuration being different from that shown in FIG. 21.
Figure 24:
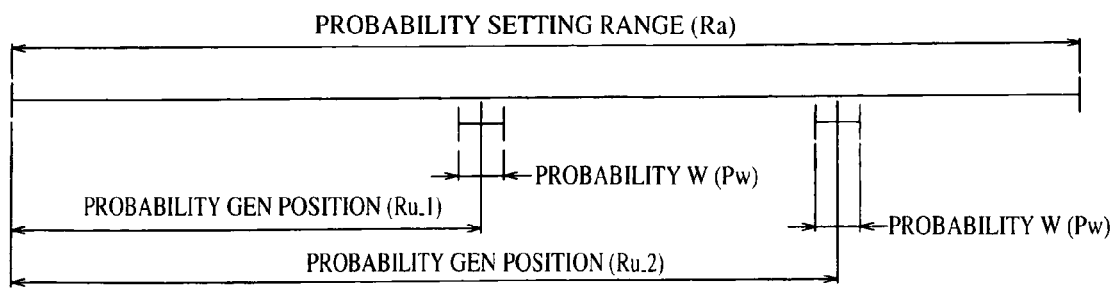
FIG. 24 is a diagram showing the relationship between the probability setting position and probability width of the probability generating apparatus in FIG. 23.

The embodiment shown in FIGS. 23 and 24 is an example in which a value for a probability generation position (Rs) is set which can be freely varied within the probability setting range (Ra) at an arbitrary time or using an arbitrary timing. Then, the probability lower limit data (DL) is obtained by subtracting half the preset probability width (Pw) from the value for the probability generation position (Rs). The probability upper limit data (DU) is obtained by adding half the probability width (Pw) to the value for the probability generation position (Rs). Reference numerals 11 and 12 denote an adder and a subtractor, respectively.

As shown in FIG. 24, the probability obtained (P=Pw/Ra) is always fixed even if the value for the probability generation position (Rs) varies arbitrarily as with values for probability generation positions (Rs-1) and (Rs-2), shown in the figure, as long as the probability setting range (Ra) and the probability width (Pw) are always fixed within the probability setting range (Ra). Again, naturally enough, the value for the probability generation position (Rs) must be set so that the probability lower limit data (DL) and the probability upper limit data (DU) are always present within the probability setting range (Ra).

Figure 26:
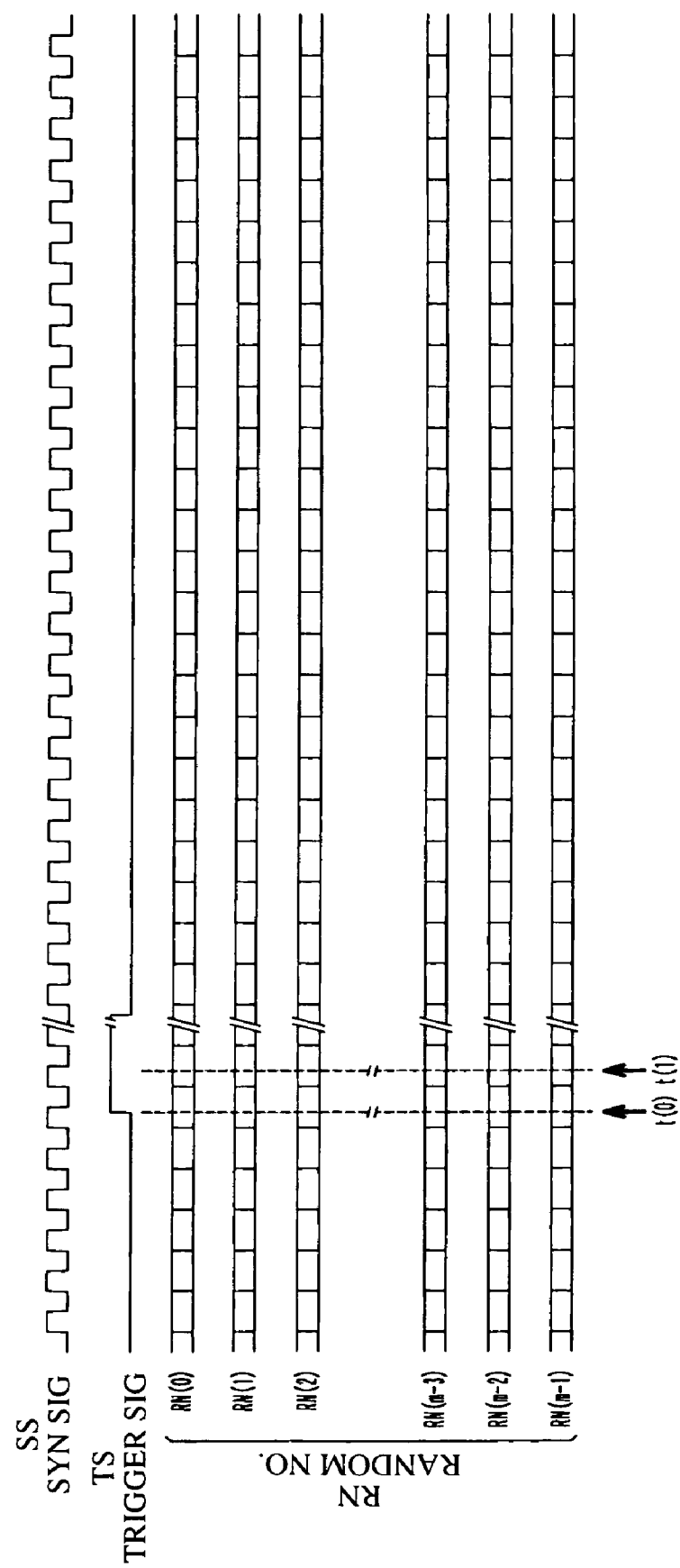
FIG. 26 is a diagram showing the relationship between the probability setting position and probability width of the probability generating apparatus in FIG. 25.

The embodiment shown in FIGS. 25 and 26 is an example in which in FIG. 19, the probability lower limit value is the random number corresponding to the time t(0) when the trigger signal is generated or the random number corresponding to the timing t(1) obtained by adding an offset to the trigger signal. The probability upper limit data (DU) is obtained by adding the probability width to the probability lower limit value. The control circuit 3 in FIG. 25 receives the inputted synchronous signal SS and trigger signal TS to generate a timing for setting the random number RN for generation of the probability lower limit value, in the first register 4a. Reference numeral 4b denotes a second register. This arrangement has two registers 4a and 4b.

With the probability generating apparatus 1, the probability lower limit value varies randomly within the probability setting range every time the trigger signal TS is generated.

Figure 27:
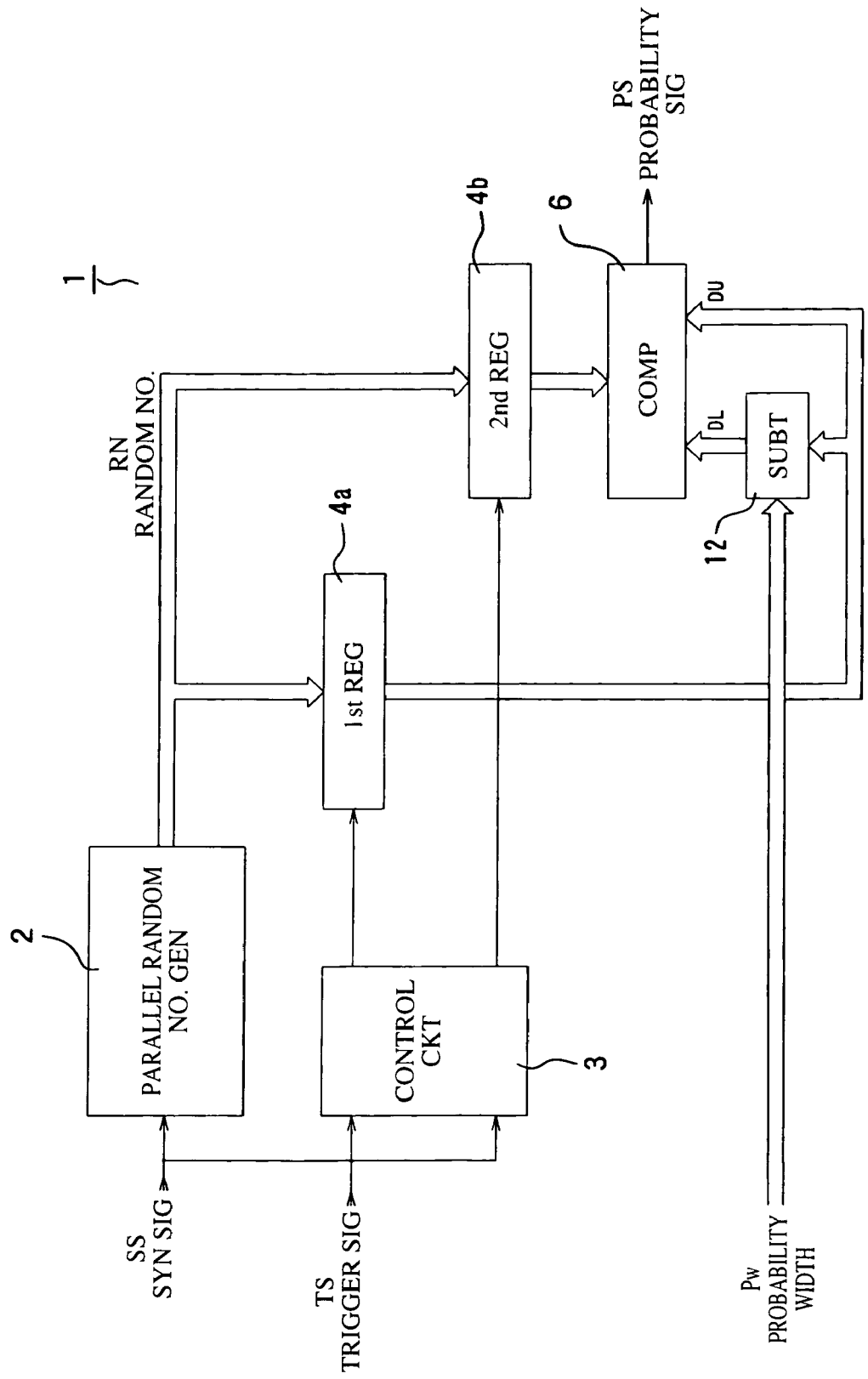
FIG. 27 is a diagram showing the configuration of the probability generating apparatus according to the second embodiment of the present invention, the configuration being different from that shown in FIG. 25.

The embodiment shown in FIG. 27 is an example in which in FIG. 21, the probability upper limit value is the random number corresponding to the time t(0) when the trigger signal is generated or the random number corresponding to the timing t(1) obtained by adding the offset to the trigger signal TS. The probability lower limit data (DL) is obtained by subtracting the probability width from the probability upper limit value. This arrangement has two registers 4a and 4b.

With the probability generating apparatus 1, the probability upper limit value varies randomly within the probability setting range every time the trigger signal TS is generated. (For a timing waveform, see FIG. 26.) Reference numerals 6 and 12 denote a comparator and a subtractor, as previously described.

Figure 28:
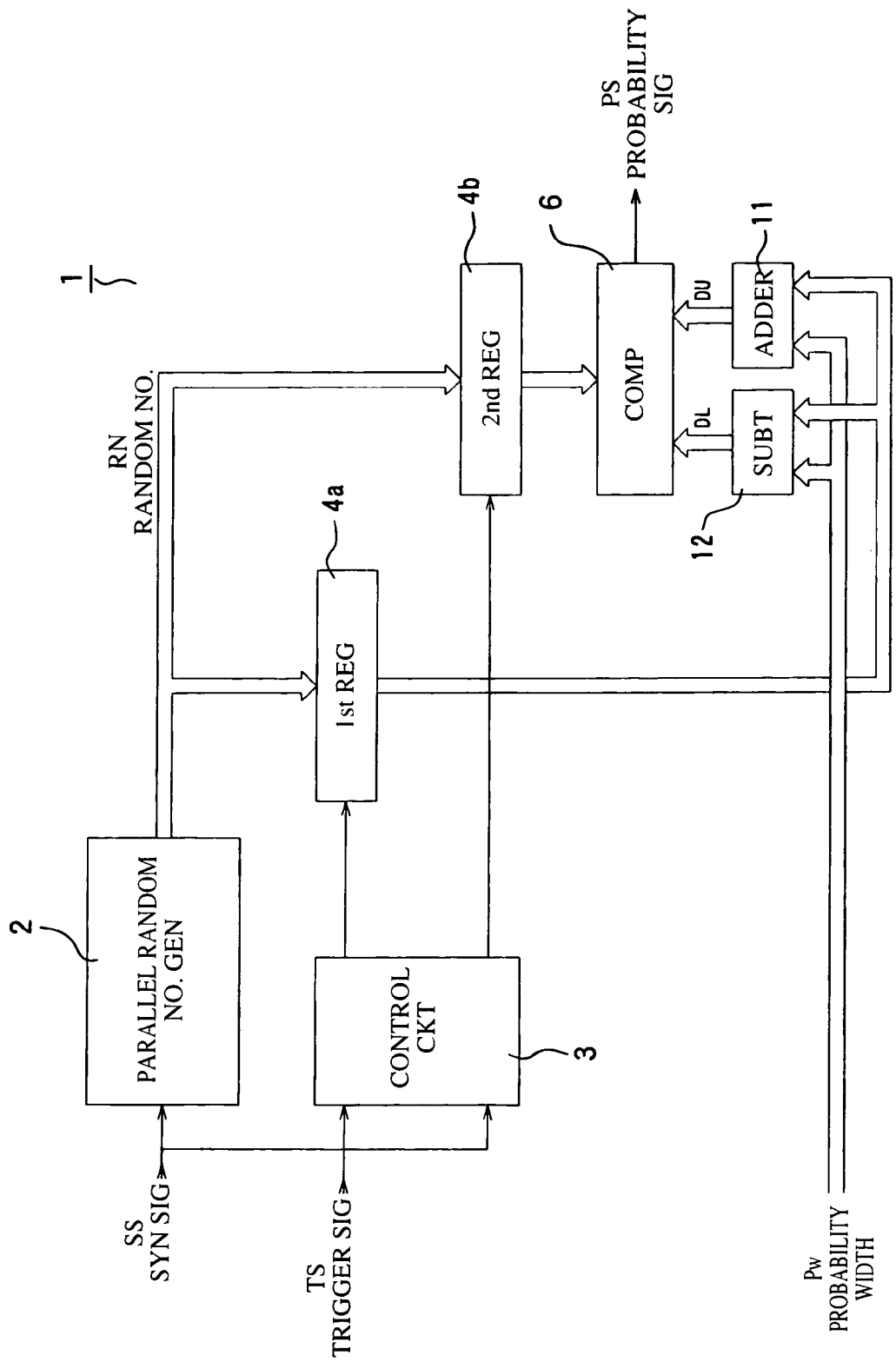
FIG. 28 is a diagram showing the configuration of the probability generating apparatus according to the second embodiment of the present invention, the configuration being different from that shown in FIG. 27.

The embodiment shown in FIG. 28 is an example in which in FIG. 23, the value for the probability generation position is the random number corresponding to the time t(0) when the trigger signal is generated or the random number corresponding to the timing t(1) obtained by adding an offset to the trigger signal TS. The probability lower limit data (DL) is obtained by subtracting half the probability width from the value for the probability generation position. The probability upper limit data (DU) is obtained by adding half the probability width to the value for the probability generation position. This arrangement has two registers 4a and 4b.

With the probability generating apparatus 1, the value for the probability generation position varies randomly within the probability setting range every time the trigger signal TS is generated. (For a timing waveform, see FIG. 26.)

Figure 29:
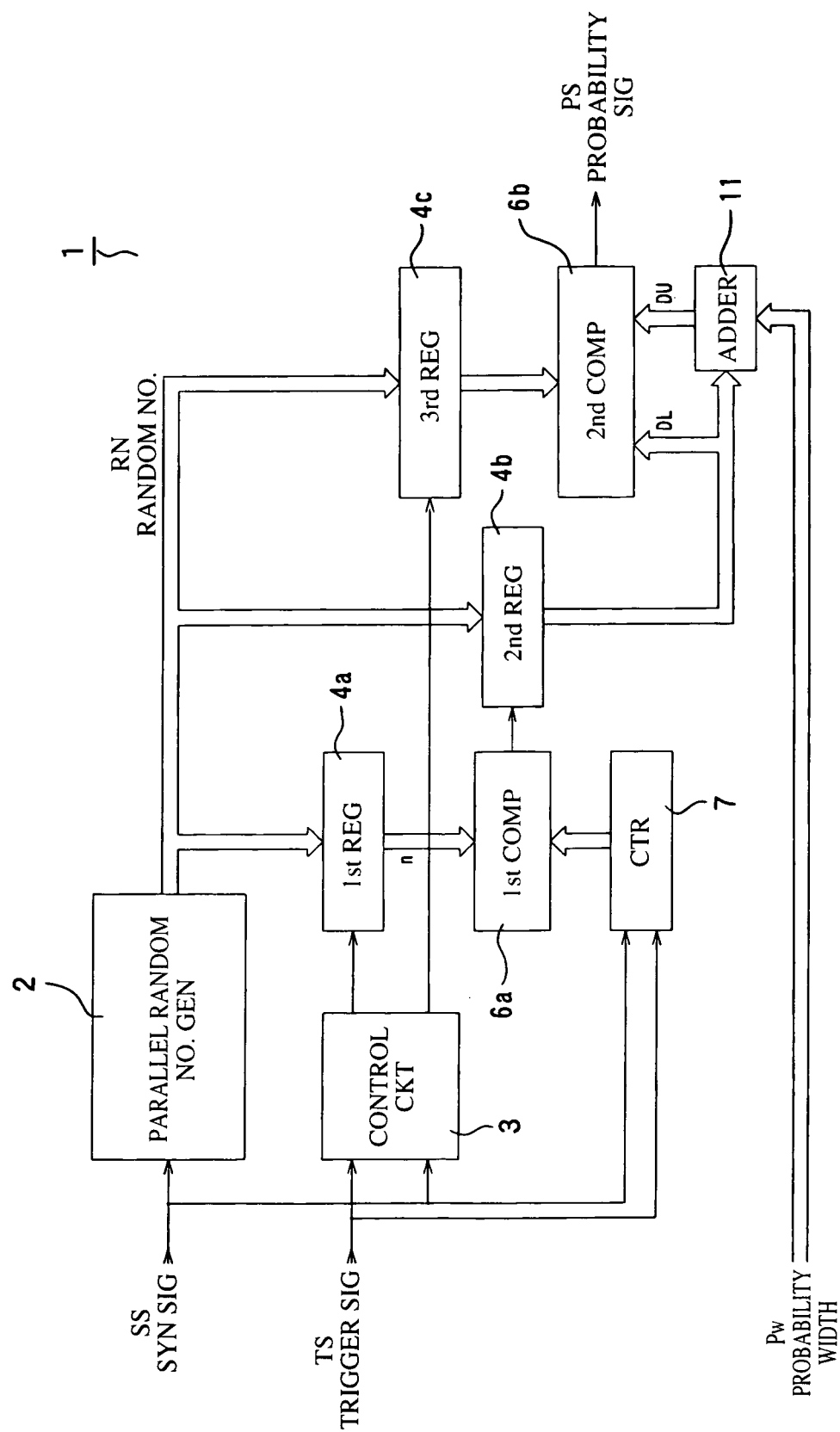
FIG. 29 is a diagram showing the configuration of the probability generating apparatus according to the second embodiment of the present invention, the configuration being different from that shown in FIG. 28.
Figure 30:
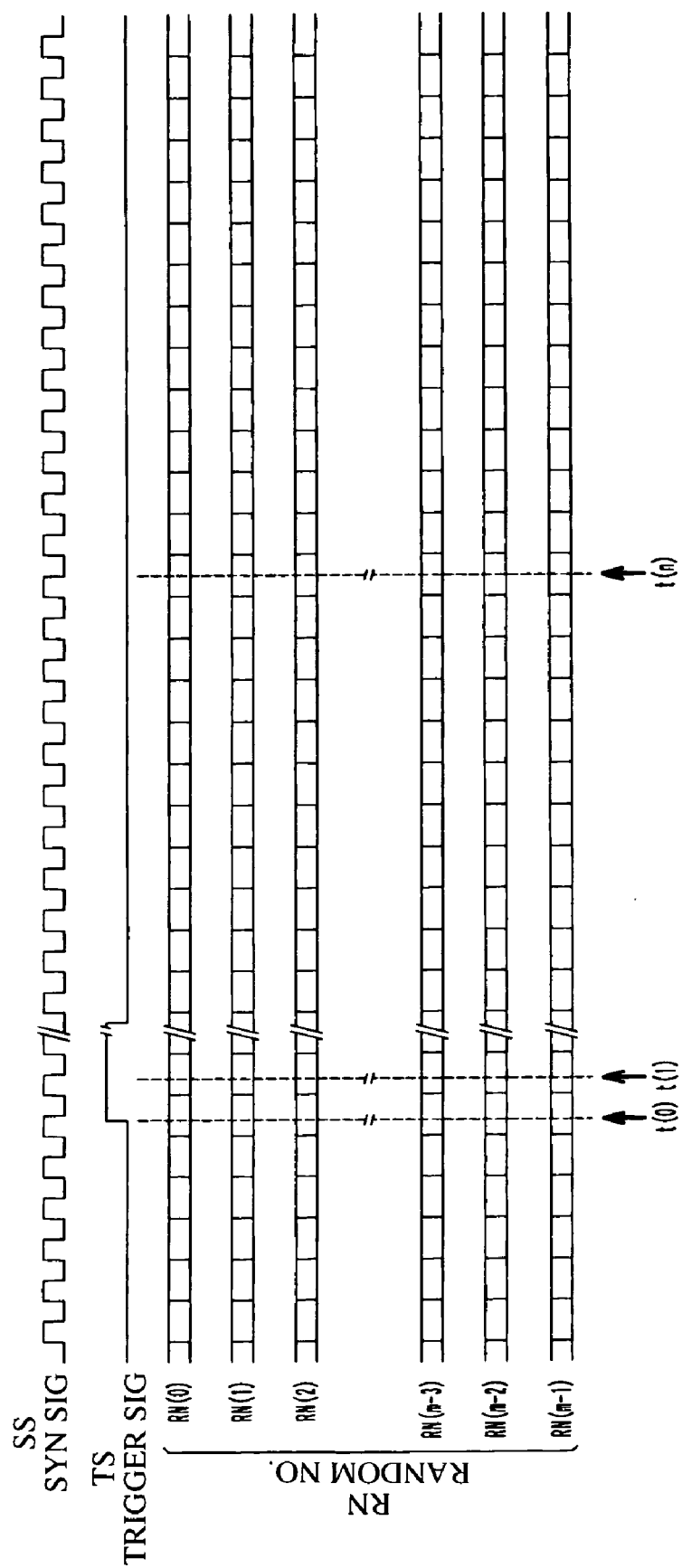
FIG. 30 is a timing waveform diagram of the probability generating apparatus in FIG. 29.

The embodiment shown in FIGS. 29 and 30 is an example in which in FIG. 19, using data (n) generated using, for example, the lower 8 bits of the random number corresponding to the time t(0) when the trigger signal is generated or the random number corresponding to the timing t(1) obtained by adding the offset to the trigger signal TS, the n-th random number from the one at the time t(0) or t(1) which number corresponds to the time t(n) is set as the probability lower limit value. In FIG. 29, the random number data for the probability lower limit value is set in the second register at the time t(n). This arrangement has three registers 4a to 4c and two comparators 6a and 6b.

With the probability generating apparatus 1, the probability lower limit value varies randomly within the probability setting range every time the trigger signal is generated.

Figure 31:
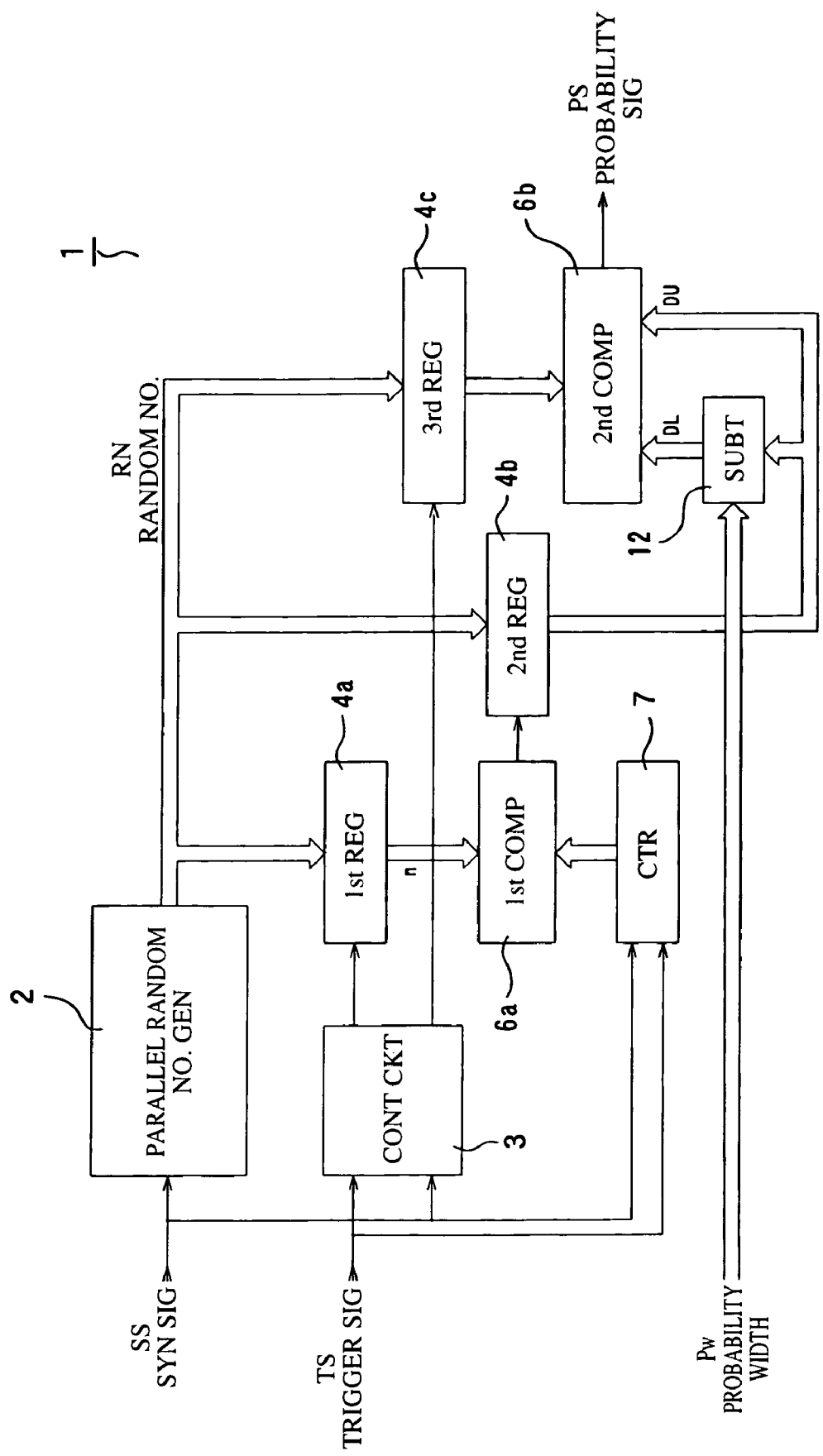
FIG. 31 is a diagram showing the configuration of the probability generating apparatus according to the second embodiment of the present invention, the configuration being different from that shown in FIG. 29.

The embodiment shown in FIG. 31 is an example in which in FIG. 21, using data (n) generated using, for example, the lower 8 bits of the random number corresponding to the time t (0) when the trigger signal is generated or the random number corresponding to the timing t(1) obtained by adding the offset to the trigger signal TS, the n-th random number from the one at the time t(0) or t(1) which number corresponds to the time t(n) is set as the probability upper limit value. In FIG. 31, the random number data for the probability upper limit value is set in the second register 4b at the time t(n). Reference numerals 4a, 4b, and 4c denote a first, second, and third registers, and reference numerals 6a and 6b denote a first and second comparators.

With the probability generating apparatus 1, the probability upper limit value varies randomly within the probability setting range every time the trigger signal TS is generated. (For a timing waveform, see FIG. 30.)

Figure 32:
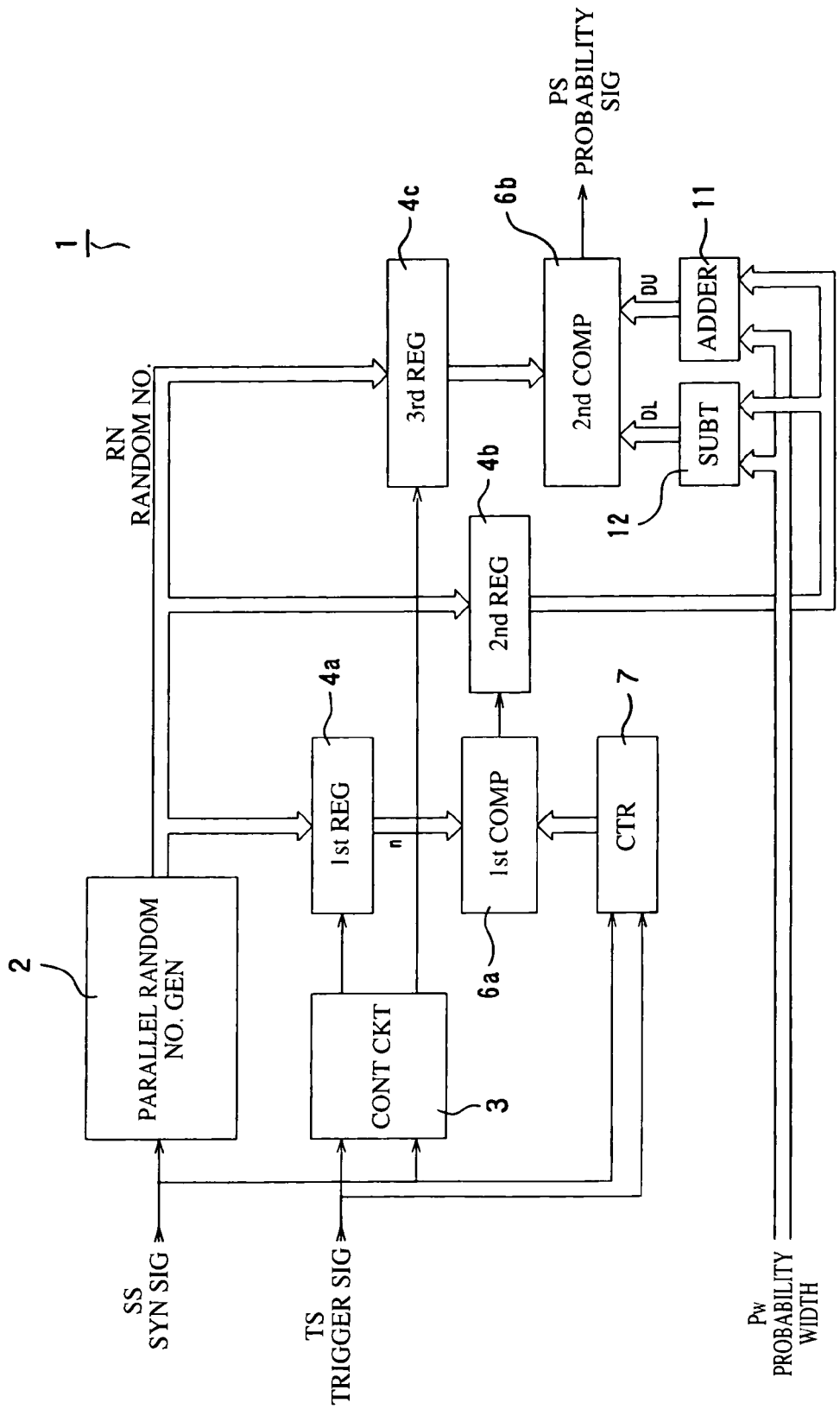
FIG. 32 is a diagram showing the configuration of the probability generating apparatus according to the second embodiment of the present invention, the configuration being different from that shown in FIG. 31.

The embodiment shown in FIG. 32 is an example in which in FIG. 23, using the data (n) generated using, for example, the lower 8 bits of the random number RN corresponding to the time t(0) when the trigger signal is generated or the random number corresponding to the timing t(1) obtained by adding the offset to the trigger signal TS, the n-th random number from the one at the time t(0) or t(1) which number corresponds to the time t(n) is set as the value for the probability generation position. In FIG. 32, the random number data for the value for the probability generation position is set in the second register 4b at the time t(n). This arrangement has three registers 4a to 4c and two comparators 6a and 6b.

With the probability generating apparatus 1, the value for the probability generation position varies randomly within the probability setting range every time the trigger signal TS is generated. (For a timing waveform, see FIG. 30.)

Figure 33:
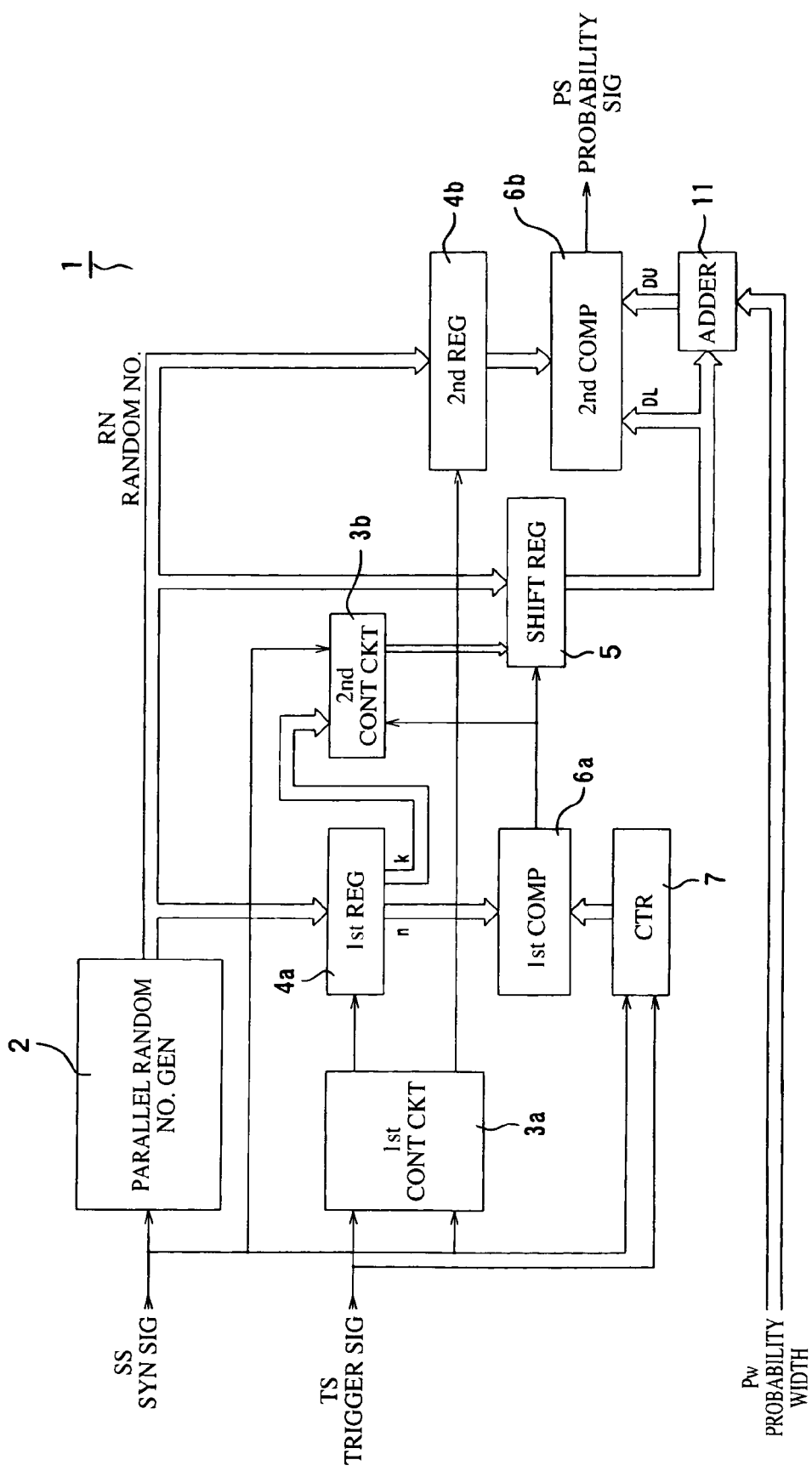
FIG. 33 is a diagram showing the configuration of the probability generating apparatus according to the second embodiment of the present invention, the configuration being different from that shown in FIG. 32.
Figure 34:
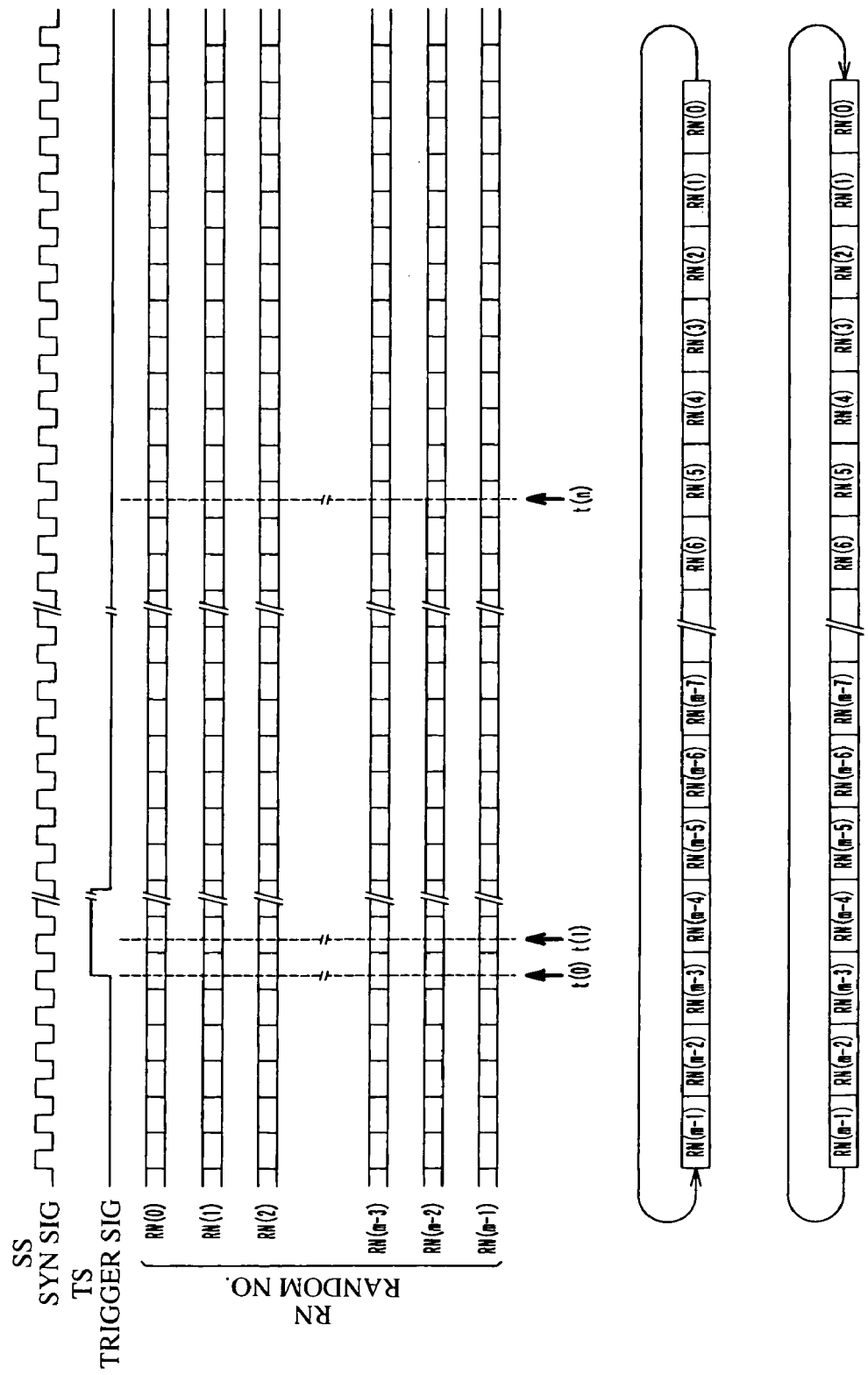
FIG. 34 is a timing waveform diagram of the probability generating apparatus in FIG. 33.

The embodiment shown in FIGS. 33 and 34 is an example in which in FIG. 19, using the data (n) generated using, for example, the lower 8 bits of the random number corresponding to the time t(0) when the trigger signal is generated or the random number corresponding to the timing t(1) obtained by adding the offset to the trigger signal TS, and data (k) generated using, for example, the upper 5 bits of the same random number, the n-th random number from the one at the time t(0) or t(1) which number corresponds to the time t(n) is rotated using a rotating direction and a rotation length set on the basis of the data (k). The rotated random number data is set as the probability lower limit value. This arrangement comprises two control circuits 3a and 3b, two registers 4a and 4b, two comparators 6a and 6b, and one shift register 5.

Figure 35:
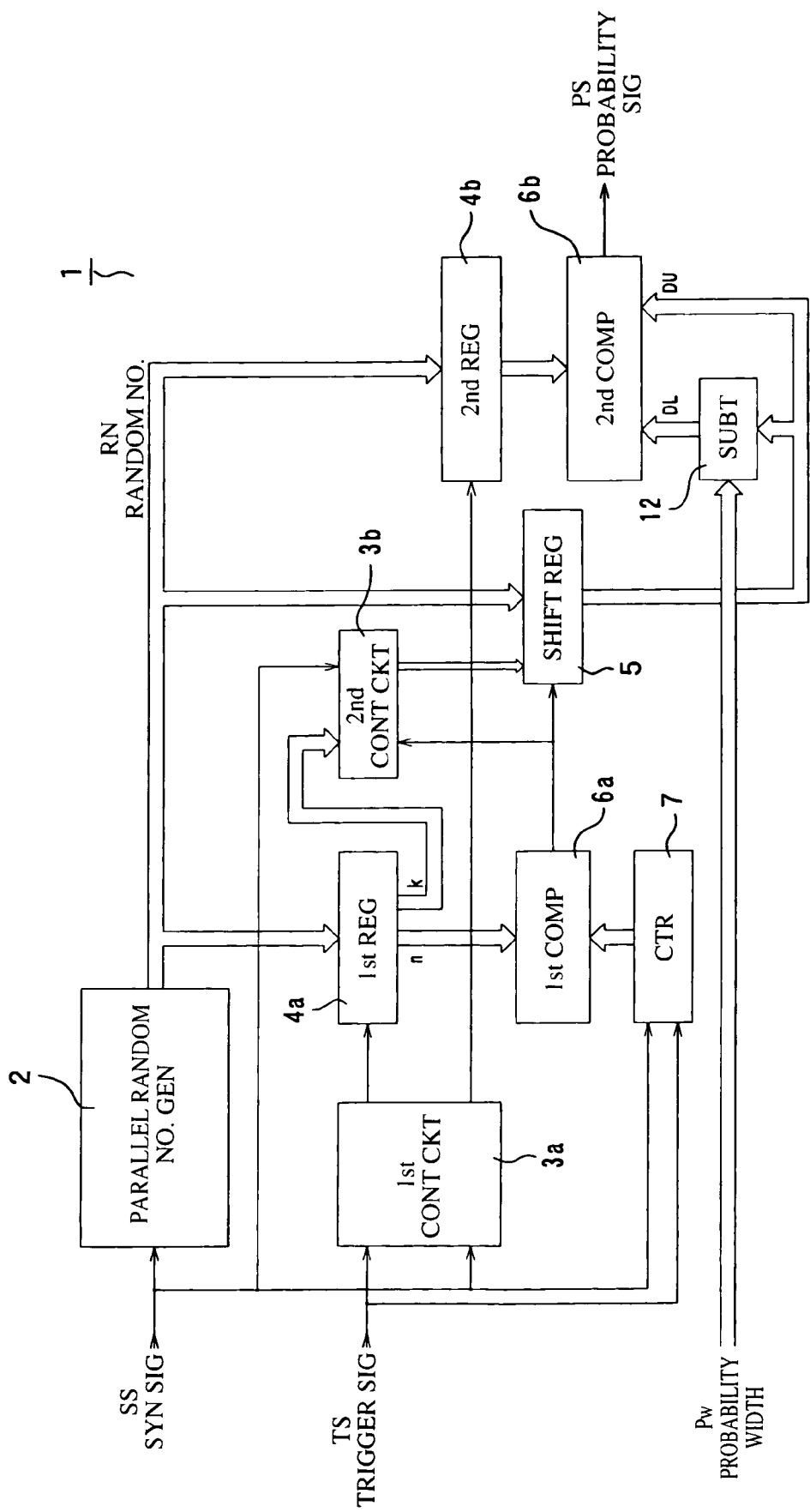
FIG. 35 is a diagram showing the configuration of the probability generating apparatus according to the second embodiment of the present invention, the configuration being different from that shown in FIG. 33.

The embodiment shown in FIG. 35 is an example in which in FIG. 21, using the data (n) generated using, for example, the lower 8 bits of the random number corresponding to the time t(0) when the trigger signal is generated or the random number corresponding to the timing t(1) obtained by adding the offset to the trigger signal TS, and the data (k) generated using, for example, the upper 5 bits of the same random number, the n-th random number from the one at the time t(0) or t(1) which number corresponds to the time t(n) is rotated using the rotating direction and rotation length set on the basis of the data (k). The rotated random number data is set as the probability upper limit value. (For a timing waveform, see FIG. 34.) This arrangement comprises two control circuits 3a and 3b, two registers 4a and 4b, two comparators 6a and 6b, and one shift register 5.

Figure 36:
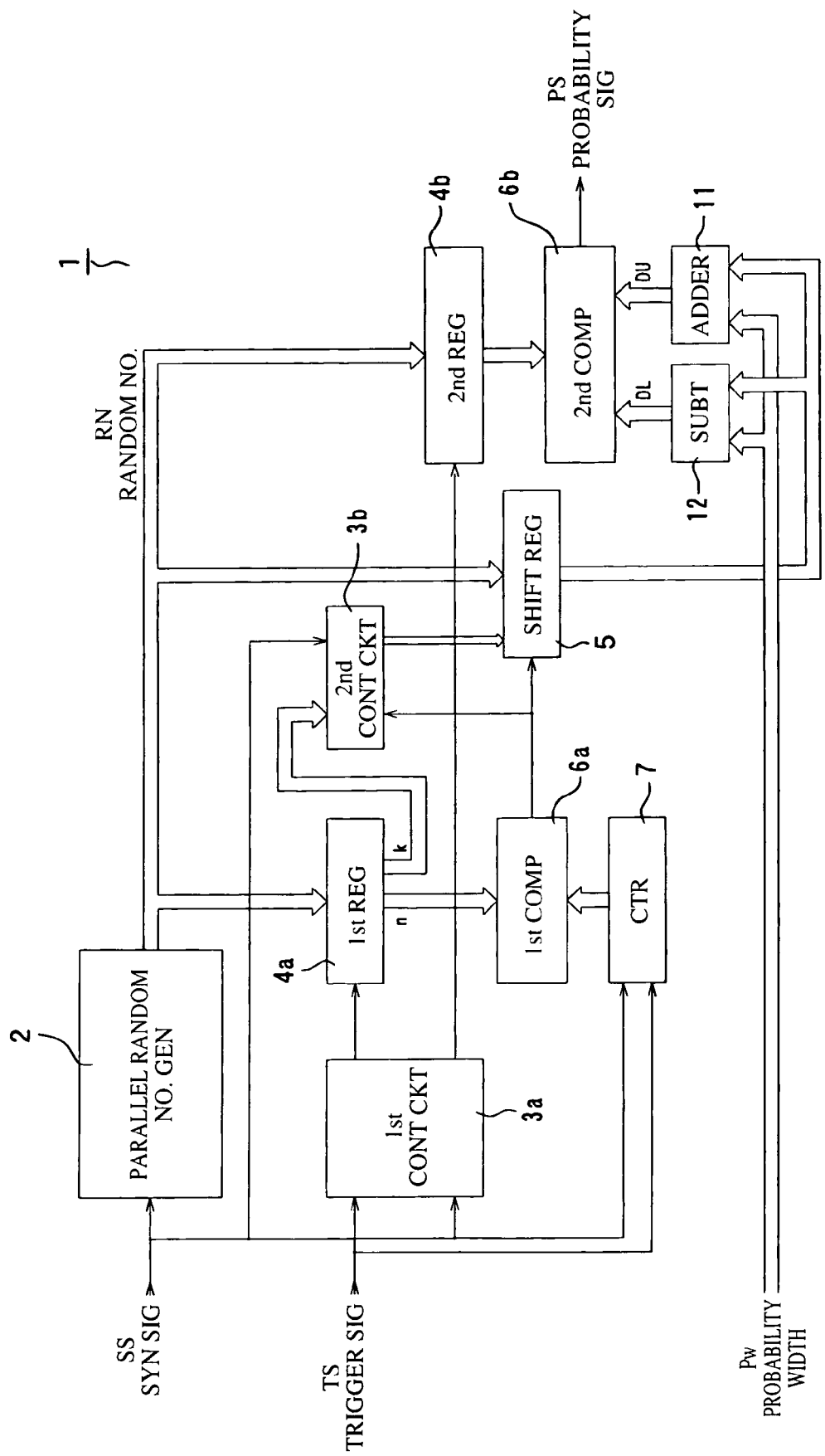
FIG. 36 is a diagram showing the configuration of the probability generating apparatus according to the second embodiment of the present invention, the configuration being different from that shown in FIG. 35.

The embodiment shown in FIG. 36 is an example in which in FIG. 23, using the data (n) generated using, for example, the lower 8 bits of the random number corresponding to the time t(0) when the trigger signal is generated or the random number corresponding to the timing t(1) obtained by adding the offset to the trigger signal TS, and the data (k) generated using, for example, the upper 5 bits of the same random number, the n-th random number from the one at the time t(0) or t(1) which number corresponds to the time t(n) is rotated using the rotating direction and rotation length set on the basis of the data (k). The rotated random number data is set as the value for the probability generation position. (For a timing waveform, see FIG. 34.) This arrangement comprises two control circuits 3a and 3b, two registers 4a and 4b, two comparators 6a and 6b, and one shift register 5.

Figure 37:
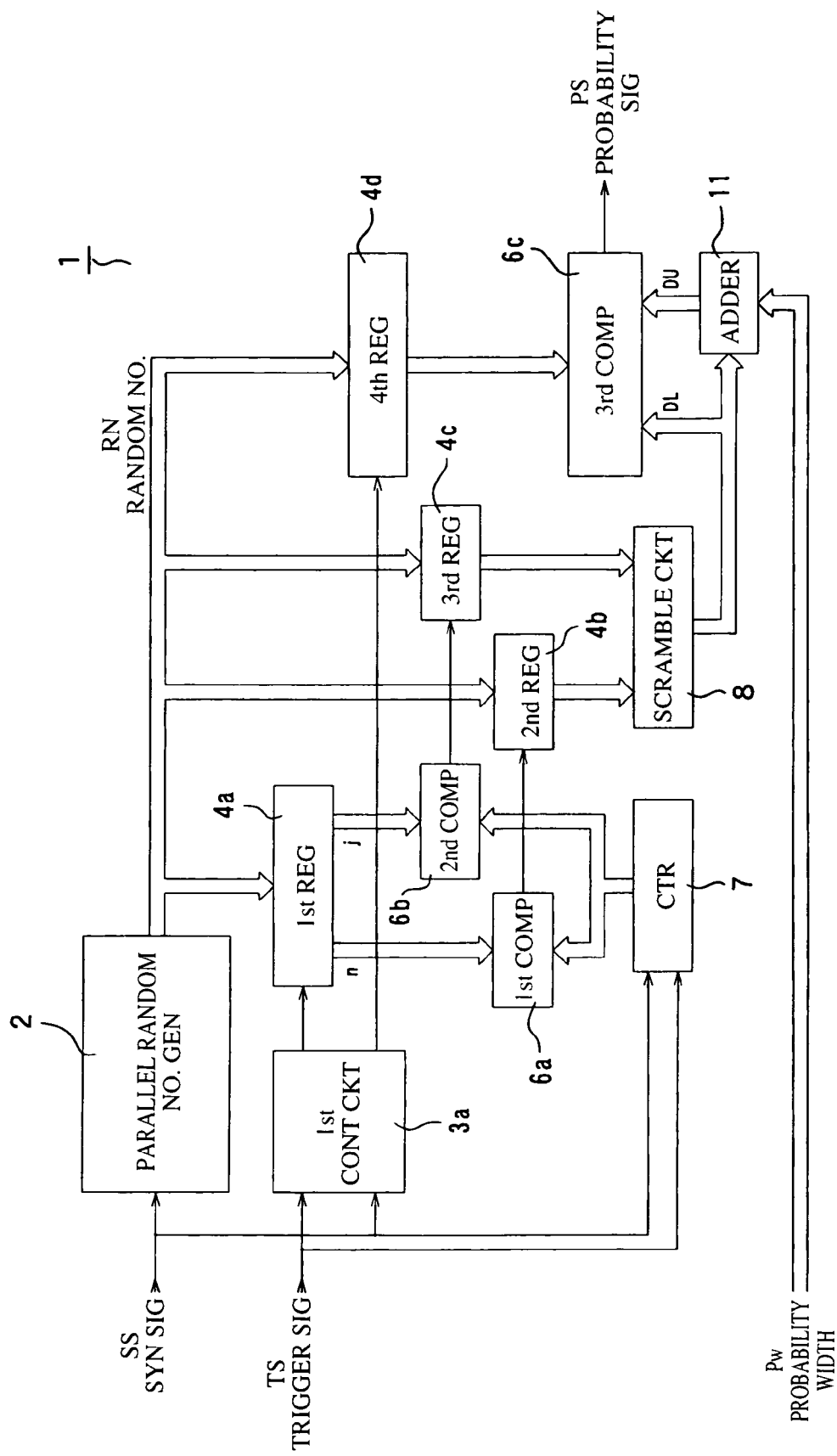
FIG. 37 is a diagram showing the configuration of the probability generating apparatus according to the second embodiment of the present invention, the configuration being different from that shown in FIG. 36.
Figure 38:
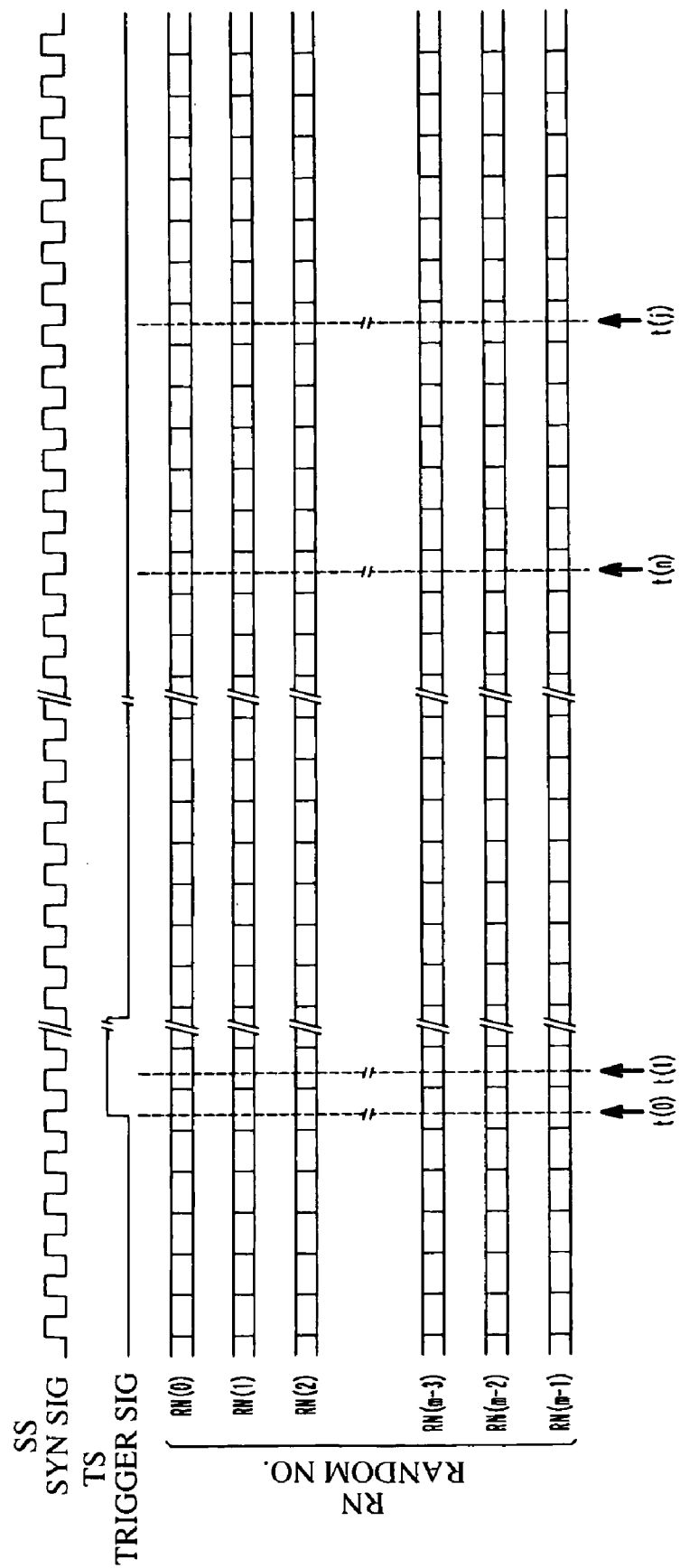
FIG. 38 is a timing waveform diagram of the probability generating apparatus in FIG. 37.

The embodiment shown in FIGS. 37 and 38 is an example in which in FIG. 19, using the data (n) generated using, for example, the lower 8 bits of the random number RN corresponding to the time t(0) when the trigger signal is generated or the random number corresponding to the timing t(1) obtained by adding the offset to the trigger signal TS, and data (j) generated using, for example, the upper 8 bits of the same random number, the scramble circuit 8 scrambles the n-th-random number RN from the one at the time t(0) or t(1) which number corresponds to the time t(n) and the j-th random number corresponding to the time t(j). The scrambled random number data is set as the probability lower limit value. This arrangement comprises four registers 4a to 4d and three comparators 6a to 6c.

Figure 39:
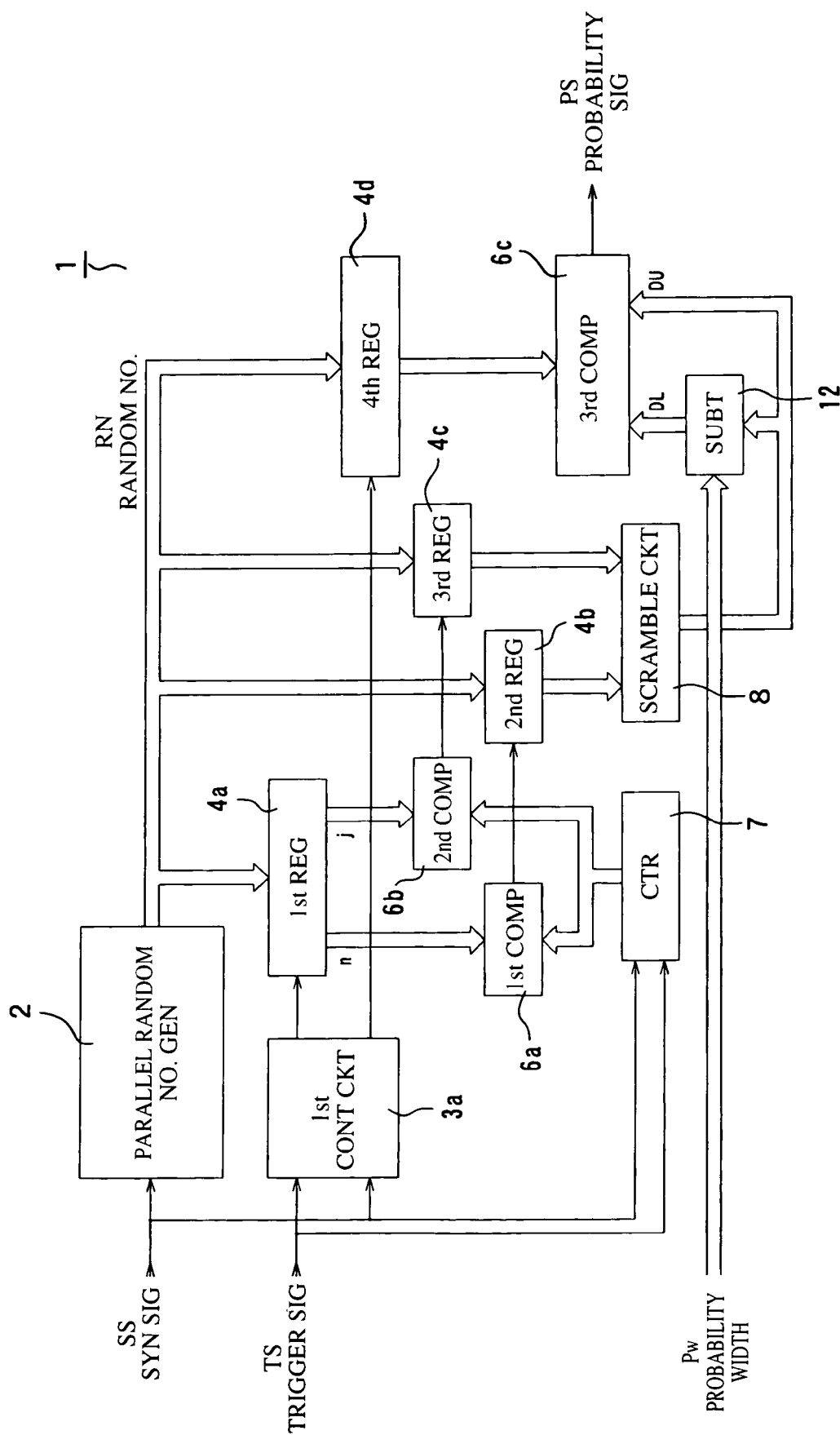
FIG. 39 is a diagram showing the configuration of the probability generating apparatus according to the second embodiment of the present invention, the configuration being different from that shown in FIG. 37.

The embodiment shown in FIG. 39 is an example in which in FIG. 21, using the data (n) generated using, for example, the lower 8 bits of the random number corresponding to the time t(0) when the trigger signal is generated or the random number corresponding to the timing t(1) obtained by adding the offset to the trigger signal TS, and the data (j) generated using, for example, the upper 8 bits of the same random number, the scramble circuit 8 scrambles the n-th random number from the one at the time t(0) or t(1) which number corresponds to the time t(n) and the j-th random number corresponding to the time t(j). The scrambled random number data is set as the probability upper limit value. (For a timing waveform, see FIG. 38.) This arrangement comprises four registers 4a to 4d and three comparators 6a to 6c.

Figure 40:
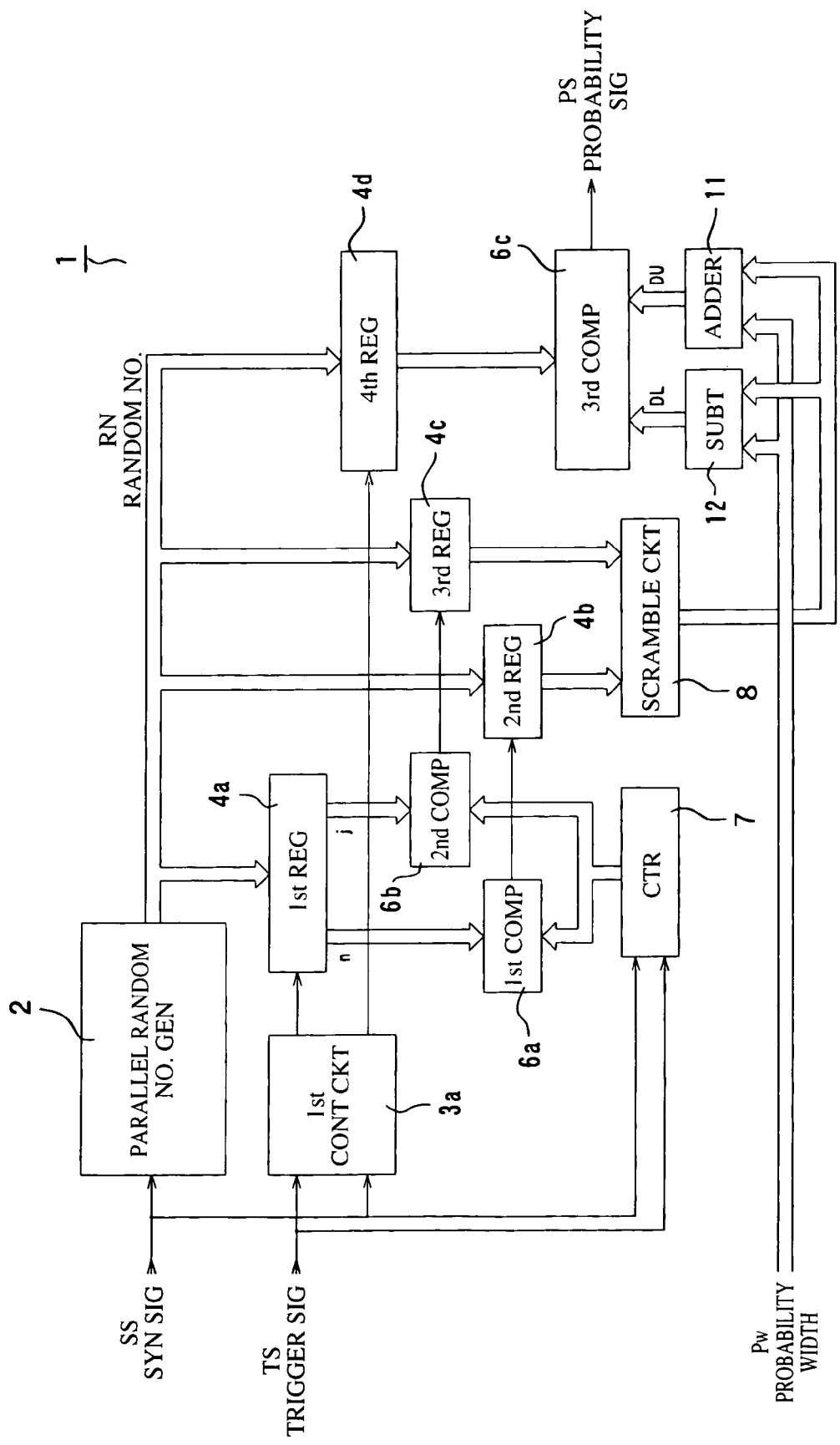
FIG. 40 is a diagram showing the configuration of the probability generating apparatus according to the second embodiment of the present invention, the configuration being different from that shown in FIG. 39.

The embodiment shown in FIG. 40 is an example in which in FIG. 23, using the data (n) generated using, for example, the lower 8 bits of the random number corresponding to the time t(0) when the trigger signal is generated or the random number corresponding to the timing t(1) obtained by adding the offset to the trigger signal TS, and the data (j) generated using, for example, the upper 8 bits of the same random number, random number data is obtained by scrambling the n-th random number from the one at the time t(0) or t(1) which number corresponds to the time t(n) and the j-th random number corresponding to the time t(j). This random number data is set as the value for the probability generation position. (For a timing waveform, see FIG. 38.) This arrangement comprises four registers 4a to 4d and three comparators 6a to 6c.

Figure 41:
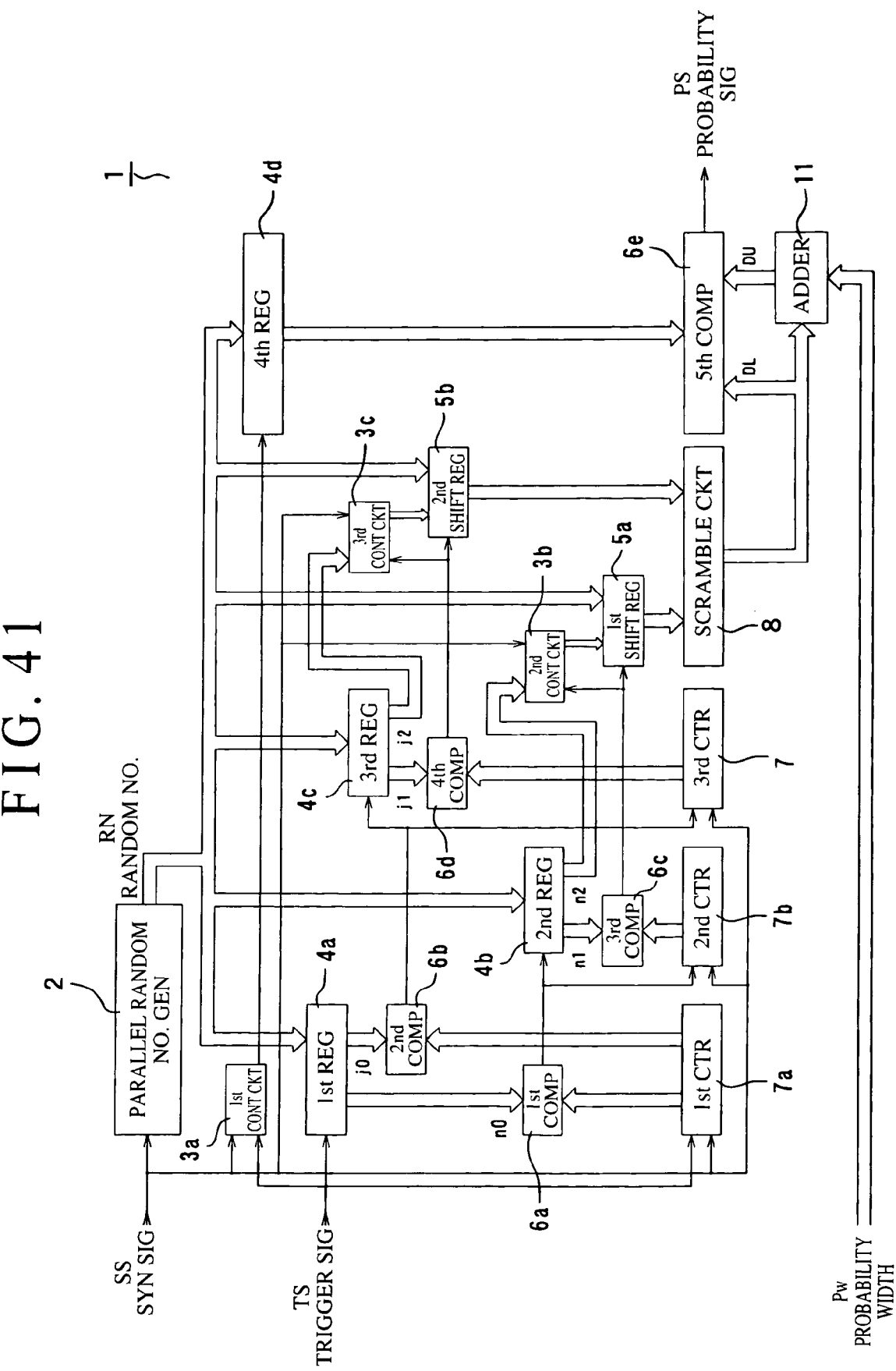
FIG. 41 is a diagram showing the configuration of the probability generating apparatus according to the second embodiment of the present invention, the configuration being different from that shown in FIG. 40.
Figure 42:
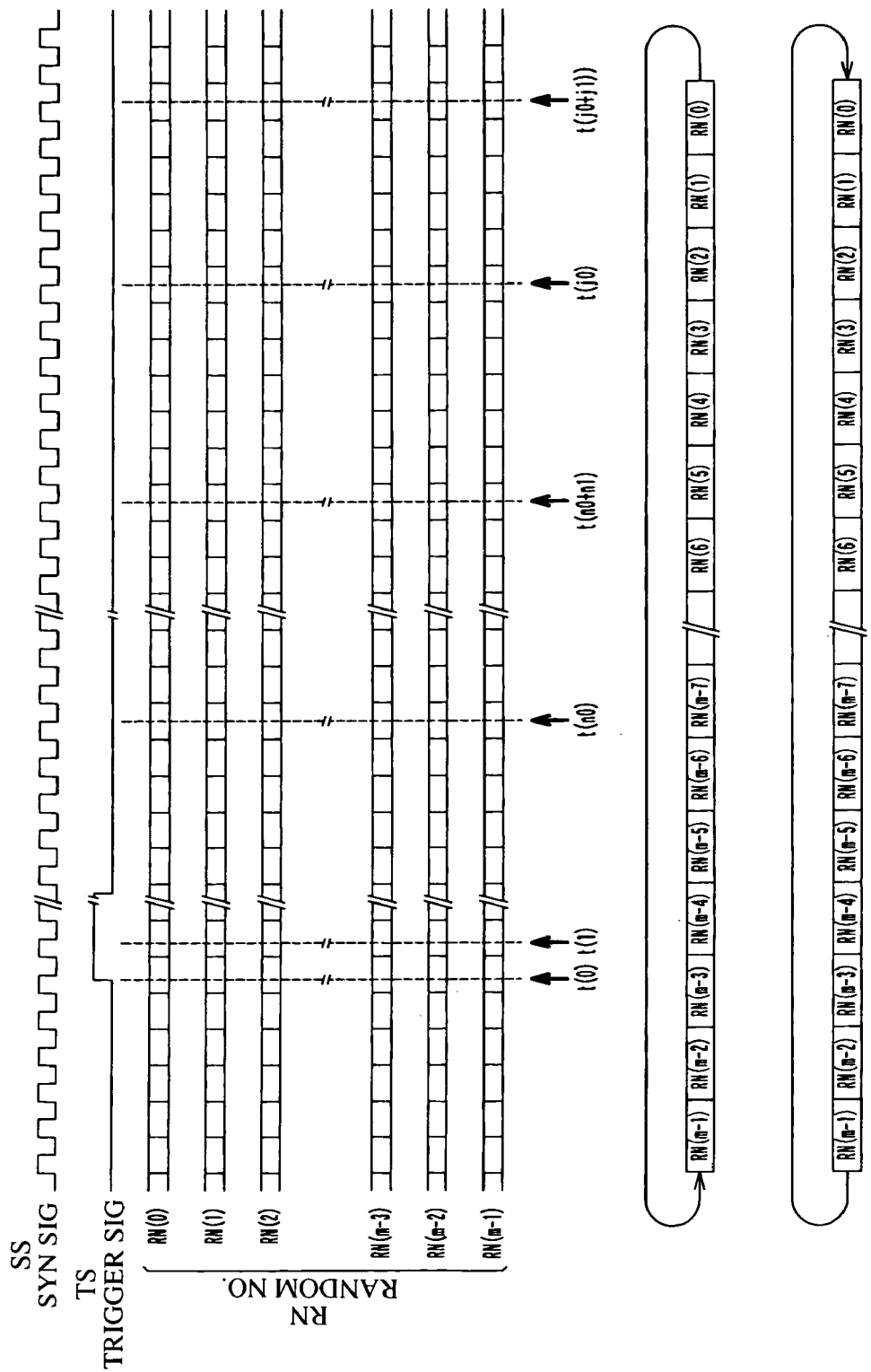
FIG. 42 is a timing waveform diagram of the probability generating apparatus in FIG. 41.

The embodiment shown in FIGS. 41 and 42 is an example in which in FIG. 19, using data (n0) generated using, for example, the lower 8 bits of the random number corresponding to the time t(0) when the trigger signal is generated or the random number corresponding to the timing t(1) obtained by adding an offset to the trigger signal, and data (j0) generated using, for example, the upper 8 bits of the same random number, data (n1, j1) is generated using, for example, the lower 8 bits of each of the n0-th and j0-th random numbers from the one at the time t(0) or t(1) which numbers correspond to the times t(n0) and t(j0), respectively, and data (n1, j1) is generated using, for example, upper 5 bits of same random numbers. Then, a rotating direction and a rotation length set on the basis of data (n2, j2) are used to rotate the (n0+n1)-th and (j0+j1)-th random numbers from the one at the time t(0) or t(1) which numbers correspond to the times t(n0+n1) and t(j0+j1), respectively. Then, the rotated random numbers are scrambled to obtain random number data set as the probability lower limit value.

This arrangement comprises three control circuits 3a to 3c, four registers 4a to 4d, five comparators 6a to 6e, two shift registers 5a and 5b, and three counters 7a to 7c.

Figure 43:
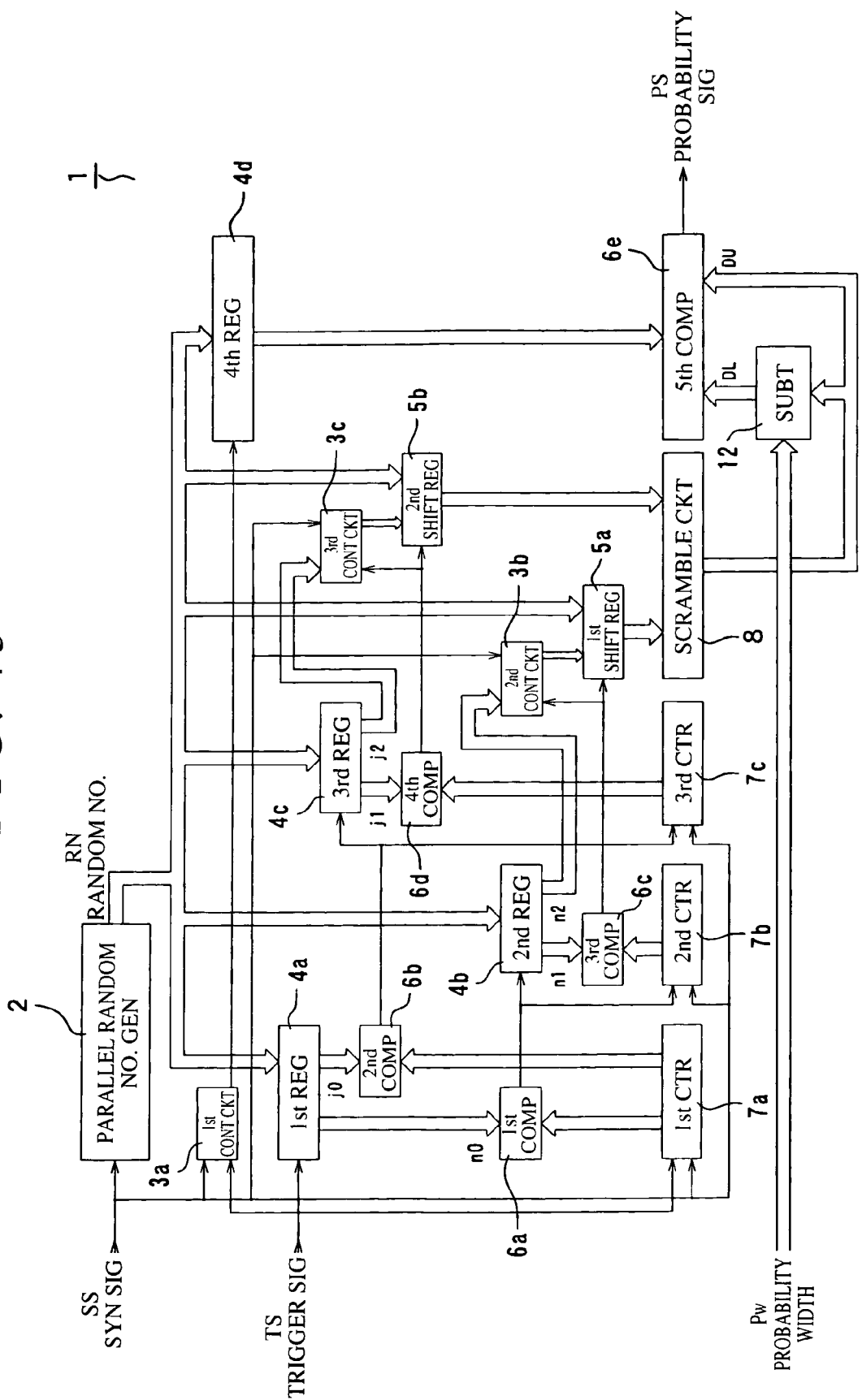
FIG. 43 is a diagram showing the configuration of the probability generating apparatus according to the second embodiment of the present invention, the configuration being different from that shown in FIG. 41.

The embodiment shown in FIG. 43 is an example in which in FIG. 21, using the data (n0) generated using, for example, the lower 8 bits of the random number RN corresponding to the time t(0) when the trigger signal TS is generated or the random number corresponding to the timing t(1) obtained by adding the offset to the trigger signal TS, and the data (j0) generated using, for example, the upper 8 bits of the same random number, the data (n1, j1) is generated using, for example, the lower 8 bits of each of the n0-th and j0-th random numbers RN from the one at the time t(0) or t(1) which numbers correspond to the times t(n0) and t(j0), respectively, and the data (n1, j1) is generated using, for example, upper 5 bits of same random numbers. Then, the rotating direction and rotation length set on the basis of the data (n2, j2) are used to rotate the (n0+n1)-th and (j0+j1)-th random numbers RN from the one at the time t(0) or t(1)

which numbers correspond to the times t(n0+n1) and t(j0+j1), respectively. Then, the rotated random numbers are scrambled to obtain random number data set as the probability upper limit value. (For a timing waveform, see FIG. 42.)

This arrangement comprises three control circuits 3a to 3c, four registers 4a to 4d, five comparators 6a to 6e, two shift registers 5a and 5b, and three counters 7a to 7c.

Figure 44:
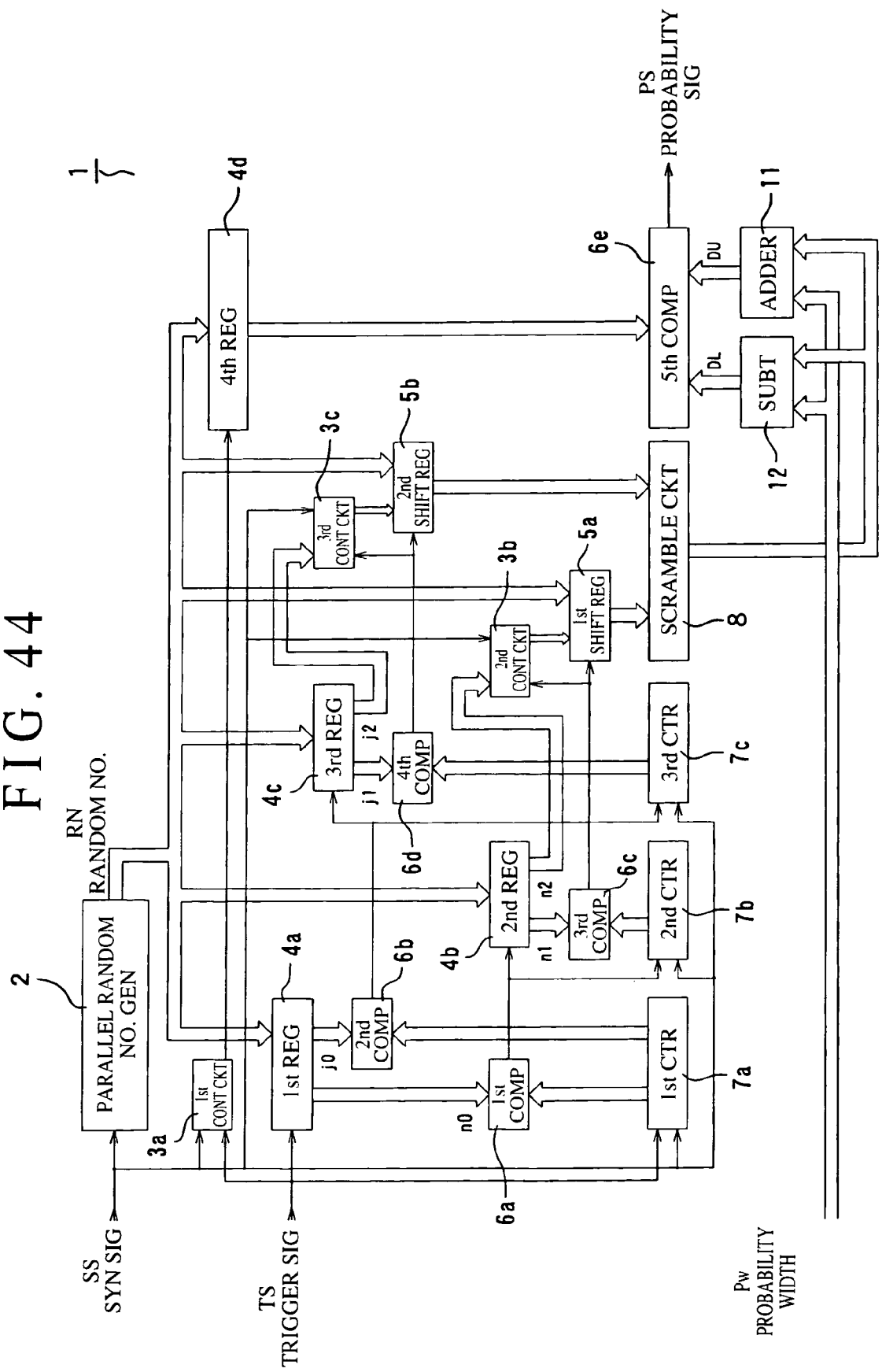
FIG. 44 is a diagram showing the configuration of the probability generating apparatus according to the second embodiment of the present invention, the configuration being different from that shown in FIG. 43.

The embodiment shown in FIG. 44 is an example in which in FIG. 23, using the data (n0) generated using, for example, the lower 8 bits of the random number corresponding to the time t(0) when the trigger signal is generated or the random number corresponding to the timing t(1) obtained by adding the offset to the trigger signal, and the data (j0) generated using, for example, the upper 8 bits of the same random number, the data (n1, j1) is generated using, for example, the lower 8 bits of each of the n0-th and j0-th random numbers RN from the one at the time t(0) or t(1) which numbers correspond to the times t(n0) and t(j0), respectively, and the data (n1, j1) is generated using, for example, upper 5 bits of each of the same random numbers. Then, the rotating direction and rotation length set on the basis of the data (n2, j2) are used to rotate the (n0+n1)-th and (j0+j1)-th random numbers RN from the one at the time t(0) or t(1) which numbers correspond to the times t(n0+n1) and t(j0+j1), respectively. Then, the rotated random numbers are scrambled to obtain random number data set as the value for the probability generation position. (For a timing waveform, see FIG. 42.)

This arrangement comprises three control circuits 3a to 3c, four registers 4a to 4d, five comparators 6a to 6e, two shift registers 5a and 5b, and three counters 7a to 7c.

With the probability generating apparatus 1 according to the second embodiment described above in FIGS. 25 to 44, although not shown in the drawings, the probability lower limit value, the probability upper limit value, or the value for the probability generation position may be inverted in accordance with the contents of the random number (for example, the 1/0 state of a predetermined bit) corresponding to the time t(0) when the trigger signal is generated or the random number corresponding to the timing t(1) obtained by adding an offset to the trigger signal.

Figure 45A:
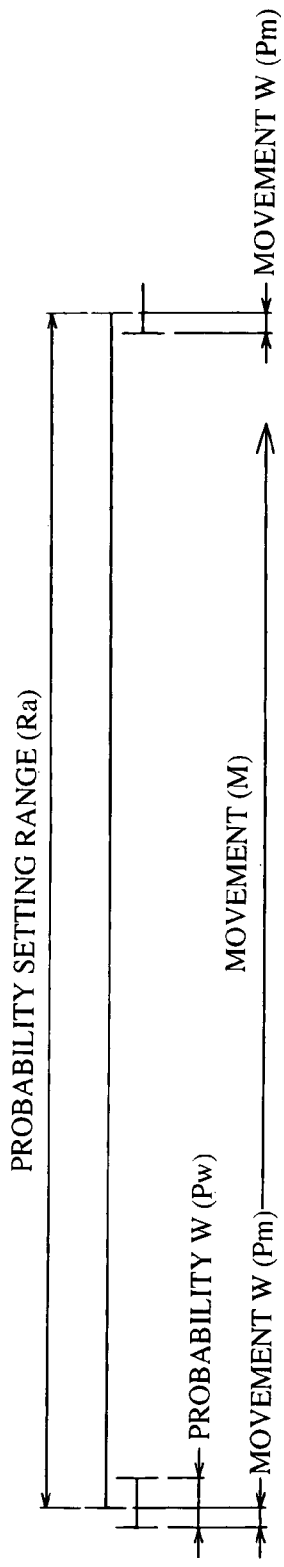
FIG. 45 is a diagram showing movement of the probability width of the probability generating apparatus according to the second embodiment of the present invention.
Figure 45B:
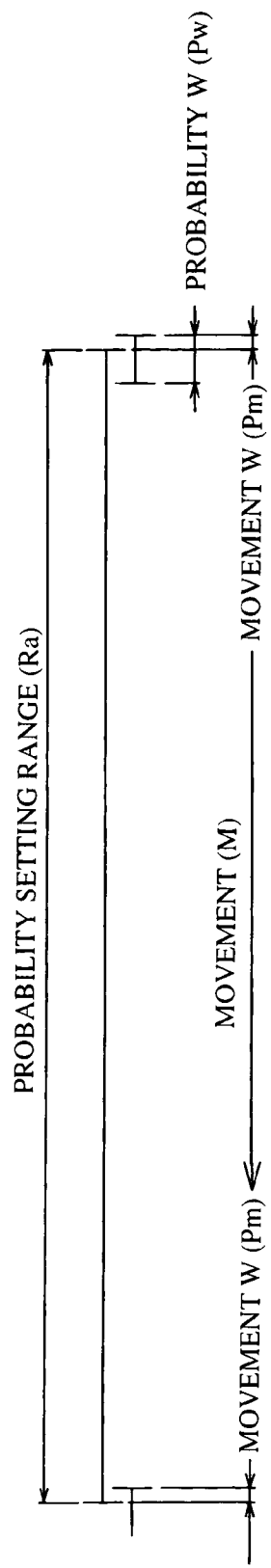

In the second embodiment, it is assumed that the probability width (Pw) lies out of the probability setting range as a result of movement of the probability width (Pw) based on the probability lower limit value, probability upper limit value, or value for the probability generation position. Then, as shown in FIGS. 45(a) and 45(b), the probability width can always be set within the probability setting range by moving the part (Pm) of the probability width (Pw) which lies out of the probability setting range, to the opposite side of the probability setting range (Ra). This eliminates the situation in which erroneous range data precludes generation of the probability. Therefore, an accurate reliable probability signal can always be outputted.

Figure 46:
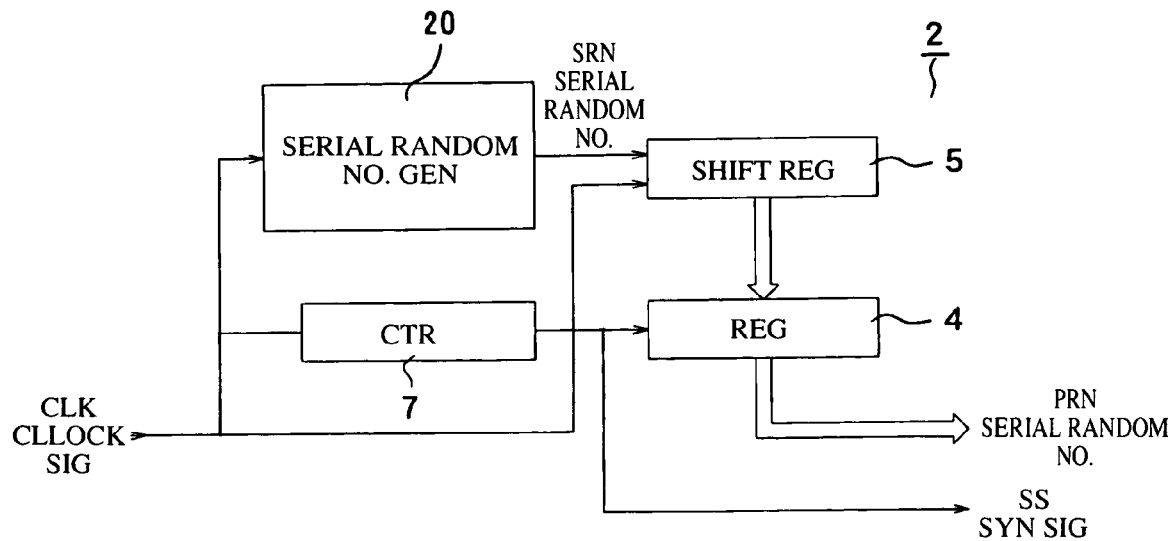
FIG. 46 is a diagram showing the configuration of a parallel random number generator according to the present invention.
Figure 47:
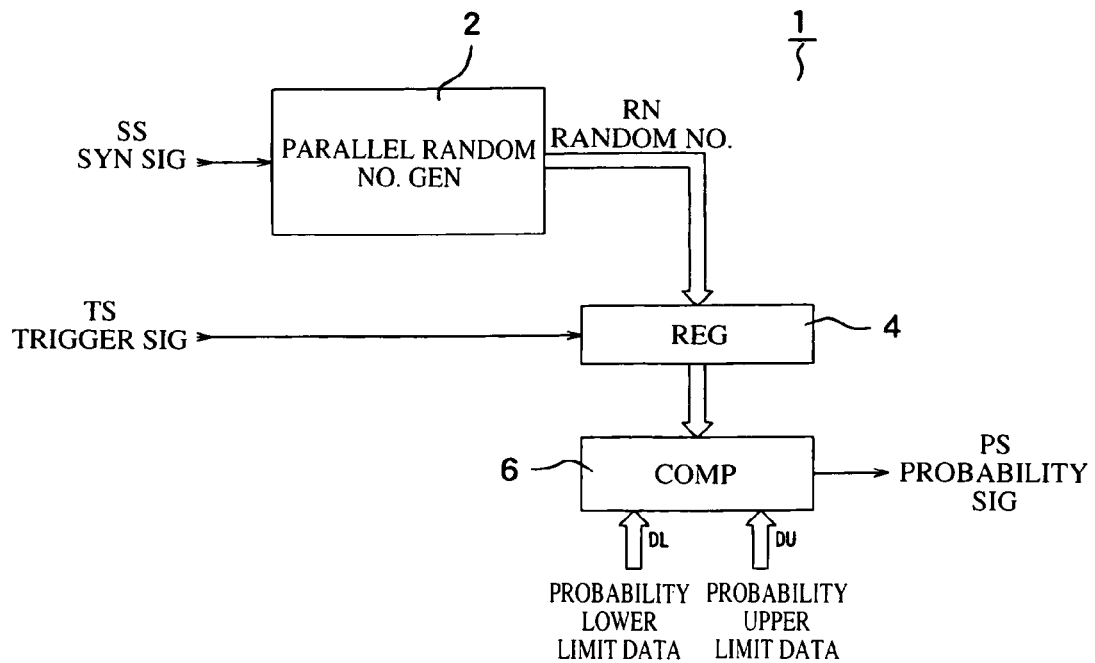
FIG. 47 is a diagram showing the configuration of a common probability generating apparatus.
Figure 48:
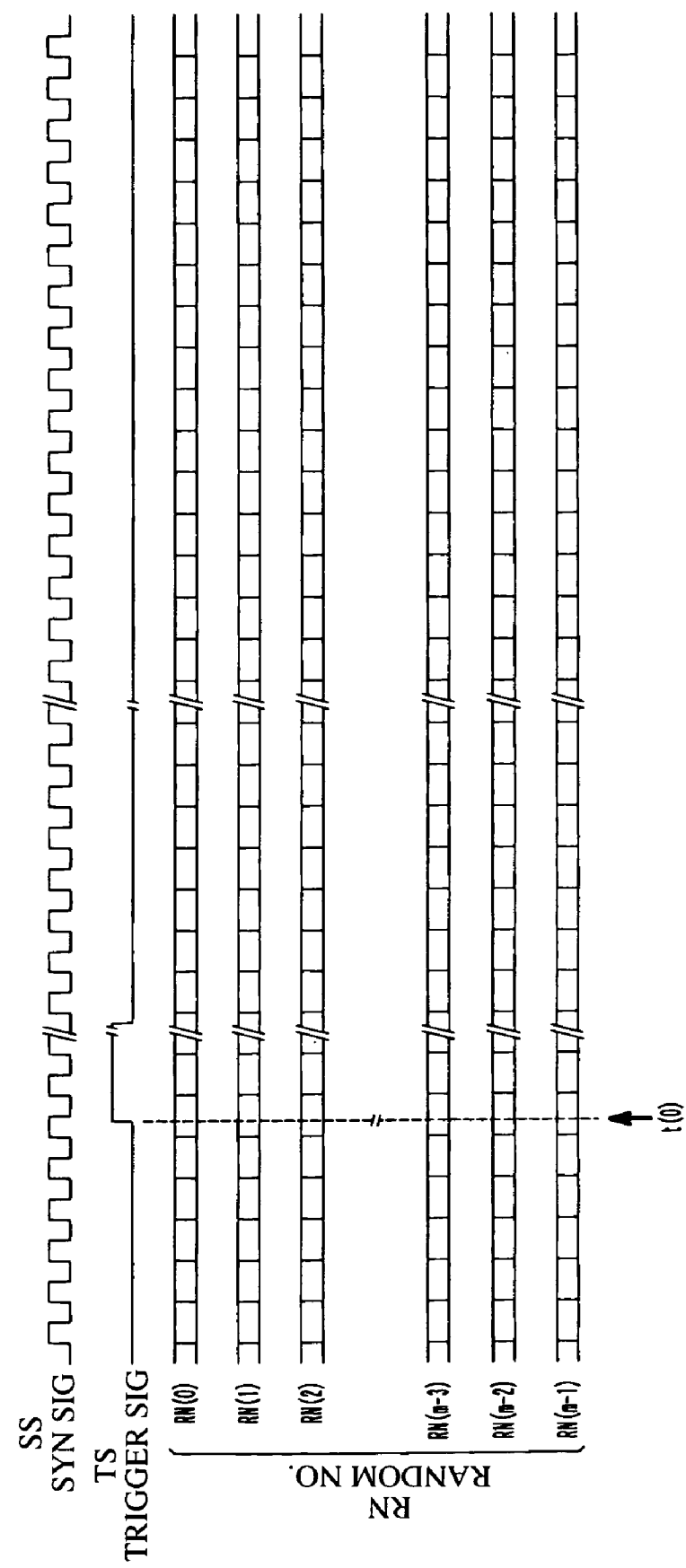
FIG. 48 is a timing waveform diagram of the probability generating apparatus in FIG. 47.

A serial random number generator 20 can be used to relatively easily construct the parallel random number generator 2 offering uniformity and used in the probability generating apparatus 1 according to the first and second embodiments. FIG. 46 shows such an embodiment. The generator 2 is composed of the 1-bit serial random number generator 20 offering uniformity, the shift register 5 that serially loads a serial random number SRN output from the random number generator 20, and the register 4 that sets the serial data in the shift register 5 every specified bit length (n bits). The register 4 outputs parallel random numbers RN(0) to RN(n-1) composed of n bits in synchronization with the synchronous signal SS. In FIG. 46, reference character SRN denotes a serial random number, and reference character PRN denotes a parallel random number. Reference character CLK denotes a clock signal, and reference numeral 7 denotes a counter.

The probability generating apparatus according to the present invention described above offers unexpectedness and an excellent unfair-act preventing function and can be wholly digitalized. Accordingly, the probability generating apparatus can be easily constructed into an LSI. When a one-chip LSI is composed of the present probability generating apparatus 1 and a CPU that executes various data calculating processes in order to generate probability, the LSI has a reduced size and is very productive. Such an LSI can be inexpensively supplied and used to generate the probability of a win/loss for pinball machines, pinball slot machines, and other game machines, which are expected to be very marketable.

As described above, according to the present invention, the data for generation of probability is a random number which is contained in a row of uniform random numbers generated by the parallel random number generator and which is generated at an indeterminate time after the trigger signal is generated; it is impossible to synchronize with this indeterminate time. Consequently, it is virtually impossible to determine a timing for committing an unfair act such as an unfair read of internal data. Furthermore, the data for generation of probability changes every time the trigger signal is generated. It is thus possible to provide a probability generating apparatus that offers unexpectedness and an excellent unfair-act preventing function.

Furthermore, according to the present invention, the position where the range data is set varies every time the trigger signal is generated, the range data being compared with the data for generation of possibility in generating probability. Correspondingly, the win data contained in the random number data for generation of probability which data provides a specified probability varies randomly. This makes it possible to provide a probability generating apparatus offering unexpectedness and an excellent unfair-act preventing function.

Moreover, according to the present invention, an unexpected random number is outputted together with the probability signal. Accordingly, using this random number for a win mode, a flower pattern, a probability variation, or the like for game machines or the like, it is possible to provide game machines with a marked gambling nature.

Now, with reference to FIGS. 49 to 63, description will be given of the embodiments of the probability generating apparatus according to the present invention.

Figure 49:
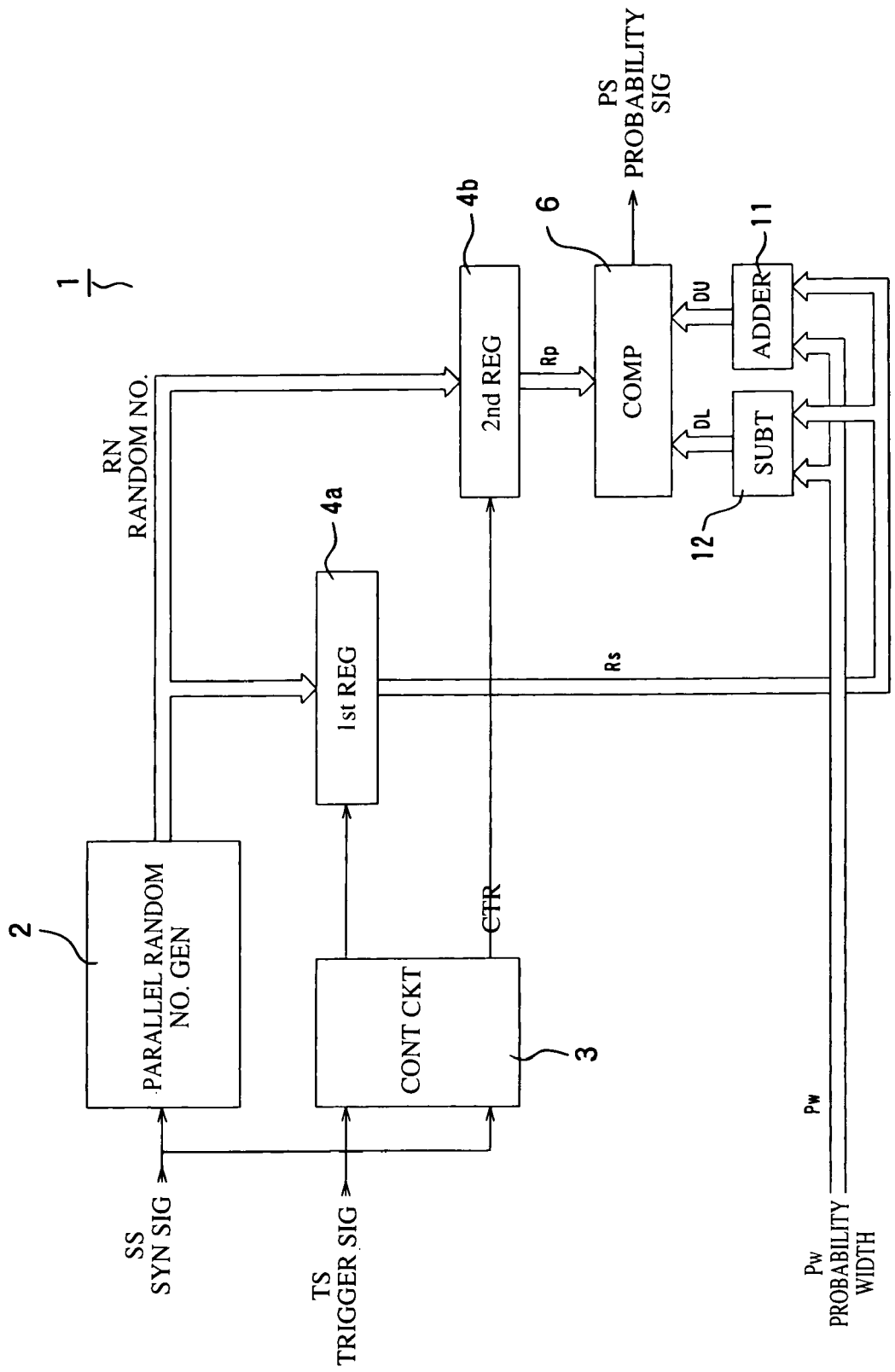
FIG. 49 is a diagram showing the basic configuration of the probability generating apparatus according to the present invention.

FIG. 49 shows the basic configuration of the probability generating apparatus 1 according to the present invention. The parallel random number generator 2 is used, which consecutively generates random numbers RN each composed of uniform n bits in synchronization with the synchronous signal SS (clock). The random number corresponding to the time when the trigger signal (for example, in the case of a game machine, a lottery number generated by a hit signal generated by prizewinning sensor) is inputted is set as data Rp for generation of probability. Furthermore, the value for the probability generation position Rs is set, which can be freely varied within the probability setting range at an arbitrary time or using an arbitrary timing. The subtractor 7 then subtracts half the present probability width Pw from the value for the probability generation position Rs to obtain the probability lower limit data DL. The adder 8 adds half the present probability width Pw to the value for the probability generation position Rs to obtain the probability upper limit data DU. As in the case with the conventional arrangement shown in FIG. 47, the data Rp for generation of probability is compared with the range data specified by the probability lower limit data DL and the probability upper limit data DU to output the probability signal PS for a win/loss on the basis of the relationship between the data Rp and the range data.

In this case, the control circuit 3 in FIG. 49 receives the inputted synchronous signal SS and trigger signal TS to generate a timing for setting the random number Rp for generation of probability, in the second register 4b and a timing for setting the random number Rs for the probability generation position in the first register 4a.

FIG. 50 shows the relationship between the probability P and both the probability width Pw and probability lower limit value Rl within the probability setting range Ra. This figure indicates that with uniform data for generation of probability, the probability obtained (P=Pw/Ra) is always fixed even if the value for the probability generation position varies arbitrarily as with the values for probability generation positions Rs-1 and Rs-2, shown in FIG. 50, as long as the probability setting range Ra and the probability width Pw are always fixed within the probability setting range Ra.

Naturally enough, the value for the probability generation position Rs must be set so that the probability lower limit data DL and the probability upper limit data DU are always present within the probability setting range Ra. However, if the probability width Pw lies out of the probability setting range as a result of movement of the probability width Pw, then as shown in FIGS. 51A and 51B, the probability width can always be set within the probability setting range by moving the part Pm of the probability width Pw which lies out of the probability setting range, to the opposite side of the probability setting range Ra. This eliminates the situation in which erroneous range data precludes generation of the probability. Therefore, an accurate reliable probability signal can always be outputted.

With the above arrangement, the value for the probability generation position Rs varies every time the trigger signal is generated. This sequentially varies the position where the range data is set. Correspondingly, the win data contained in the random number data for generation of probability which data provides a specified probability varies randomly. This makes it possible to provide a probability generating apparatus offering unexpectedness as well as an excellent unfair-act preventing function. This apparatus is ideal particularly for a probability generator for game machines (for example, pinball machines, pinball slot machines, games or the like).

The present invention serves to provide game machines or the like which arouse players' interests in the games and which have gambling nature. The present invention thus adds various probability increasing functions to the probability generating apparatus 1 offering unexpectedness and an excellent unfair-act preventing function. This in turn provides a player with unexpected prizewinning, and the player has much hope of prizewinning and enjoys fair speculativeness (prevention of a heavy loss). Such embodiments will be described below.

First, a third embodiment of the present invention, shown in FIG. 52, is the probability generating apparatus 1 shown in FIG. 49 to which a multiplier 14 is added. The multiplier 14 modulates a predetermined initial probability width Pw using a probability increase factor Fi based on a preset function for the number of lotteries. The multiplier 14 thus generates and outputs new probability width data that increases consistently with the number of consecutive losses. The new probability width data is used for a probability variation.

Specifically, the value for the probability generation position Rs is set as the random number set in the first register 4a using a timing determined using the trigger signal TS as a start point. The multiplier 14 then multiplies half the predetermined initial probability width Pw by the probability increase factor Fi. The subtractor 12 then subtracts the value obtained by the multiplication from the value for the probability generation position Rs to obtain the probability lower limit data DL. The adder 11 adds the multiplication output from the multiplier 14 to the value for the probability generation position Rs to obtain the probability upper limit data DU.

Since the probability lower limit data DL and the probability upper limit data DU increase on the basis of the probability increase factor Fi, the probability value obtained increases in accordance with the increase pattern of the increase factor. For example, for game machines or the like, as the number of consecutive losses based on the trigger signal (lottery signal) increases, the probability of prizewinning for each lottery increases in accordance with a predetermined pattern.

Figure 53:
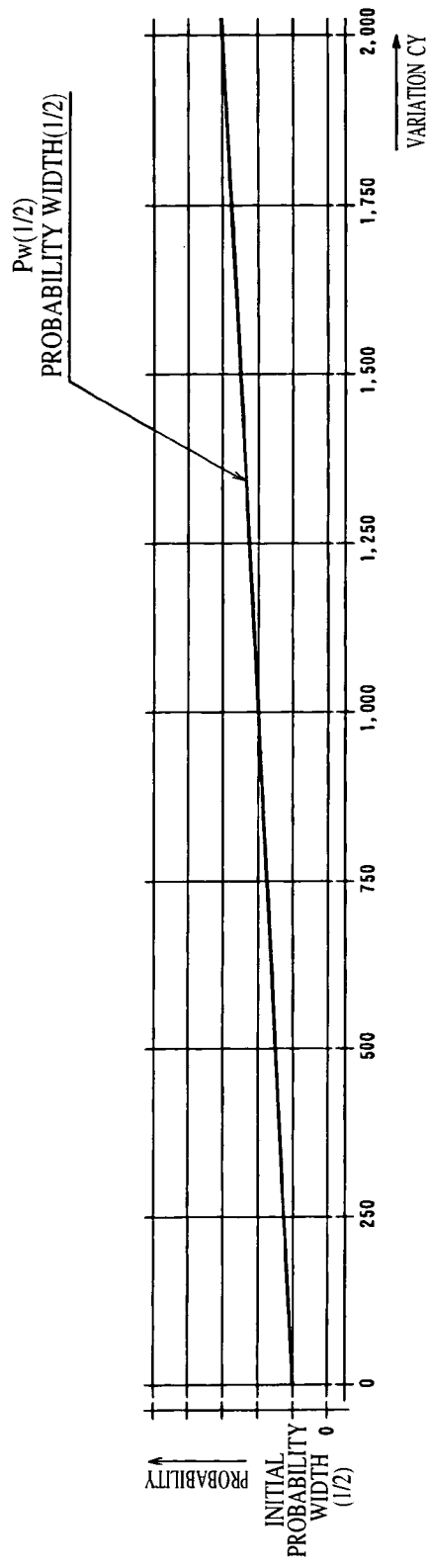
FIG. 53 is a graph showing a probability variation made by a probability generating apparatus that uses a probability increase factor based on a linear function.

FIG. 53 shows a probability variation in which the probability width Pw increases linearly (i.e. linear-functionally) at a fixed increase rate from its initial value (initial probability width) on the basis of the probability increase factor (for example, the increase factor is based on a linear function defined by 1+n/1,000).

Table 1 shows the average probability, the initial probability, the number of lotteries (the number of consecutive losses), and the value of the probability of a loss all of which are calculated on the basis of the increase factor. When Tables 1 and 6 are compared with each other for the relationship between the number of consecutive losses and the value of the probability of a loss at a specified probability, it is found that in the present invention, the probability of a loss decreases sharply with increasing number of consecutive losses. It is thus possible to substantially zero the possibility of causing a player a heavy loss. This provides the player unexpected prizewinning, and the player has much hope of prizewinning and enjoys fair speculativeness (prevention of a heavy loss). Thus, the player's interest in the game is aroused and the gambling nature of the game is enhanced.

Once prizewinning occurs, one cycle of the first probability variation is completed. Then, the probability increase factor returns to its initial value of 1 to return the probability width to its initial value. Then, the next cycle of a probability variation starts. Subsequently, the above process is repeated.

In this case, the inclination of the above probability increase pattern can be properly set on the basis of the time for which the player plays the game, the type of the game machine, statistical data such as a variation in the number of balls obtained by the player, and the like. In the above embodiment, description has been given of the probability generating apparatus 1 intended for the probability setting position and the probability width. However, the above embodiment is also applicable to probability generating apparatuses having the configurations shown below in FIGS. 54 and 55.

Figure 54:
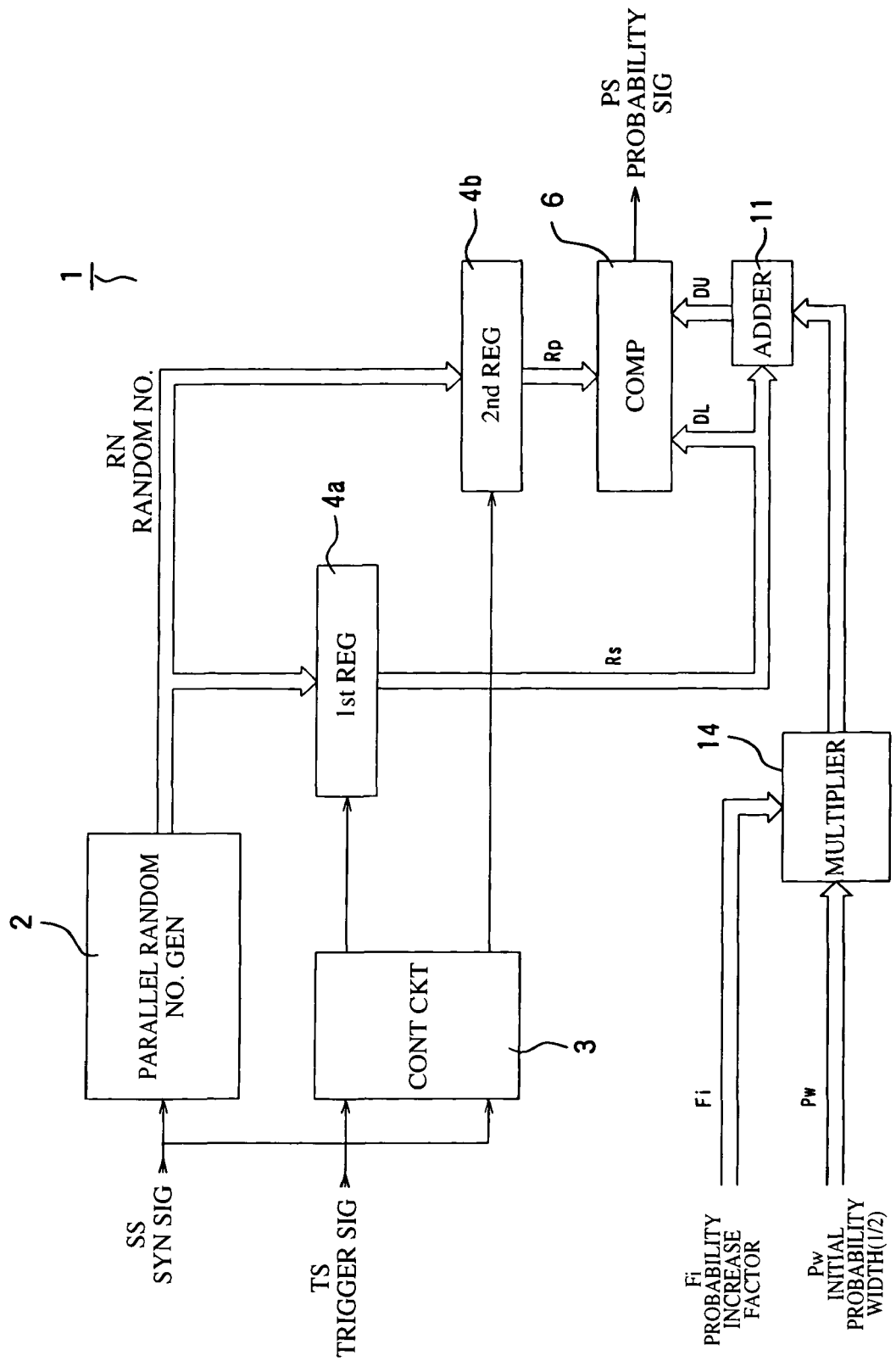
FIG. 54 is a diagram showing the configuration of the probability generating apparatus according to the third embodiment of the present invention, the configuration being different from that shown in FIG. 52.

In FIG. 54, the probability lower limit value Rl (that is, the probability lower limit data DL) is set as a random number set in the first register 4a using a timing determined using the trigger signal TS as a start point. The multiplier 14 then multiplies the predetermined initial probability width Pw by the probability increase factor Fi. The adder 11 then adds the value obtained by the multiplication to the probability lower limit value Rl to obtain the probability upper limit data DU.

Figure 55:
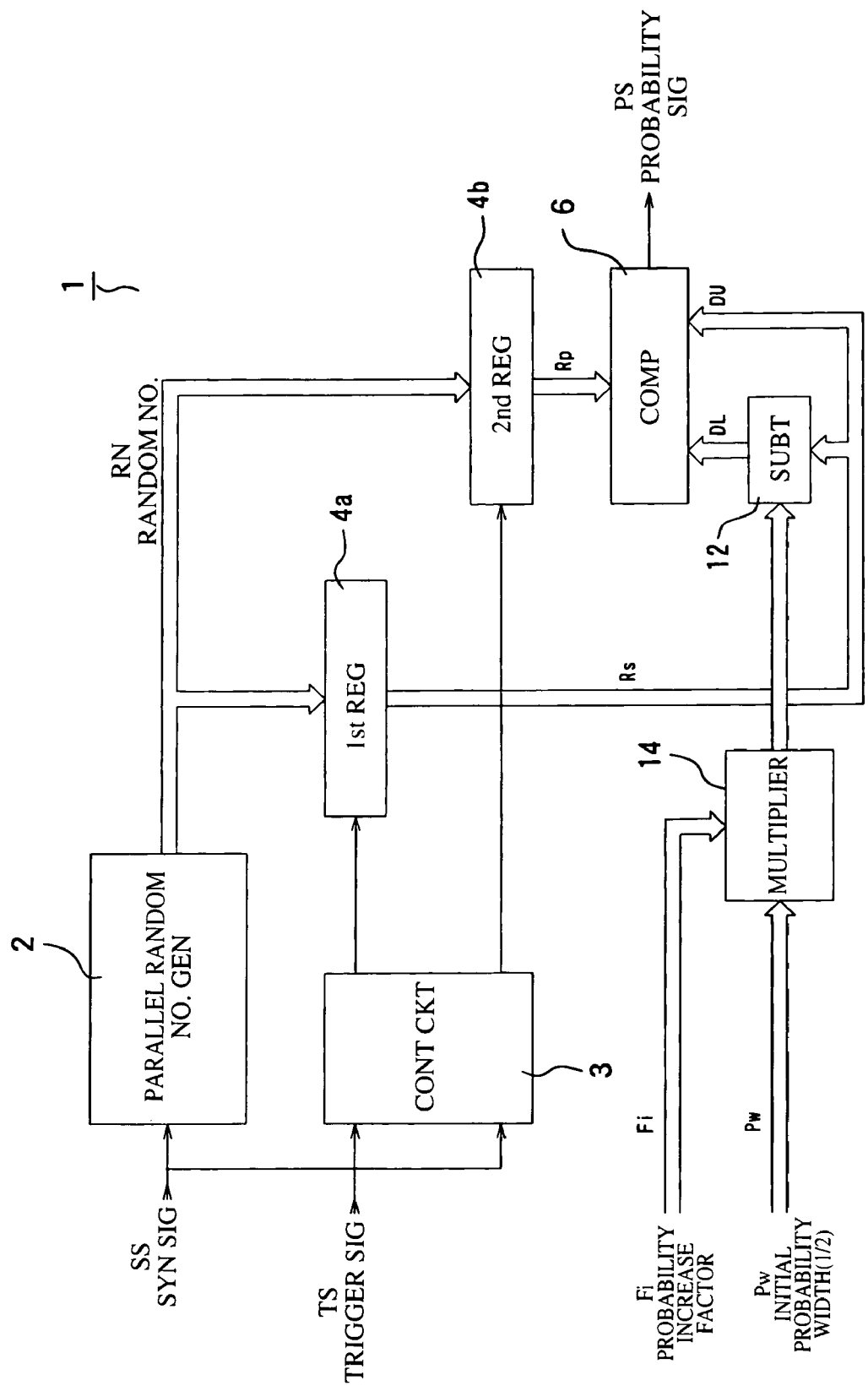
FIG. 55 is a diagram showing the configuration of the probability generating apparatus according to the third embodiment of the present invention, the configuration being different from that shown in FIG. 54.

In FIG. 55, the probability upper limit value Rs (that is, the probability upper limit data DU) is set as a random number set in the first register 4a using a timing determined using the trigger signal TS as a start point. The multiplier 14 then multiplies the predetermined initial probability width Pw by the probability increase factor Fi. The subtractor 12 then subtracts the value obtained by the multiplication from the probability upper limit value Rs to obtain the probability lower limit data DL.

In any of the above arrangements, the probability lower limit data DL or the probability upper limit data DU increases consistently with the number of consecutive losses on the basis of the predetermined increase factor pattern. Thus, as in the previously described embodiment, unexpectedness is offered and the player has much hope of prizewinning and enjoys fair speculativeness (prevention of a heavy loss).

Now, a fourth embodiment will be described with reference to FIG. 56.

In the present embodiment, a probability increase factor generating circuit 15 is added to the probability generating apparatus 1 shown in FIG. 52. The probability increase factor generating circuit 15 receives the inputted trigger signal TS (lottery signal), reset signal RS (initialization signal), and probability signal PS and generates and outputs the probability increase factor Fi that increases consistently with the number of consecutive losses in accordance with a predetermined pattern. The generated probability increase factor Fi is inputted to the multiplier 14, which then multiplies it by half an initial probability width Pw.

FIGS. 59 to 63 show typical examples of the increase factor pattern. Tables 1 to 5 show the relationship between the number of lotteries (the number of consecutive losses) and the value of the probability of a loss observed if each probability increase factor is applied. In any case, the average probability can be calculated from the initial probability value and each probability increase factor pattern on the basis of a predetermined equation.

Figure 59:
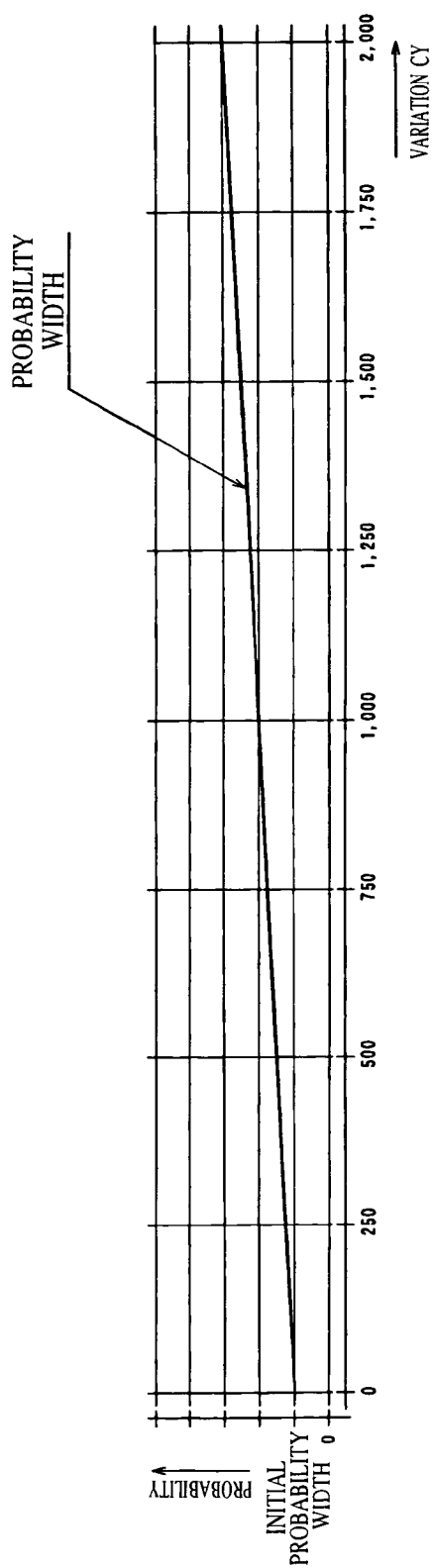
FIG. 59 is a graph showing a probability increase factor pattern based on a linear function.

Here, FIG. 59 is similar to FIG. 53 and shows an increase factor pattern in which the probability increases linear-functionally at a uniform increase rate from a preset initial value from the start of lotteries (generation of the trigger signal) until prizewinning occurs. Table 1 shows the corresponding relationship between the number of lotteries and the value of the probability of a loss.

Figure 60:
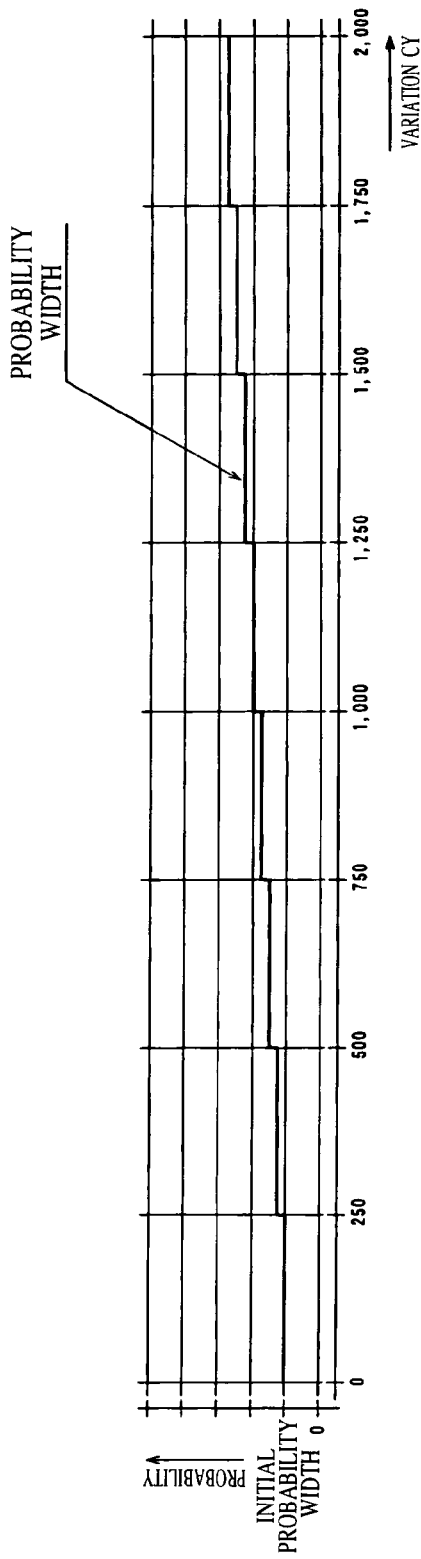
FIG. 60 is a graph showing a probability increase factor pattern based on a step function.

FIG. 60 shows an increase factor pattern in which the probability increases step by step at a fixed increase rate at fixed intervals from the start of lotteries until prizewinning occurs. In the present example, the increase rate is set to change every 250 consecutive losses. Table 2 shows the corresponding relationship between the number of lotteries and the value of the probability of a loss.

Figure 61:
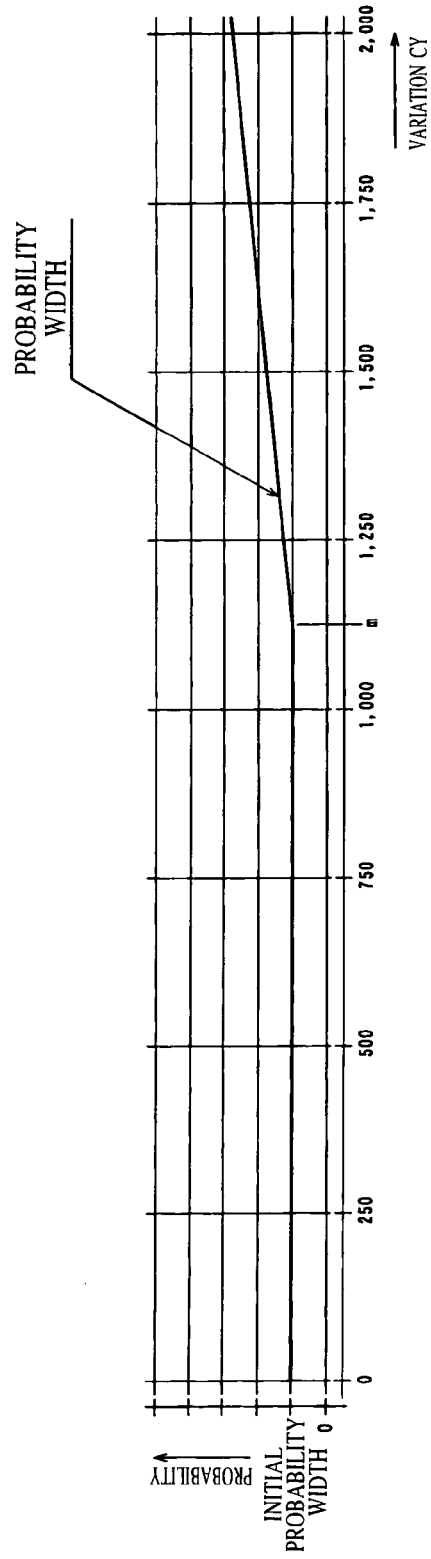
FIG. 61 is a graph showing a probability increase factor pattern based on a linear function and which is generated after a specified number of losses.

FIG. 61 shows an increase factor pattern in which the probability remains fixed to an initial probability value from the start of lotteries until the specified number of losses m (in the present example, this value is set at about 1,125) is reached and in which the probability subsequently increases linear-functionally at a uniform increase rate until prizewinning occurs. Table 3 shows the corresponding relationship between the number of lotteries and the value of the probability of a loss.

Figure 62:
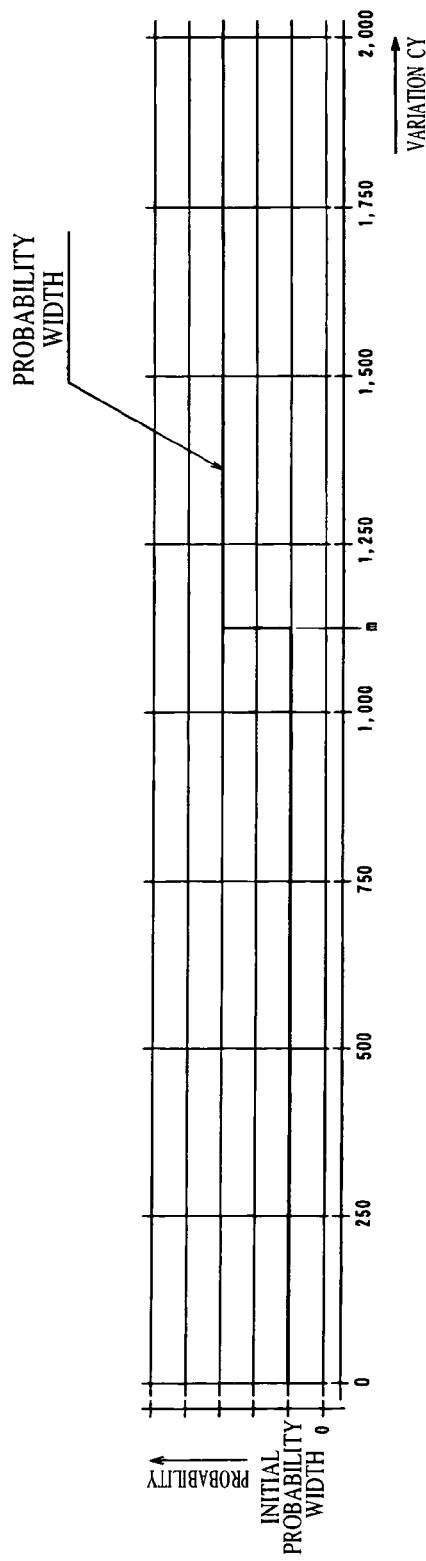
FIG. 62 is a graph showing a probability increase factor pattern based on a 1-step-like function and which is generated after a specified number of losses.

FIG. 62 shows a one-step-like increase factor pattern in which the probability remains fixed to an initial probability value from the start of lotteries until the specified number of losses m is reached and in which the probability subsequently remains fixed at a fixed large value until prizewinning occurs. Table 4 shows the corresponding relationship between the number of lotteries and the value of the probability of a loss.

Figure 63:
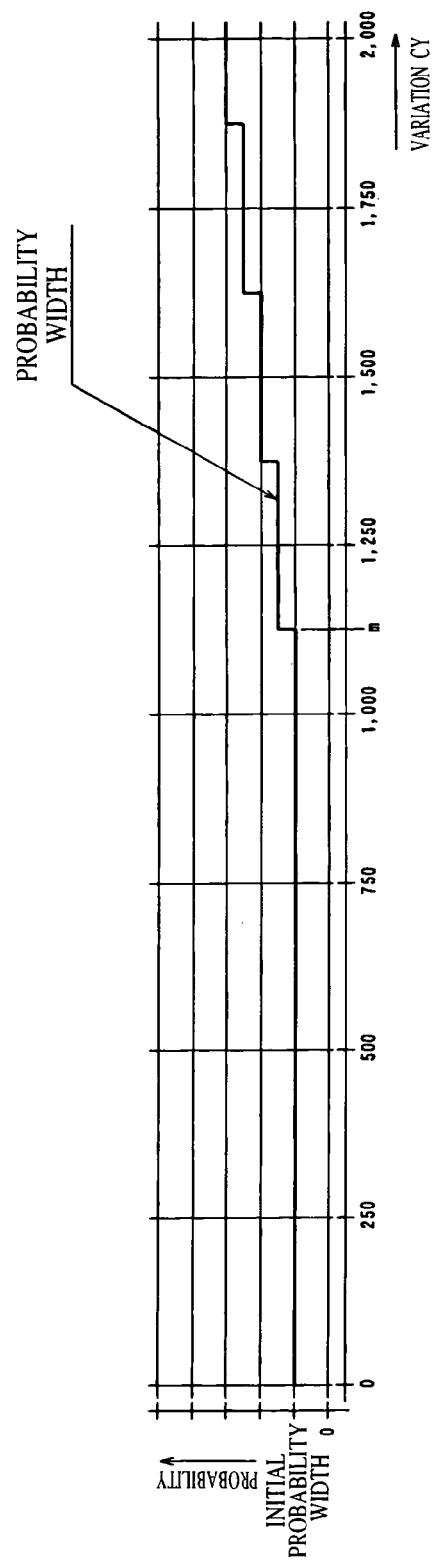
FIG. 63 is a graph showing a probability increase factor pattern based on a step function and which is generated after a specified number of losses.

FIG. 63 shows an increase factor pattern in which the probability remains fixed to an initial probability value from the start of lotteries until the specified number of losses m is reached and in which the probability subsequently increases step by step at a fixed increase rate at fixed intervals until prizewinning occurs. Table 5 shows the corresponding relationship between the number of lotteries and the value of the probability of a loss.

In FIGS. 60 to 63, the step by step increase rate or the specified number of losses m in each increase factor pattern can be properly set on the basis of the time for which the player plays the game, the type of the game machine, statistical data such as a variation in the number of balls obtained by the player, and the like.

TABLE 1

| Initial probability | Number of lotteries (n) | | | |
|---|---|---|---|---|
| | 500 | 1,000 | 1,500 | 2,000 |
| 1/100 | $1.85\ 10^{-3}$ | $2.70\ 10^{-7}$ | $3.09\ 10^{-12}$ | $2.71\ 10^{-18}$ |
| 1/200 | $4.34\ 10^{-2}$ | $5.36\ 10^{-4}$ | $1.87\ 10^{-6}$ | $1.84\ 10^{-9}$ |
| 1/300 | $1.24\ 10^{-1}$ | $6.64\ 10^{-3}$ | $1.54\ 10^{-4}$ | $1.54\ 10^{-6}$ |
| 1/400 | $2.09\ 10^{-1}$ | $2.33\ 10^{-2}$ | $1.39\ 10^{-3}$ | $4.41\ 10^{-5}$ |
| 1/500 | $2.86\ 10^{-1}$ | $4.95\ 10^{-2}$ | $5.19\ 10^{-3}$ | $3.29\ 10^{-4}$ |

TABLE 2

| Initial probability | Number of lotteries (n) | | | |
|---|---|---|---|---|
| | 500 | 1,000 | 1,500 | 2,000 |
| 1/100 | $3.47\ 10^{-3}$ | $9.57\ 10^{-7}$ | $2.06\ 10^{-11}$ | $3.43\ 10^{-17}$ |
| 1/200 | $5.94\ 10^{-2}$ | $1.00\ 10^{-3}$ | $4.79\ 10^{-6}$ | $6.46\ 10^{-9}$ |
| 1/300 | $1.53\ 10^{-1}$ | $1.01\ 10^{-2}$ | $2.88\ 10^{-4}$ | $3.55\ 10^{-6}$ |
| 1/400 | $2.44\ 10^{-1}$ | $3.19\ 10^{-2}$ | $2.22\ 10^{-3}$ | $8.24\ 10^{-5}$ |
| 1/500 | $3.24\ 10^{-1}$ | $6.35\ 10^{-2}$ | $7.55\ 10^{-3}$ | $5.42\ 10^{-4}$ |

TABLE 3

| Initial probability | Number of lotteries (n) | | | |
|---|---|---|---|---|
| | 500 | 1,000 | 1,500 | 2,000 |
| 1/100 | $6.57\ 10^{-3}$ | $4.32\ 10^{-5}$ | $5.54\ 10^{-8}$ | $2.52\ 10^{-13}$ |
| 1/200 | $8.16\ 10^{-2}$ | $6.65\ 10^{-3}$ | $2.41\ 10^{-4}$ | $5.35\ 10^{-7}$ |
| 1/300 | $1.88\ 10^{-1}$ | $3.55\ 10^{-2}$ | $3.90\ 10^{-3}$ | $6.68\ 10^{-5}$ |
| 1/400 | $2.86\ 10^{-1}$ | $8.18\ 10^{-2}$ | $1.56\ 10^{-2}$ | $7.43\ 10^{-4}$ |
| 1/500 | $3.68\ 10^{-1}$ | $1.35\ 10^{-1}$ | $3.59\ 10^{-2}$ | $3.15\ 10^{-3}$ |

TABLE 4

| Initial probability | Number of lotteries (n) | | | |
|---|---|---|---|---|
| | 500 | 1,000 | 1,500 | 2,000 |
| 1/100 | $6.57\ 10^{-3}$ | $4.32\ 10^{-5}$ | $1.32\ 10^{-10}$ | $3.21\ 10^{-17}$ |
| 1/200 | $8.16\ 10^{-2}$ | $6.65\ 10^{-3}$ | $1.22\ 10^{-5}$ | $6.36\ 10^{-9}$ |
| 1/300 | $1.88\ 10^{-1}$ | $3.55\ 10^{-2}$ | $5.36\ 10^{-4}$ | $3.52\ 10^{-6}$ |
| 1/400 | $2.86\ 10^{-1}$ | $8.18\ 10^{-2}$ | $3.54\ 10^{-3}$ | $8.20\ 10^{-5}$ |
| 1/500 | $3.68\ 10^{-1}$ | $1.35\ 10^{-1}$ | $1.10\ 10^{-2}$ | $5.41\ 10^{-4}$ |

TABLE 5

| Initial probability | Number of lotteries (n) | | | |
|---|---|---|---|---|
| | 500 | 1,000 | 1,500 | 2,000 |
| 1/100 | $6.57\ 10^{-3}$ | $4.32\ 10^{-5}$ | $2.23\ 10^{-10}$ | $6.98\ 10^{-14}$ |
| 1/200 | $8.16\ 10^{-2}$ | $6.65\ 10^{-3}$ | $1.53\ 10^{-4}$ | $2.83\ 10^{-7}$ |
| 1/300 | $1.88\ 10^{-1}$ | $3.55\ 10^{-2}$ | $2.88\ 10^{-3}$ | $4.38\ 10^{-5}$ |
| 1/400 | $2.86\ 10^{-1}$ | $8.18\ 10^{-2}$ | $1.25\ 10^{-2}$ | $5.41\ 10^{-4}$ |
| 1/500 | $3.68\ 10^{-1}$ | $1.35\ 10^{-1}$ | $3.00\ 10^{-2}$ | $2.44\ 10^{-3}$ |

TABLE 6

| Probability | Number of lotteries (n) | | | |
| --- | --- | --- | --- | --- |
| | 500 | 1,000 | 1,500 | 2,000 |
| 1/100 | $6.57\ 10^{-3}$ | $4.32\ 10^{-5}$ | $2.84\ 10^{-7}$ | $1.86\ 10^{-9}$ |
| 1/200 | $8.16\ 10^{-2}$ | $6.65\ 10^{-3}$ | $5.43\ 10^{-4}$ | $4.43\ 10^{-5}$ |
| 1/300 | $1.88\ 10^{-1}$ | $3.55\ 10^{-2}$ | $6.68\ 10^{-3}$ | $1.26\ 10^{-3}$ |
| 1/400 | $2.86\ 10^{-1}$ | $8.18\ 10^{-2}$ | $2.34\ 10^{-2}$ | $6.70\ 10^{-3}$ |
| 1/500 | $3.68\ 10^{-1}$ | $1.35\ 10^{-1}$ | $4.96\ 10^{-2}$ | $1.82\ 10^{-2}$ |

Tables 1 to 5 indicate that whatever increase factor is applied, the probability of a loss decreases sharply with increasing number of lotteries compared to the lotteries with the fixed probability shown in Table 6. It is thus possible to substantially zero the possibility of causing a player a heavy loss. The player has much hope of prizewinning and enjoys fair speculativeness (prevention of a heavy loss).

Whatever increase factor is applied, once prizewinning occurs, one cycle of the first probability variation is completed. Then, the probability increase factor returns to its initial value of 1 to return the probability width to its initial value. Then, the next cycle of a probability variation starts. Subsequently, the above process is repeated.

The present embodiment is of course applicable not only to the probability generating apparatus 1 intended for the value for the probability setting position and the probability width but also to the probability generating apparatus 1 intended for the probability lower limit value and the probability width or the probability upper limit value and the probability width as in the case with the third embodiment, shown in FIGS. 49 to 55.

Figure 57:
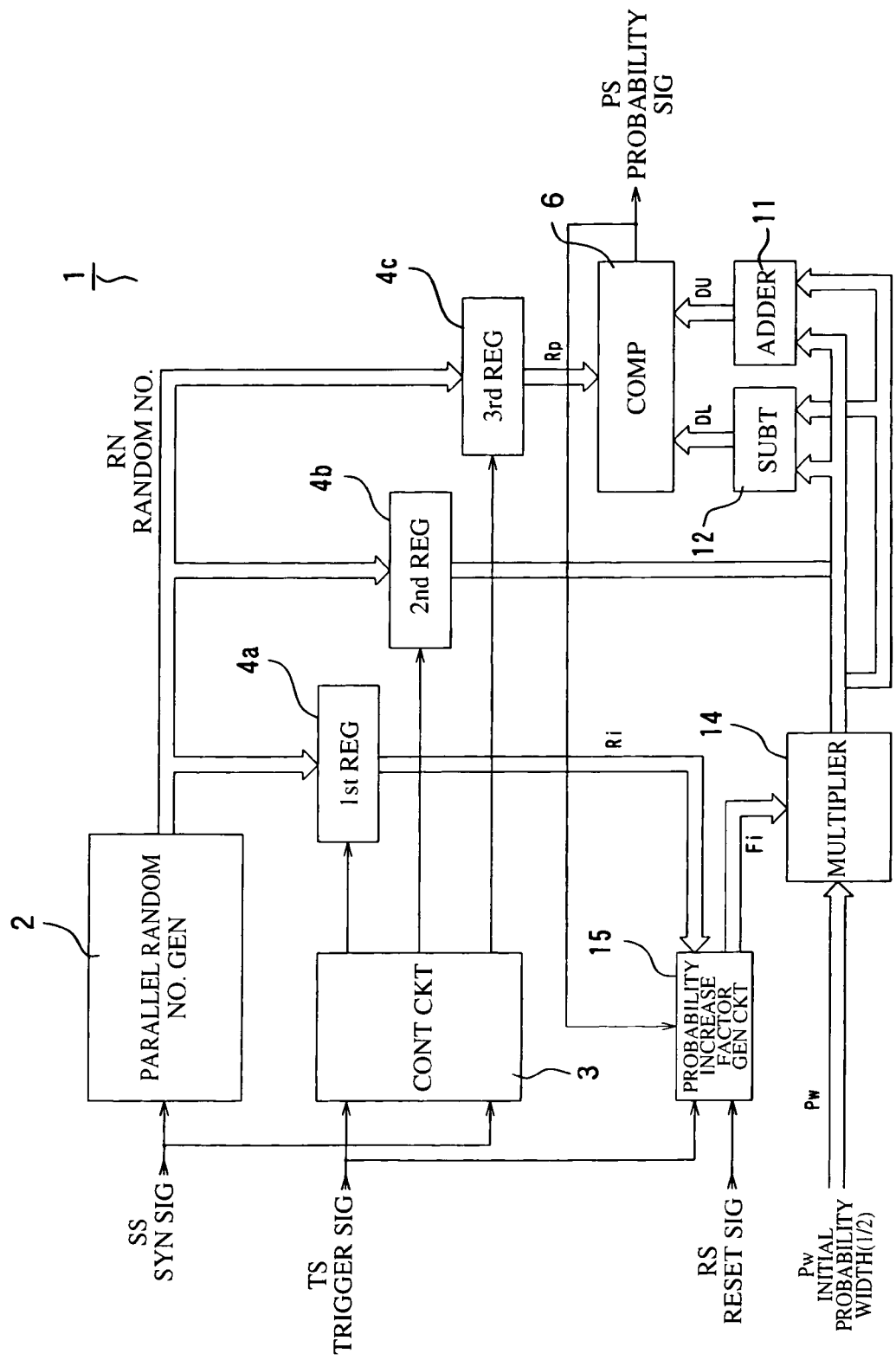
FIG. 57 is a diagram showing the configuration of a probability generating apparatus according to a fifth embodiment of the present invention.

Next, in the fifth embodiment shown in FIG. 57, the first register 4a is newly added to the probability generating apparatus 1 shown in FIG. 56. A uniform random number Ri obtained using the trigger signal TS as a start point is inputted to the probability increase factor generating circuit 15. Then, on the basis of the state of any several bits of the random number Ri, any of the above probability increase factor patterns is selected. Subsequently, the probability increase factor Fi based on the selected pattern is generated and outputted.

In this case, the control circuit 3 in FIG. 57 receives the inputted synchronous signal SS and trigger signal TS to generate a timing for setting the random number Rp for generation of probability, in the third register 4c, a timing for setting the random number Rs for the probability generation position in the second register 4b, and a timing for setting the random number Ri for selection of an increase factor pattern, in the newly provided first register 4a.

Figure 58:
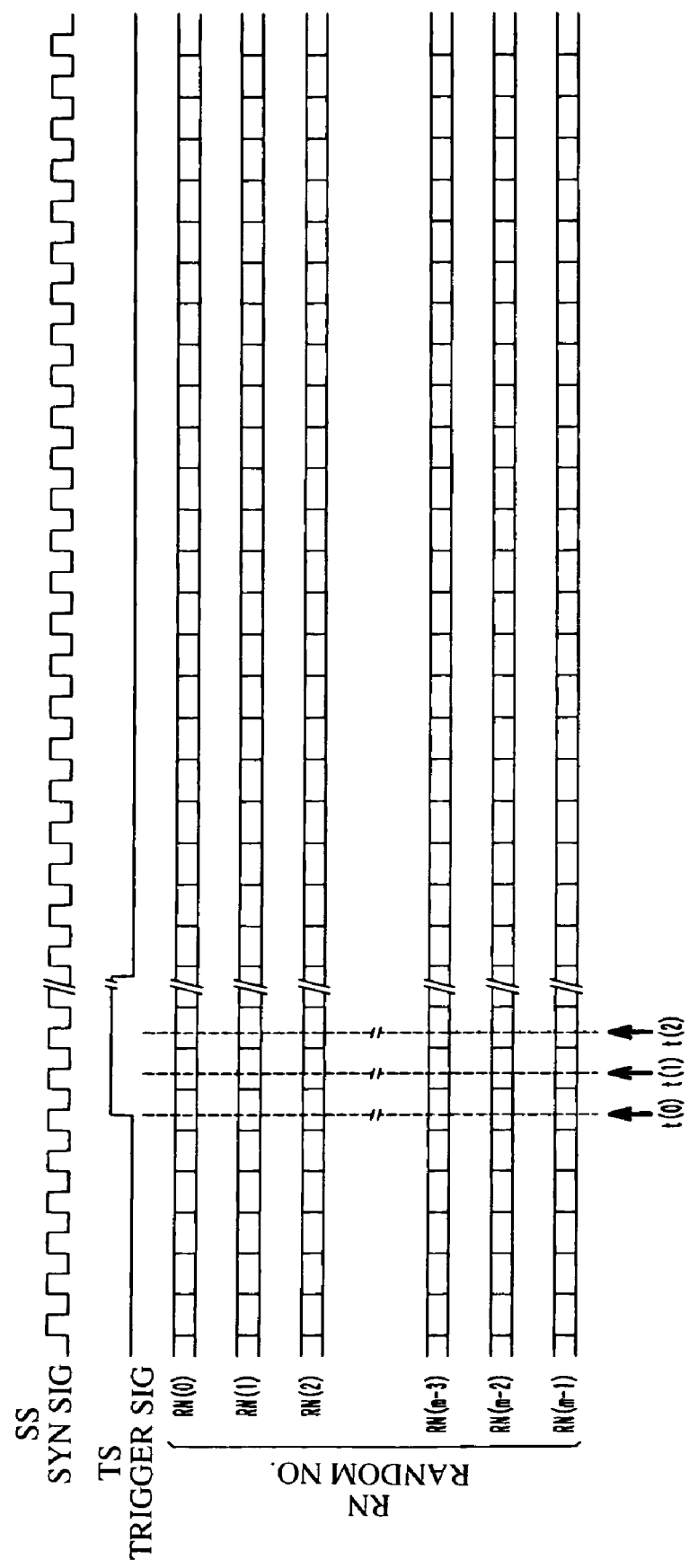
FIG. 58 is a timing waveform diagram of the probability generating apparatus in FIG. 57.

FIG. 58 shows set timings for the above random numbers. The random number Ri for selection of an increase factor pattern is set in the corresponding register at the time t(0). The random number Rs for the probability generation position is set in the corresponding register at the time t(1). The random number Rp for generation of probability is set in the corresponding register at a time t(2).

With the present arrangement, on the basis of the contents of the random number Ri obtained using the trigger signal as a start point after resetting, a variation (increase) in probability is started in accordance with a totally unpredicted increase factor pattern. Then, once prizewinning occurs, on the basis of another random number Ri obtained using the trigger signal as a start point, a totally unpredicted new probability increase factor pattern is selected. Then, a probability increase factor is generated on the basis of the new probability increase factor pattern. Then, on the basis of this probability increase factor, one cycle of a new probability variation is started with an initial probability width. Subsequently, a similar process is repeated.

It is needless to say that the present embodiment is applicable not only to the probability generating apparatus 1 intended for the value for the probability setting position and the probability width but also to the probability generating apparatus 1 intended for the probability lower limit value and the probability width or the probability upper limit value and the probability width as in the case with the previously described third and fourth embodiments.

In the above described third to fifth embodiments, the probability increase factor is used as data for a probability variation. However, a probability increase amount can be used as data for a probability variation. However, although not shown, in this case, the multiplier 14 must be replaced with an adder.

Increase factor patterns for a probability increase amount may tend to exhibit increases similar to those shown in FIGS. 59 to 63. Also with the present arrangement, the probability of a loss decreases sharply with increasing number of consecutive losses. It is thus possible to substantially zero the possibility of causing a player a heavy loss. Therefore, the player has much hope of prizewinning and enjoys fair speculativeness (prevention of a heavy loss).

Furthermore, in the third to fifth embodiments, if the trigger signal TS is not generated for a specified period (for example, 20 minutes), it is possible to execute a process similar to the one executed if prizewinning occurs. That is, the variation cycle with that probability is forcedly ended, and the probability increase factor or the probability increase amount is returned to its initial value to forcedly return the probability width to its initial value. Then, a new cycle of a probability variation is started. This reliably hinders an unfair act such as an unfair increase in the probability of prizewinning.

As described above, according to the present invention, the range data to be compared with the data for generation of probability in generating probability increases in accordance with an increase factor pattern based on the number of losses in the probability signal. Consequently, the probability of a loss decreases sharply with increasing number of consecutive losses. It is thus possible to substantially zero the possibility of causing a player a heavy loss. Consequently, the player has much hope of prizewinning and enjoys fair speculativeness (prevention of a heavy loss). Therefore, the player's interest in the game is aroused and the gambling nature of the game is enhanced.

Furthermore, according to the present invention, the probability increase factor pattern is changed every cycle of a probability variation. A totally unpredicted new probability variation is obtained every time prizewinning occurs. Consequently, the player has more hope of prizewinning.

Moreover, according to the present invention, if the trigger signal (lottery signal) TS is not generated for a specified period, the probability increase factor or the probability increase amount is returned to its initial value. This hinders an unfair act such as an unfair increase in probability of prizewinning.

With reference to FIGS. 64 to 87, description will be given below of an embodiment of a probability generating apparatus according to the present invention.

Figure 64:
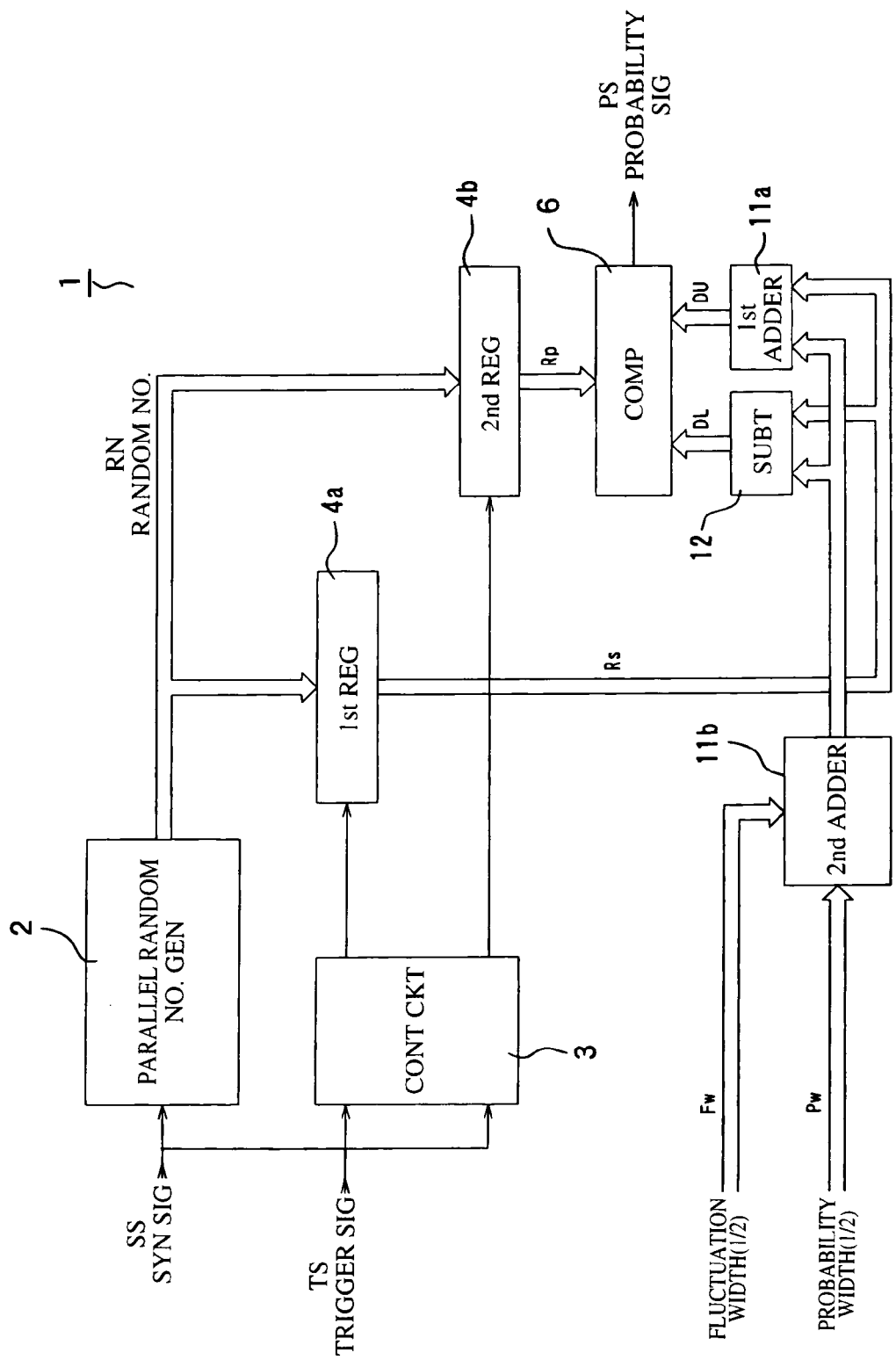
FIG. 64 is a diagram showing the configuration of a probability generating apparatus according to a sixth embodiment of the present invention.

First, in the sixth embodiment of the present invention shown in FIG. 64, a second adder 11*b* is added to the probability generating apparatus 1 shown in FIGS. 28 and 49 as the preceding embodiment. The second adder 11*b* uses a preset fluctuation width Fw to modulate the probability width Pw. A modulation output from the second adder 11b is then used as new probability width data.

Specifically, the value for the probability generation position Rs is set as the random number RN set in the first register 4a using a timing determined using the trigger signal TS as a start point. The second register 11b adds half the predetermined fluctuation width Fw to half the predetermined probability width Pw. The subtractor 12 then subtracts the value obtained by the addition from the value for the probability generation position Rs to obtain the probability lower limit data DL. The first adder 11a adds the addition output from the second adder 11b to the value for the probability generation position Rs to obtain the probability upper limit data DU.

The probability lower limit data DL and the probability upper limit data DU fluctuate in accordance with the fluctuation width Fw. Accordingly, the probability value obtained varies in accordance with a predetermined fluctuation cycle (for example, in game machines or the like, a period in which more prizewinning occurs and a period in which less prizewinning occurs appear periodically). Thus, a player has more hope of prizewinning and gets more of a thrill out of the game. Therefore, the player's interest in the game is aroused and the gambling nature of the game is enhanced.

Figure 65:
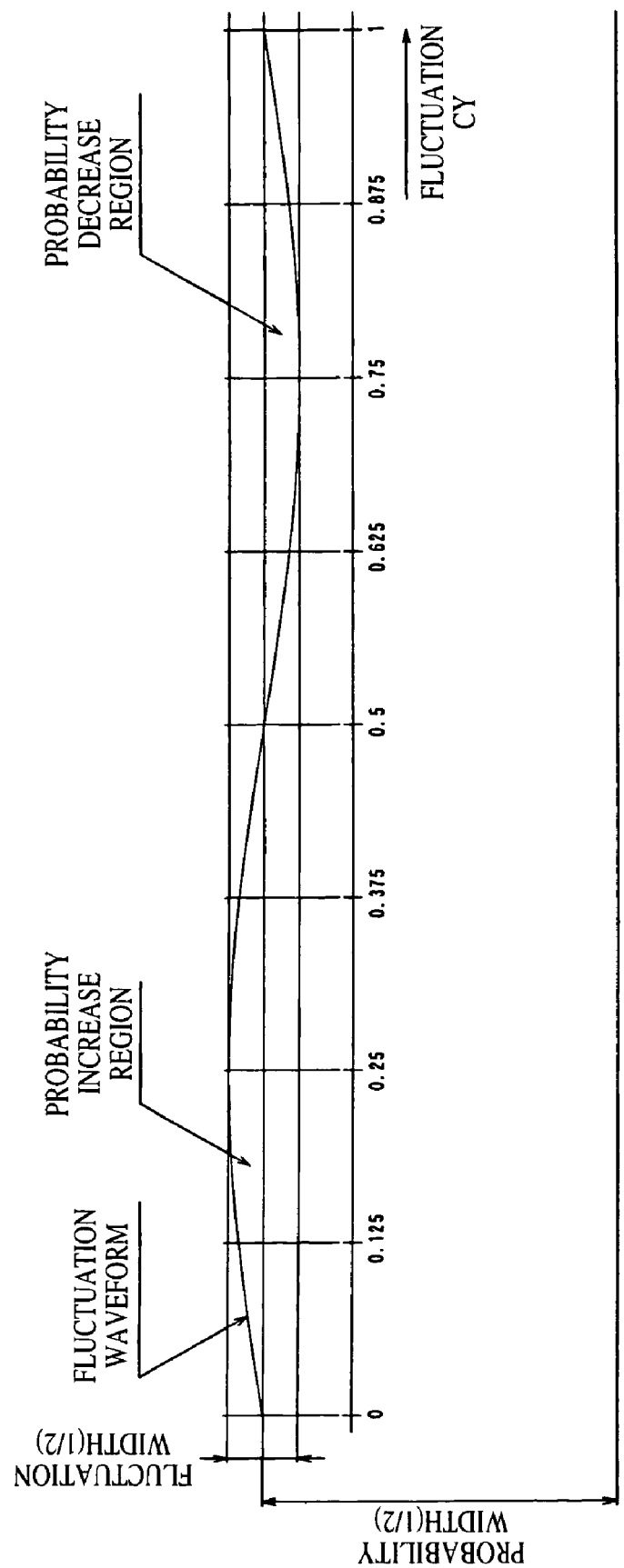
FIG. 65 is a graph showing a probability variation made by the probability generating apparatus according to the sixth embodiment of the present invention.

FIG. 65 shows a variation in probability value based on the probability width Pw and fluctuation width Fw. In this figure, a sine wave is used in which a fluctuation waveform has a cycle (fluctuation cycle) of 1 hour. The probability width varies periodically with a small increase and decrease width equal to half the fluctuation width, using half the probability width as a reference.

In this example, the peak (time axis: 0.25 H) and bottom (time axis: 0.75 H) of the probability of prizewinning are set to appear every 30 minutes. The waveform is thus shaped so that the areas of a probability increase region and a probability decrease region are equivalent to each other within one cycle of fluctuation. Consequently, the probability is generally averaged and equals the probability width Pw. This provides the player with a fair probability, and the player has much hope of prizewinning and gets a thrill out of the game.

In the above embodiment, description has been given of the probability generating apparatus intended for the value for the probability setting position and the probability width. However, the above embodiment is also applicable to probability generating apparatuses having the configurations shown below in FIGS. 66 and 67.

Figure 66:
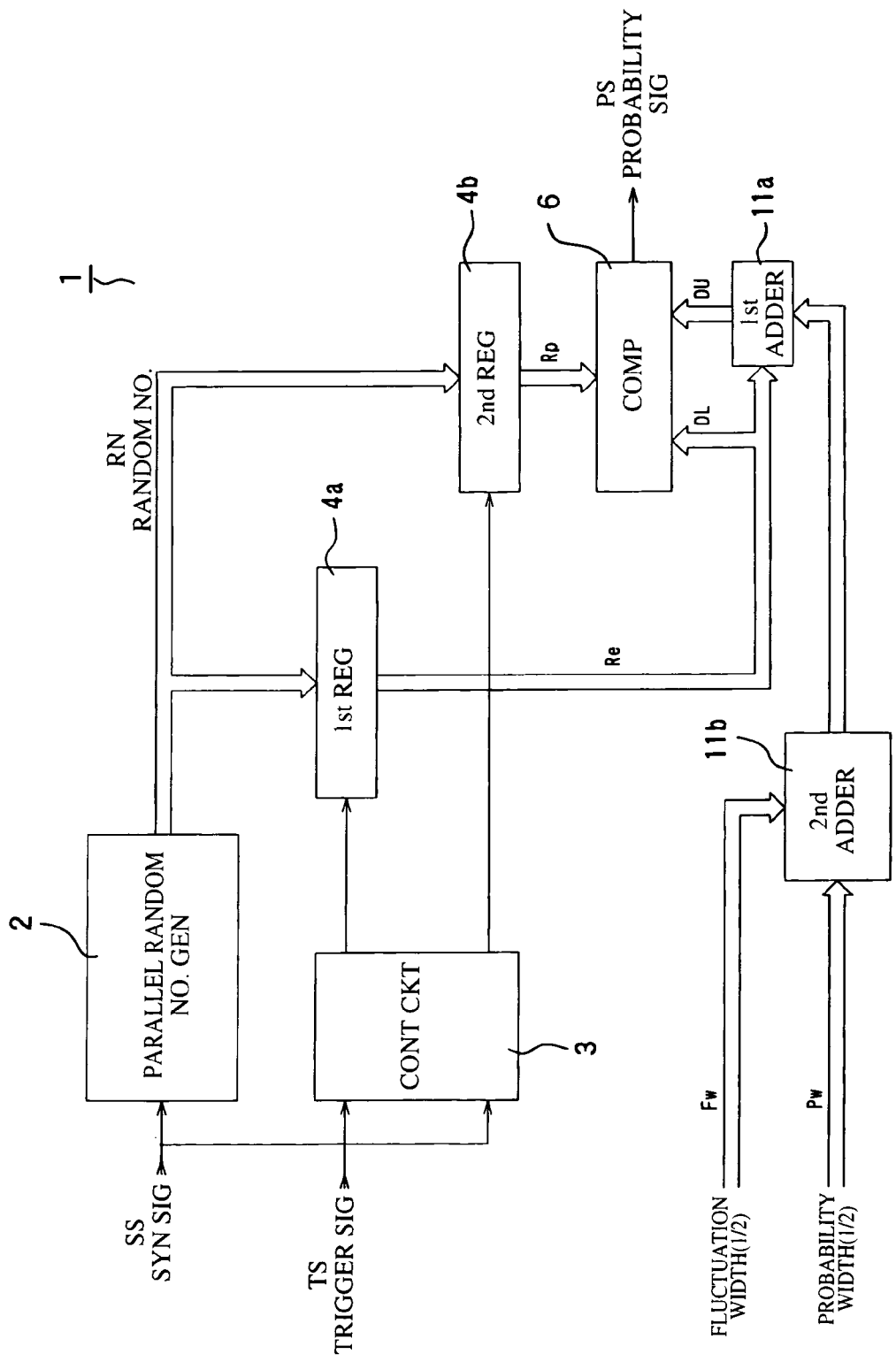
FIG. 66 is a diagram showing the configuration of the probability generating apparatus according to the sixth embodiment of the present invention, the configuration being different from that shown in FIG. 64.
Figure 67:
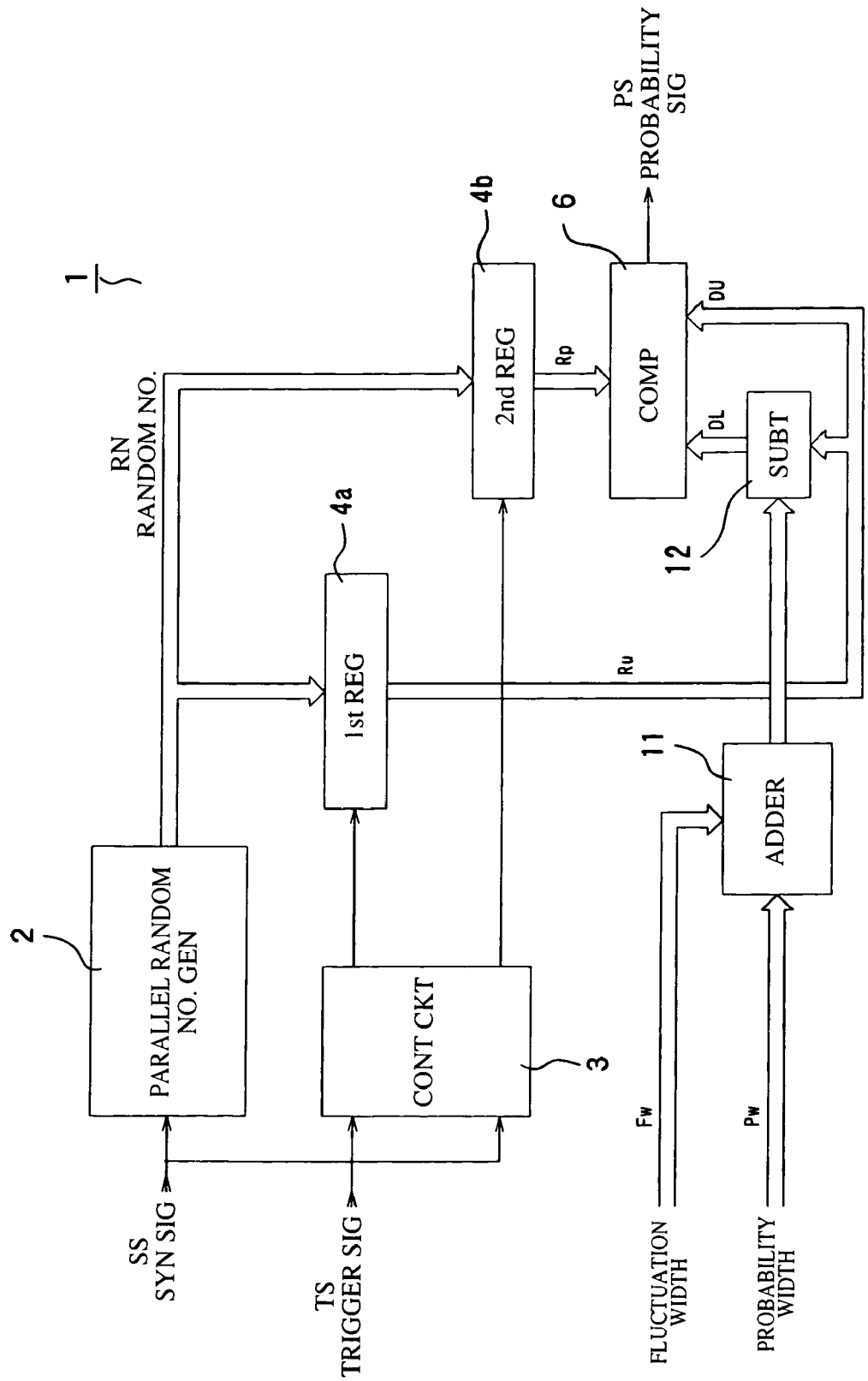
FIG. 67 is a diagram showing the configuration of the probability generating apparatus according to the sixth embodiment of the present invention, the configuration being different from that shown in FIG. 66.

Specifically, in FIG. 66, the probability lower limit value Re (i.e. the probability lower limit data DL) is set as the random number set in the first register 4a using a timing determined using the trigger signal TS as a start point. The second adder 11b adds the predetermined fluctuation width Fw to the predetermined probability width Pw. The first adder 11a then adds the value obtained by the addition to the probability lower limit value Re to obtain the probability upper limit data DU. In FIG. 67, the value for the probability upper limit value Ru (i.e. the probability upper limit data DU) is set as the random number set in the first register 4a using a timing determined using the trigger signal TS as a start point. The adder 11 adds the predetermined fluctuation width Fw to the predetermined probability width Pw. The subtractor 12 then subtracts the value obtained by the addition from the probability upper limit value Ru to obtain the probability lower limit data DL.

In any of the above arrangements, the probability lower limit data DL or the probability upper limit data DU fluctuates in accordance with a predetermined cycle. Accordingly, a probability increase region and a probability decrease region appear periodically as in the case with the previously described embodiment. This provides the player with a fair probability, and the player has much hope of prizewinning and gets a thrill out of the game.

Figure 68:
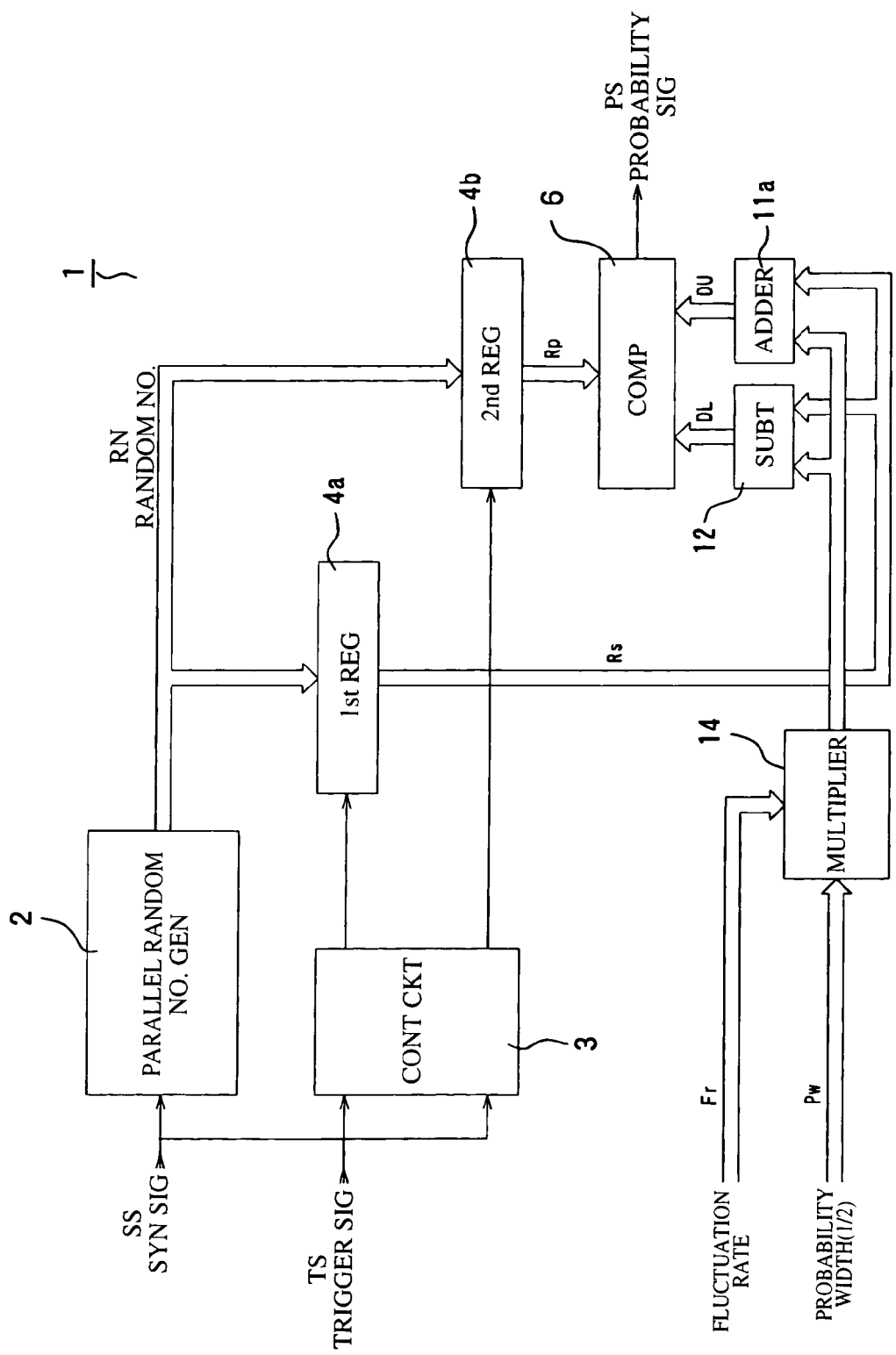
FIG. 68 is a diagram showing the configuration of a probability generating apparatus according to a seventh embodiment of the present invention.

Now, a seventh embodiment of the present invention will be described with reference to FIG. 68.

As shown in the figure, in the present embodiment, the multiplier 14 is added to the probability generating apparatus 1 shown in FIGS. 28 and 49. Then, the predetermined fluctuation rate Fr is used to modulate the probability width Pw. This modulation output is then used as new probability width data.

Specifically, the value for the probability generation position Rs is set as the random number set in the first register 4a using a timing determined using the trigger signal TS as a start point. The multiplier 14 multiplies half the predetermined probability width Pw by a predetermined fluctuation rate Fr. The subtractor 12 then subtracts the value obtained by the multiplication from the value for the probability generation position Rs to obtain the probability lower limit data DL. The adder 11 adds the multiplication value from the multiplier 14 to the value for the probability generation position Rs to obtain the probability upper limit data DU.

Figure 69:
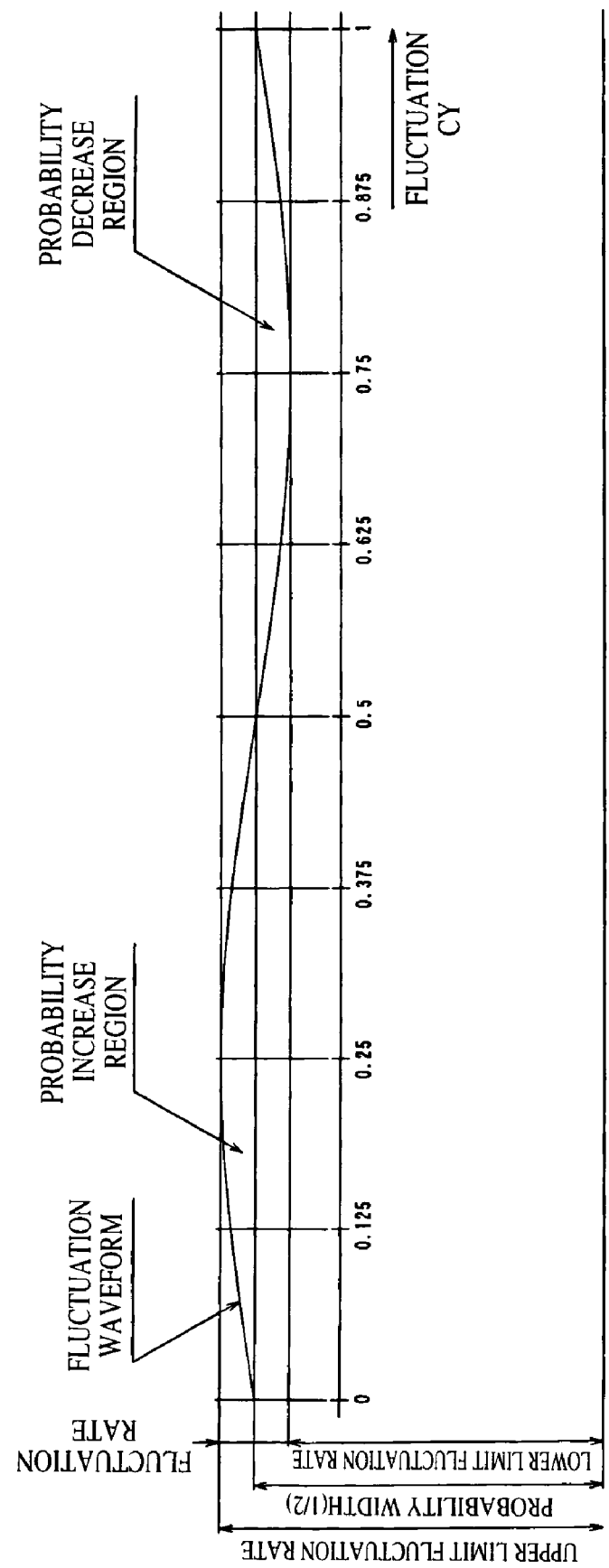
FIG. 69 is a graph showing a probability variation made by the probability generating apparatus according to the seventh embodiment of the present invention.

FIG. 69 shows a variation in probability value based on the probability width Pw and fluctuation rate Fr. In this figure, the fluctuation waveform is a sine wave having a cycle of 1 hour as in the case with the previously described sixth embodiment. Also in this case, the areas of the probability increase region and the probability decrease region are set to be equivalent to each other within one cycle of fluctuation. Consequently, the value obtained by the multiplication is averaged in view of the general probability and equals the probability width Pw. This provides the player with a fair probability, and the player has much hope of prizewinning and gets a thrill out of the game.

The present embodiment is also of course applicable not only to the probability generating apparatus 1 intended for the value for the probability setting position and the probability width but also to the probability generating apparatus 1 intended for the probability lower limit value and the probability width or the probability upper limit value and the probability width. The configuration of this embodiment is the same as that of the probability generating apparatus 1 shown in FIGS. 66 and 67 except that the adder 11 is replaced with a multiplier. Accordingly, the detailed description of the configuration is omitted.

Figure 70:
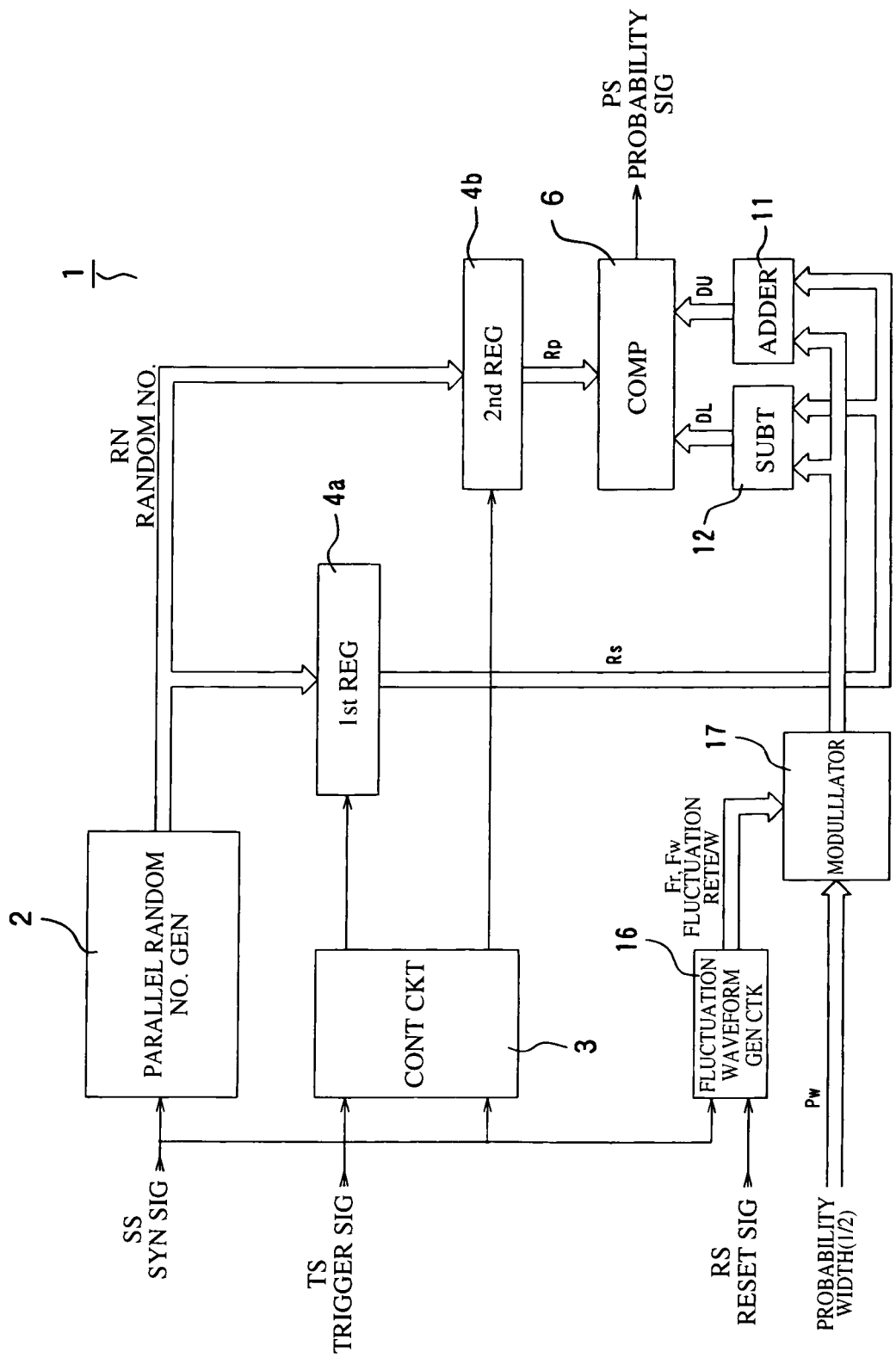
FIG. 70 is a diagram showing the configuration of a probability generating apparatus according to an eighth embodiment of the present invention.
Figure 71:
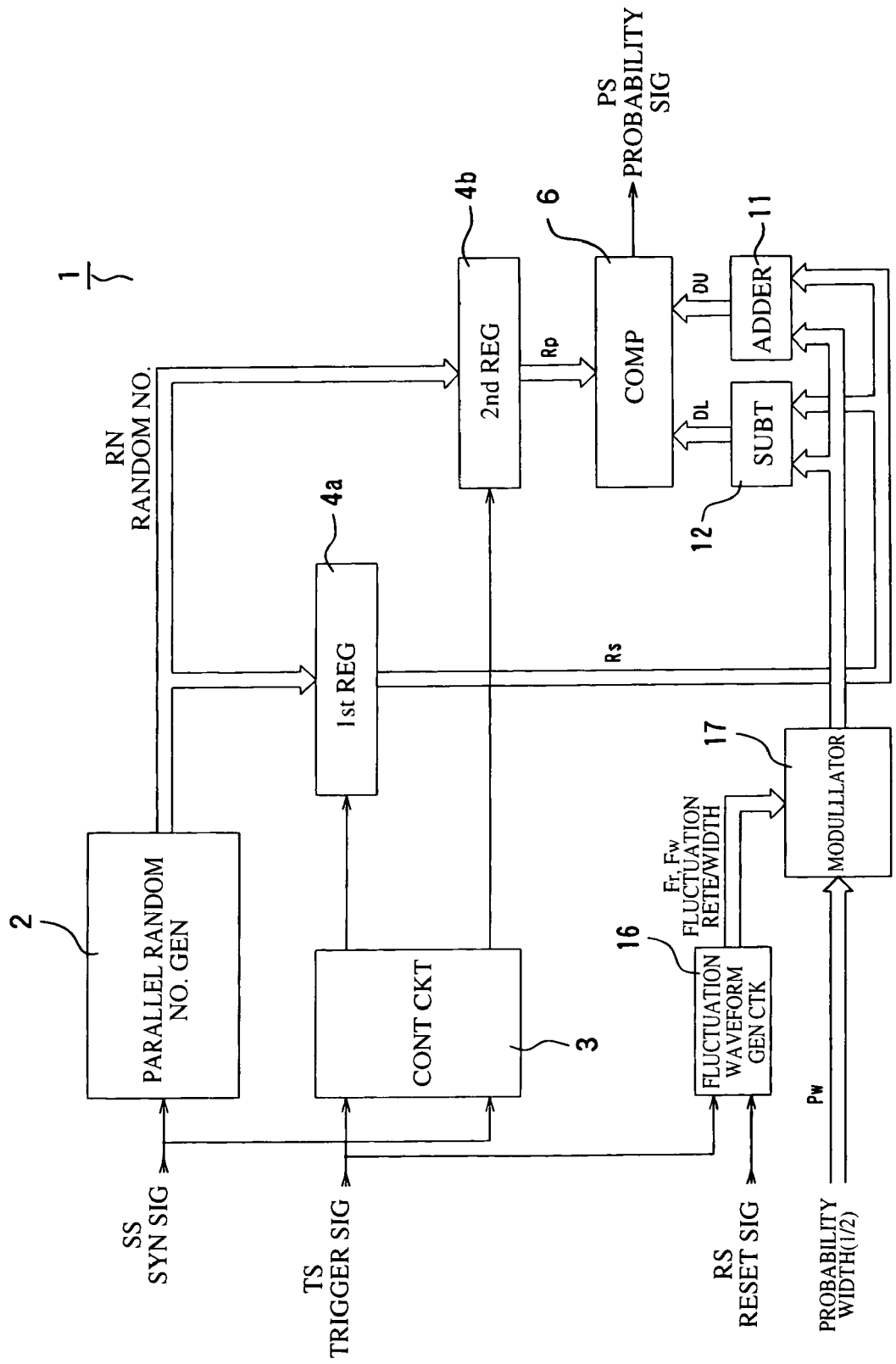
FIG. 71 is a diagram showing the configuration of the probability generating apparatus according to the eighth embodiment of the present invention, the configuration being different from that shown in FIG. 70.

Next, in the eighth embodiment shown in FIGS. 70 and 71, a fluctuation waveform generating circuit 16 that generates a fluctuation waveform (fluctuation width or rate) with a predetermined cycle is added to the probability generating apparatus 1 shown in FIGS. 28 and 49. In the present embodiment, the fluctuation waveform may be, for example, a sine wave or a cosine wave (FIG. 75), a square wave (FIG. 76), a triangular wave (FIG. 77), a saw-tooth-wave (FIG. 78), a trapezoidal wave (FIG. 79), a normal distribution waveform (FIG. 80), a parabolic waveform (FIG. 81), or a cubic root waveform (FIG. 82). Furthermore, although not shown in the drawings, in addition to these fluctuation waveforms, an attenuating or amplifying vibration waveform or the like can be used.

Moreover, an emphasized fluctuation waveform can be generated by modifying the ratio of the heights or widths of the crest and valley in any of these waveforms, the inclination of the crest or valley, or the like (i.e. varying the fluctuation waveform). Also in this case, the areas of the probability increase region and the probability decrease region are set to be equivalent to each other within one cycle of fluctuation. Consequently, the general probability is averaged and equals the probability width.

Although not shown in the drawings, these waveform data are stored in the ROM incorporated into the present circuit, or the results of numerical calculations using the CPU are stored in the built-in RAM. Any of these waveform data is properly read and used as a fluctuation waveform (fluctuation width or rate).

The embodiment shown in FIG. 70 uses, as a reference, the time based on the synchronous signal SS inputted as the basic unit of the time axis of the fluctuation waveform (the synchronous signal is counted to determine the cycle). The embodiment shown in FIG. 71 uses the number of inputted trigger signals TS as a reference (the trigger signal is counted to determine the cycle). The reset signal RS initializes a read of the waveform. Specifically, it resets an address counter for the ROM or RAM and then activates the fluctuation waveform generating circuit.

In the present embodiment, the modulator 17 adds or multiplies an output from the fluctuation waveform generating circuit 16 to or by the probability width Pw to subject the preset probability width Pw to fluctuation modulation. The subsequent operations of the present embodiment are similar to those of the already described seventh and eighth embodiments. It goes without saying that the present embodiment is also applicable not only to the probability generating apparatus 1 intended for the value of the probability setting position and the probability width but also to the probability generating apparatus 1 intended for the probability lower limit value and the probability width or the probability upper limit value and the probability width.

Figure 72:
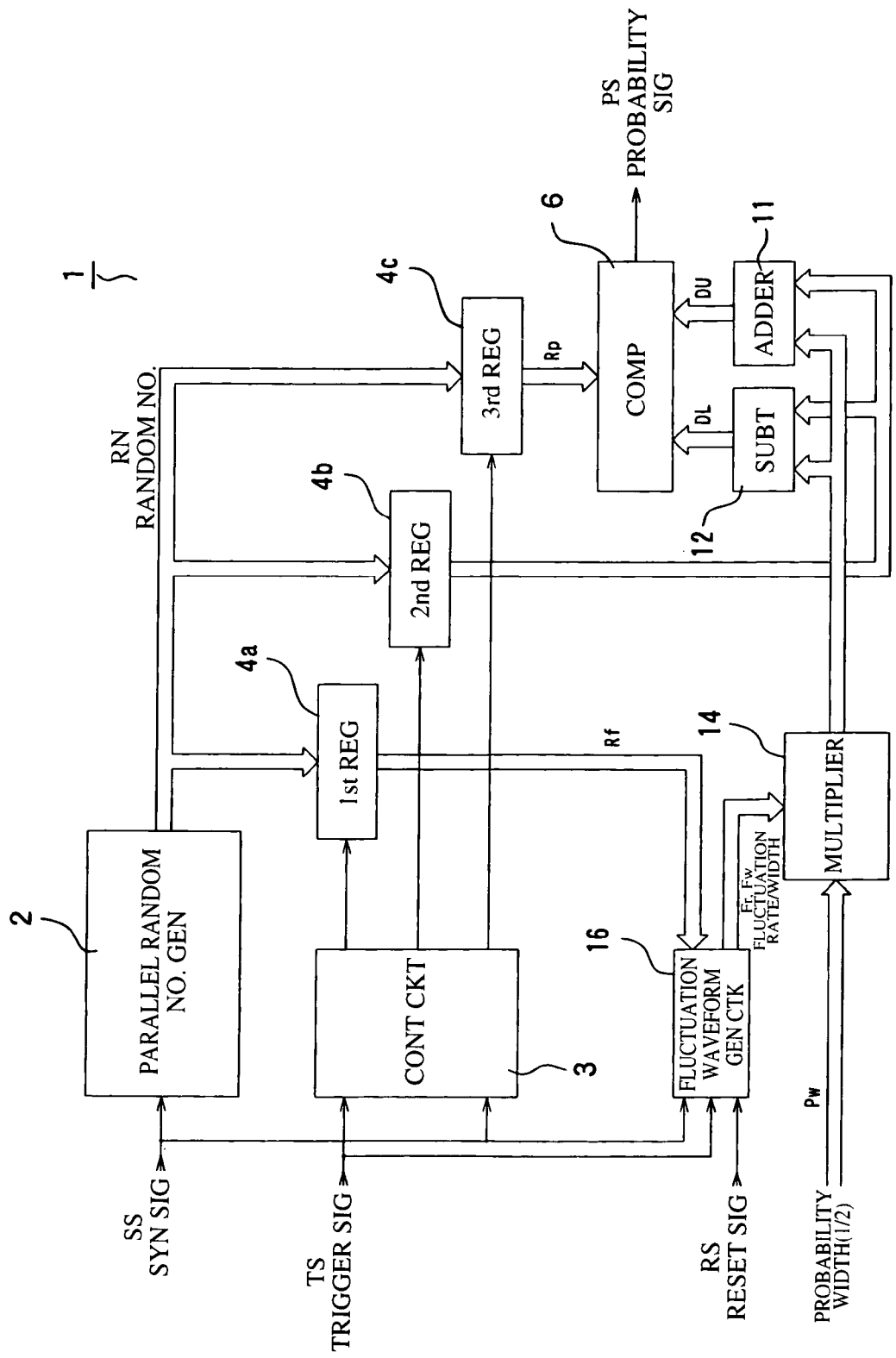
FIG. 72 is a diagram showing the configuration of a probability generating apparatus according to a ninth embodiment of the present invention.

Next, in the ninth embodiment shown in FIG. 72, the first register 4a is added to the probability generating apparatus 1 shown in FIG. 70 or 71. A uniform random number Rf obtained using the trigger signal TS as a start point is inputted to the fluctuation waveform generating circuit 16. The fluctuation waveform generating circuit 16 thus generates a fluctuation width Fw or a fluctuation rate Fr under various fluctuation conditions set on the basis of the contents of the random number Rf for each fluctuation cycle.

In this case, the control circuit 3 in FIG. 72 receives the inputted synchronous signal SS and trigger signal TS to generate a timing for setting the random number Rp for generation of probability, in the third register 4c, a timing for setting the random number Rs for the probability generation position in the second register 4b, and a timing for setting the random number Rf for setting of the fluctuation conditions, in the first register 4a.

Figure 73:
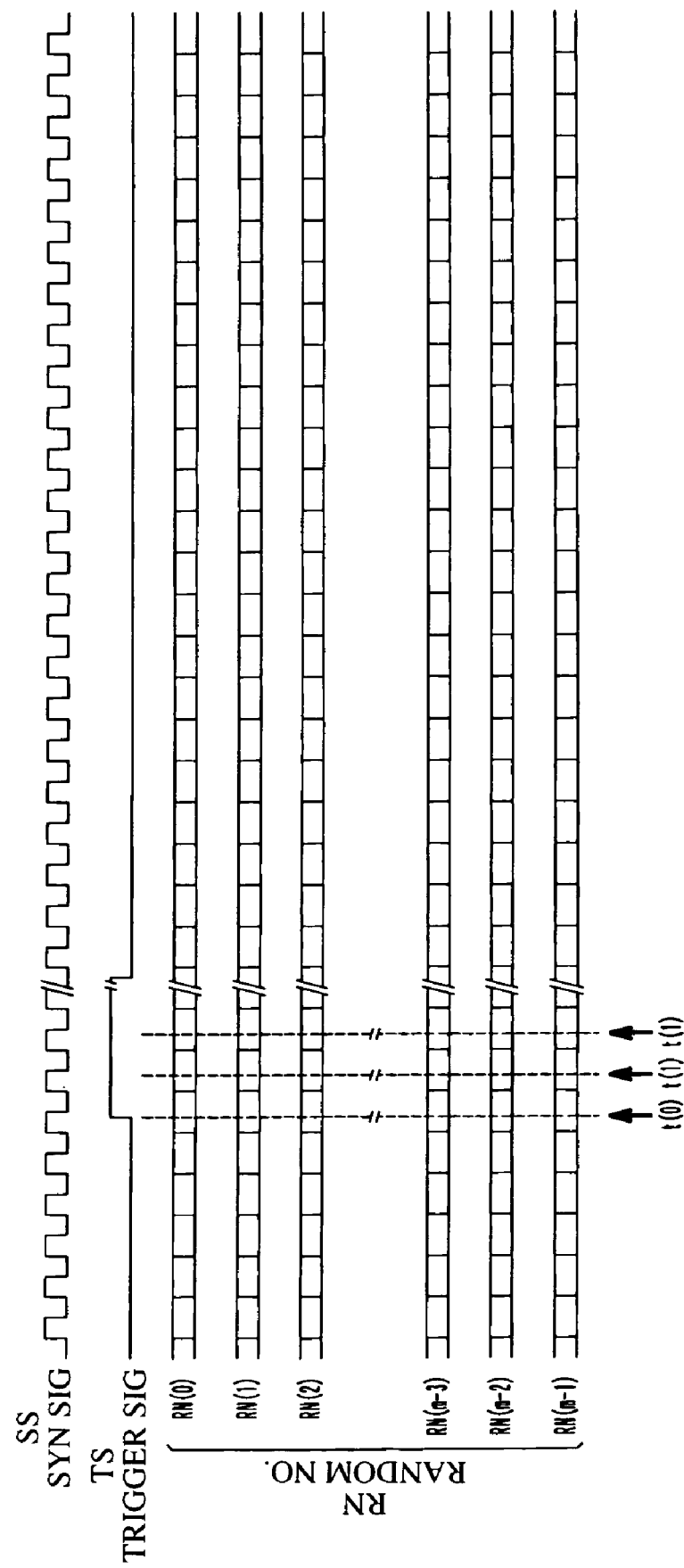
FIG. 73 is a timing waveform diagram of the probability generating apparatus in FIG. 72.

FIG. 73 shows set timing waveforms for the above random numbers RN. The random number Rf (FIG. 72) for setting of the fluctuation conditions is set in the register 4a at the time t(0). The random number Rs for the probability generation position is set in the register 4b at the time t(1). The random number Rp for generation of probability is set in the register 4c at a time t(3).

Now, description will be given below in (1) to (5), of the operation of setting the various fluctuation conditions for the fluctuation waveform generating circuit 16 on the basis of the contents (the state of the bits) of the random number Rf. The random number Rf is assumed to be composed of, for example, 16 bits.

(1) In the present example, the basic unit of the time axis determining the fluctuation cycle is selected to be the time based on the synchronous signal (this corresponds to the case shown in FIG. 70) or the trigger signal (this corresponds to the case in FIG. 71) on the basis of the state of any 1 bit of the random number Rf. For example, if that bit is "0", the synchronous signal SS is used. If the bit is "1", the trigger signal TS is used.

(2) In the present example, the fluctuation cycle is varied by using several bits of the random number Rf other than the 1 bit used in (1) to multiply the time based on the synchronous signal or the number of trigger signals as the basic unit of the fluctuation time axis, by a predetermined factor in accordance with these several bits. In FIGS. 65 and 69, the fluctuation cycle is 1H. However, the present invention is not limited to this aspect. A preferred fluctuation cycle can be set on the basis of the frequency with which the player has visited the shop, the time for which the player plays the game, the type of the game machine, statistical data such as a variation in the number of balls obtained by the player, and the like.

Figure 74:
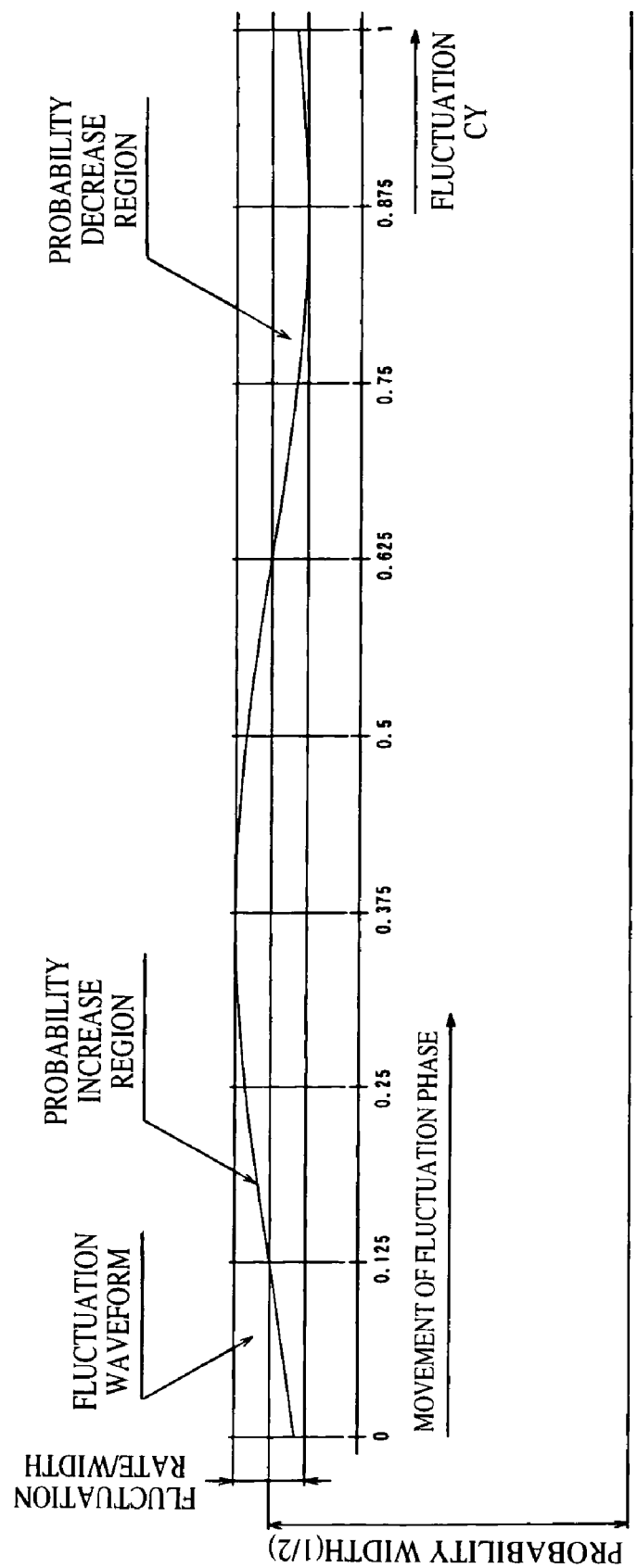
FIG. 74 is a graph showing a probability variation made by the probability generating apparatus according to the ninth embodiment of the present invention.
Figure 75:
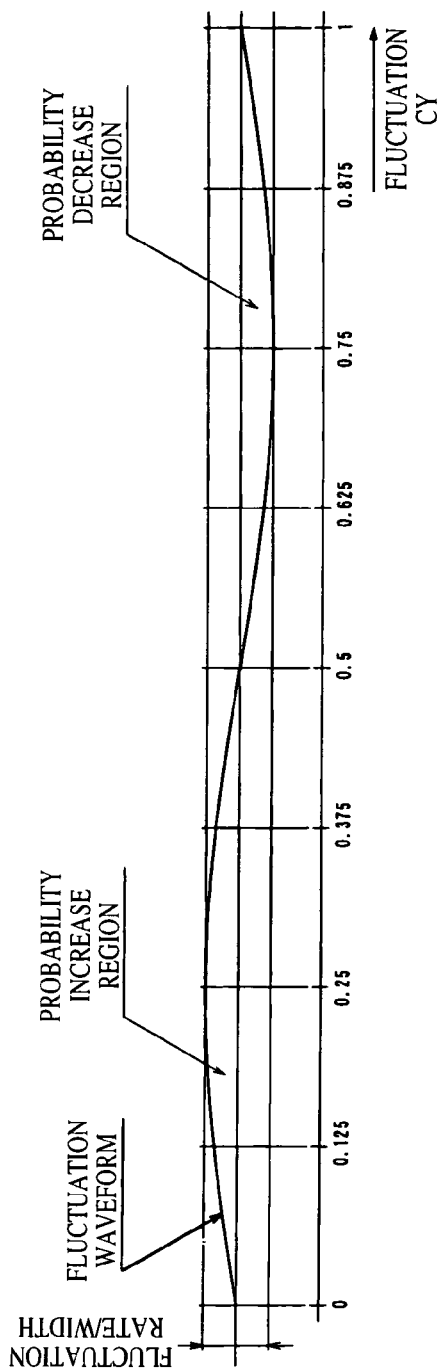
FIG. 75 is a graph showing a fluctuation waveform of a sine wave.
Figure 76:
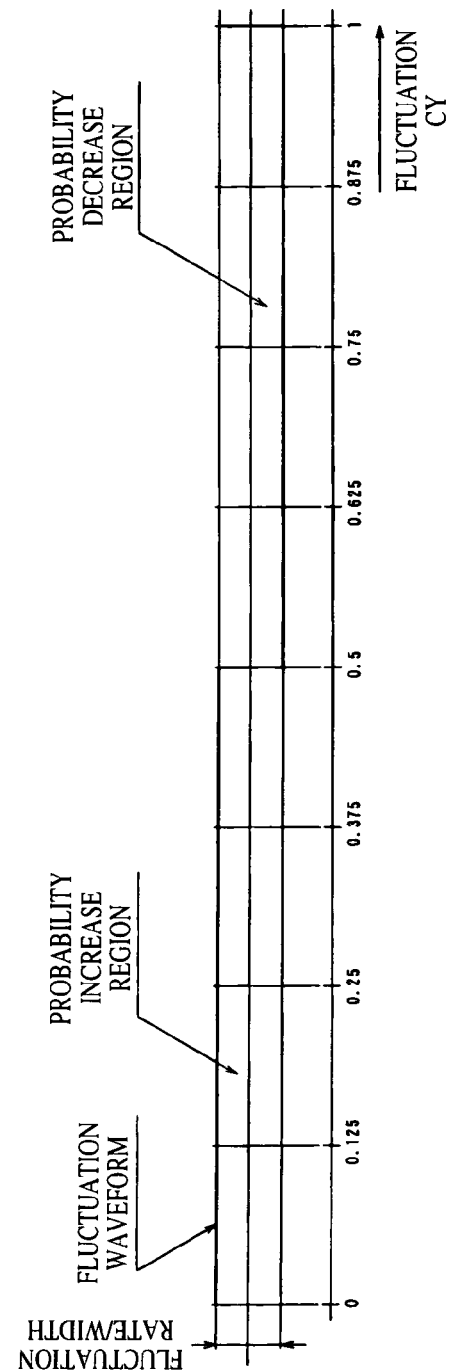
FIG. 76 is a graph showing a fluctuation waveform of a square wave.
Figure 77:
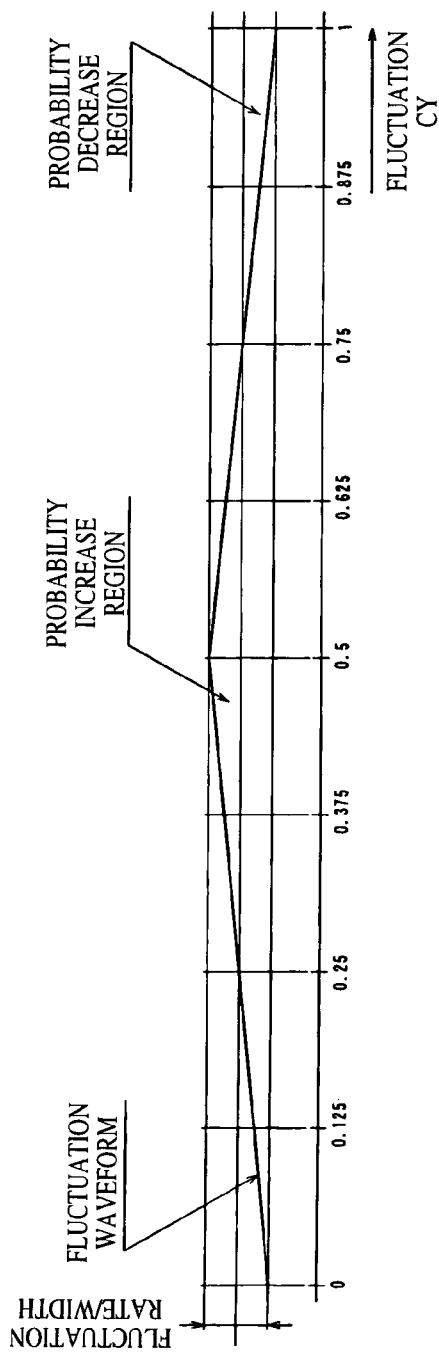
FIG. 77 is a graph showing a fluctuation waveform of a triangular wave.
Figure 78:
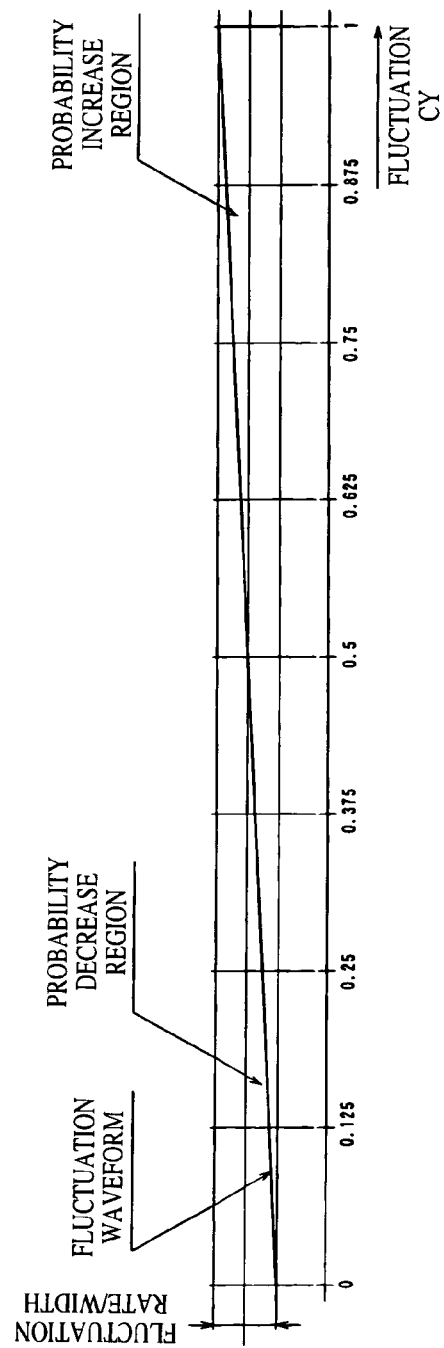
FIG. 78 is a graph showing a fluctuation waveform of a saw-tooth-wave.
Figure 79:
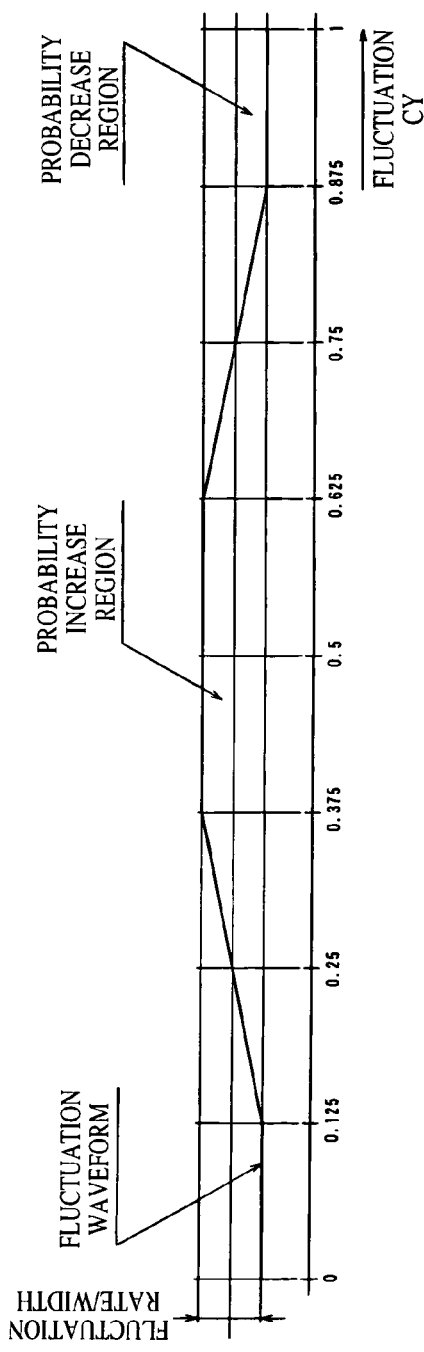
FIG. 79 is a graph showing a fluctuation waveform of a trapezoidal wave.
Figure 80:
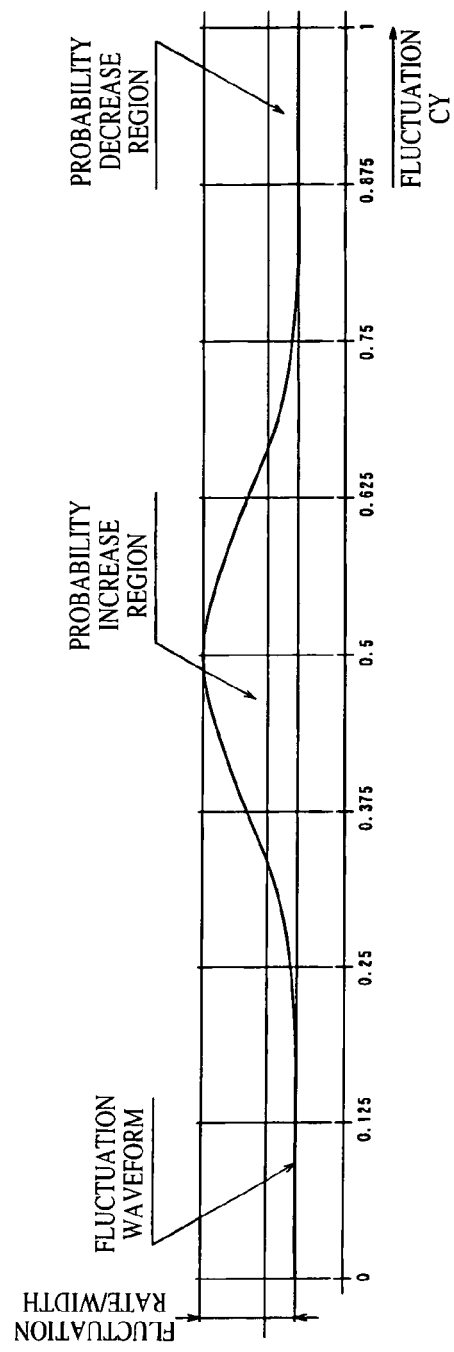
FIG. 80 is a graph showing a fluctuation waveform of a normal distribution waveform.
Figure 81:
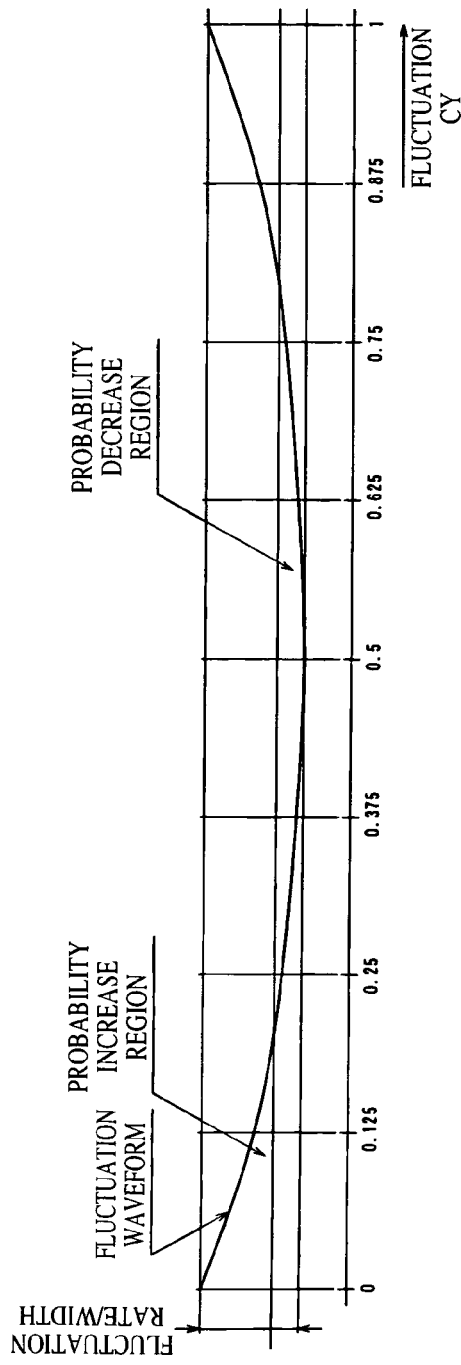
FIG. 81 is a graph showing a fluctuation waveform of a parabolic waveform.

(3) In the present example, the amount of phase shift of the fluctuation waveform is determined using several bits of the random number Rf other than the bits used in (1) and (2). For example, the sine waveform shown in FIG. 74 is obtained in accordance with the state of these several bits by delaying the phase of the sine wave shown in FIG. 75, a predetermined amount (0.125H).

(4) In the present example, the fluctuation waveform is changed using several bits of the random number Rf other than the bits used in (1) to (3). Specifically, any of the waveforms shown in FIGS. 75 to 82, already described, and vibration waveforms (not shown) is selected in accordance with the state of these several bits. Data on any of the various waveforms is read from the previously described ROM or RAM.

(5) In the present example, the polarity of the fluctuation waveform is determined using 1 bit of the random number Rf other than the bits used in (1) to (4) (for example, if that bit is "0", all the waveform data is inverted, and if it is "1", the waveform data is not inverted).

For example, when inverted, the previously described sawtooth-wave, cubic root wave, and others each have a fluctuation waveform having a rapid rise and a smooth fall. The player thus gets more of a thrill out of the game and has more hope of prizewinning.

The above described various fluctuation conditions in (1) to (5) are set on the basis of the random number Rf obtained using the trigger signal as a start point after resetting. Then, one cycle of a totally unpredicted fluctuating operation is finished. Totally unpredicted fluctuation conditions are then set on the basis of the random number Rf obtained using the next trigger signal as a start point. Then, one cycle of a new fluctuating operation is performed. Subsequently, a similar process is repeated.

Next, in the tenth embodiment shown in FIG. 83, the probability generating apparatus 1 shown in FIG. 72 is provided with fluctuation waveform generating circuits arranged in parallel and having the same functions. The first fluctuation waveform generating circuit 16a and the second fluctuation waveform generating circuit 16b have a parallel configuration and randomly generate fluctuation waveforms (i.e. fluctuation widths and rates). The synthesizer 18 synthesizes (for example, adds) these fluctuation waveforms to generate a totally unpredicted fluctuation waveform. If the probability increase region and probability decrease region in each fluctuation waveform generating circuit are equivalent to each other within one cycle of fluctuation, they are also equivalent to each other in the synthesized fluctuation waveform. Consequently, the probability is generally averaged and equals the probability width.

The present embodiment comprises the two fluctuation waveform generating circuits. However, of course, the present invention is not limited to such a 2-circuit configuration. Furthermore, the random number Rf inputted to each fluctuation waveform generating circuit is generated at the same point in time. However, another new register may be added to input different random numbers to the respective fluctuation waveform generating circuits.

The trigger signal TS is used as a start point to obtain the random number for generation of range data such as the value for the probability generation position Rs, probability lower limit value Rl, or probability upper limit value Ru which is used in the above embodiments. However, to enhance unexpectedness., the random numbers may be generated. using such methods as those shown below in 1) to 4). Also in this case, each random number is composed of, for example, 16 bits.

Figure 84:
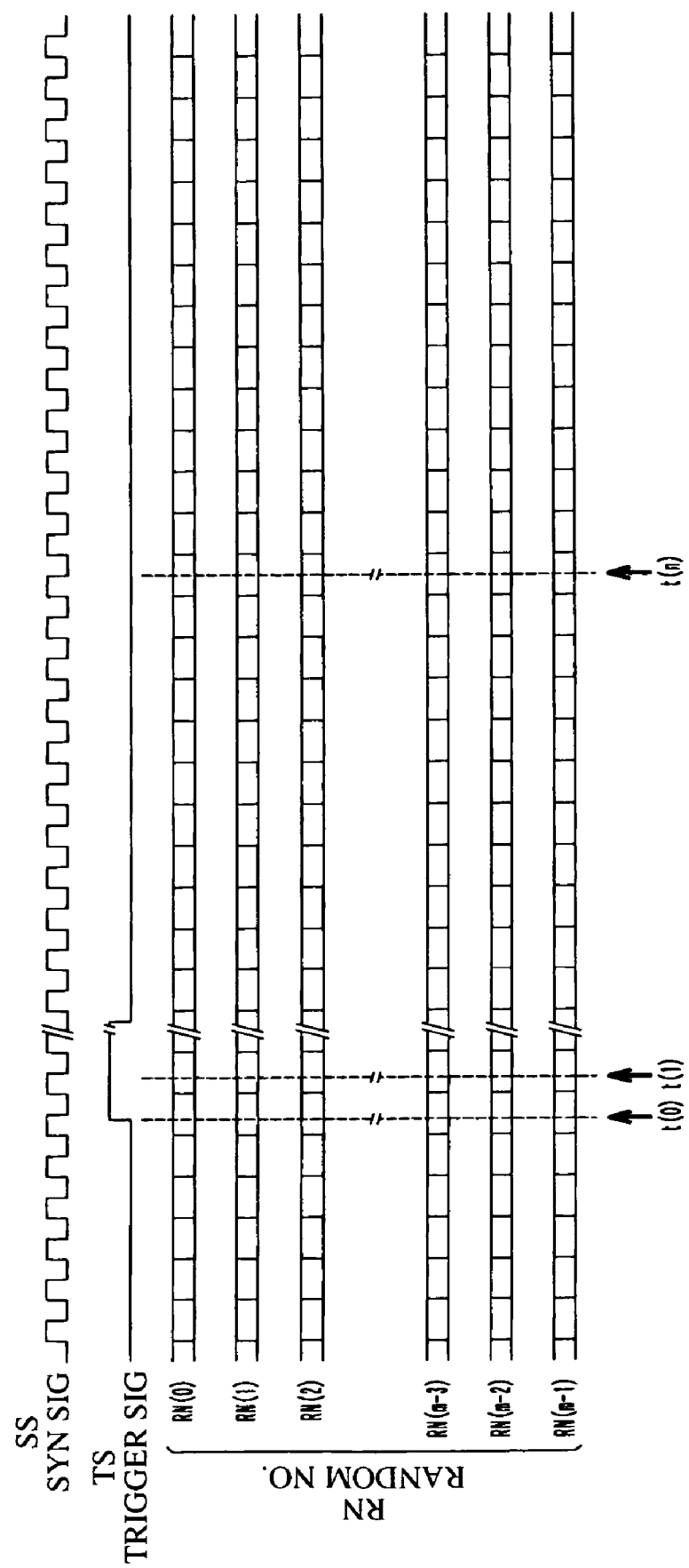
FIG. 84 is a diagram showing timings for generation of random numbers for generation of range data.

1) A method of obtaining data for generation of range data, comprising using data (n) generated using, for example, the lower 8 bits of the random number corresponding to the time t(0) when the trigger signal is generated or the random number corresponding to the timing t(1) obtained by adding an offset value to the trigger signal, to set the n-th random number from the one at the time t(0) or t(1) which number corresponds to the time t(n), thus obtaining random number data set as a random number for generation of range data, as shown in FIG. 84.

Figure 85:
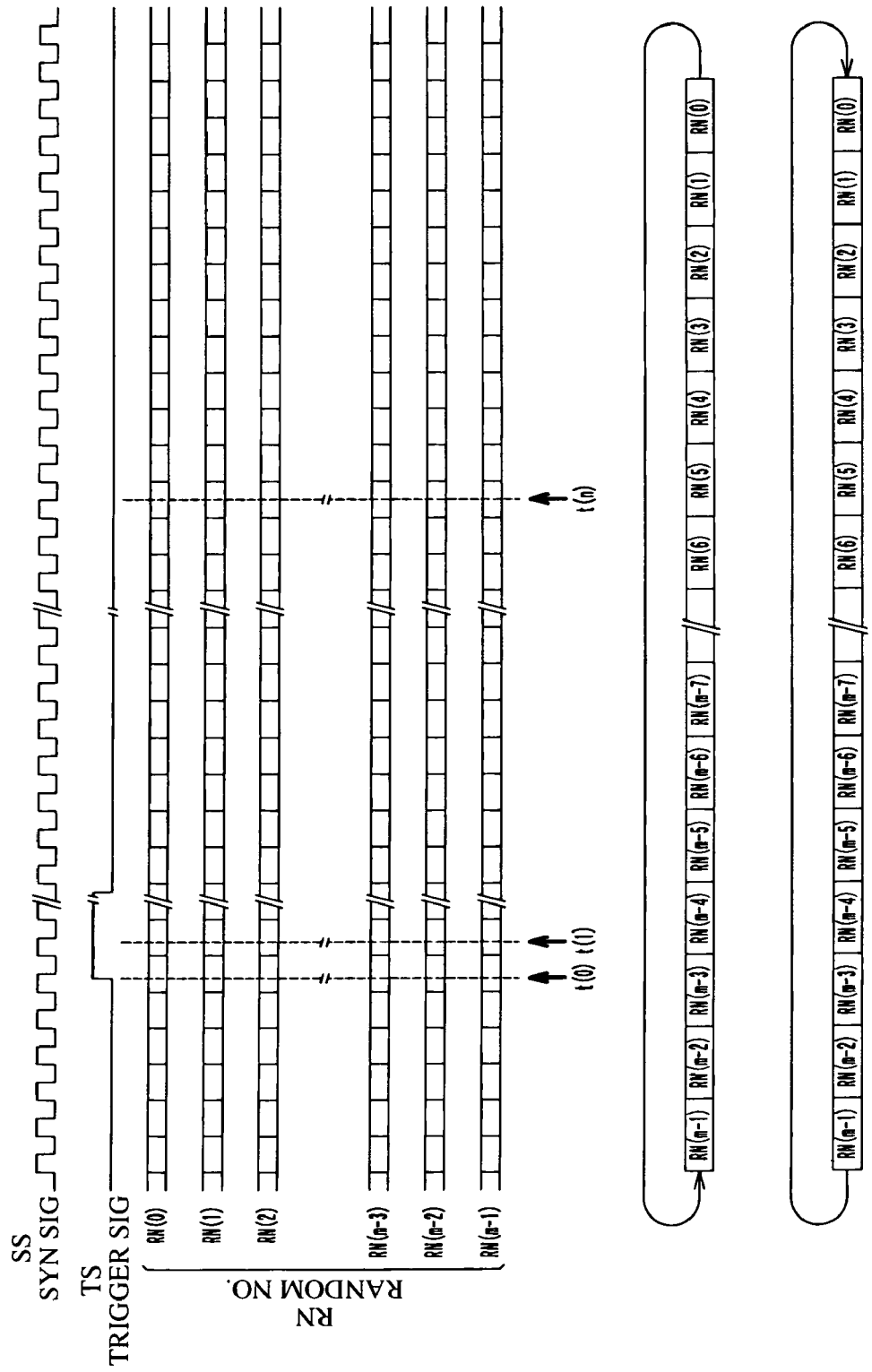
FIG. 85 is a diagram showing generation timings different from those shown in FIG. 84 for the random numbers for generation of range data.

2) A method of obtaining data for generation of range data, comprising using the data (n) generated using, for example, the lower 8 bits of the random number corresponding to the time t(0) when the trigger signal is generated or the random number corresponding to the timing t(1) obtained by adding the offset value to the trigger signal as well as data (k) generated using, for example, the upper 5 bits of the same random number, to rotate the n-th random number from the one at the time t(0) or t(1) which number corresponds to the time t(n), using a rotating direction and a rotation length set on the basis of the data (k), thus obtaining random number data set as a random number for generation of range data, as shown in FIG. 85.

Although not shown, the shift register is used to rotate the data. For example, the right shift/left shift operation of the shift register is set depending on the state of the most or least significant bit of the data k, i.e. whether the bit is "1" or "0". The shift number is set on the basis of the number of remaining bits in the data k. Uniform random numbers remain uniform even after the data has thus been rotated.

Figure 86:
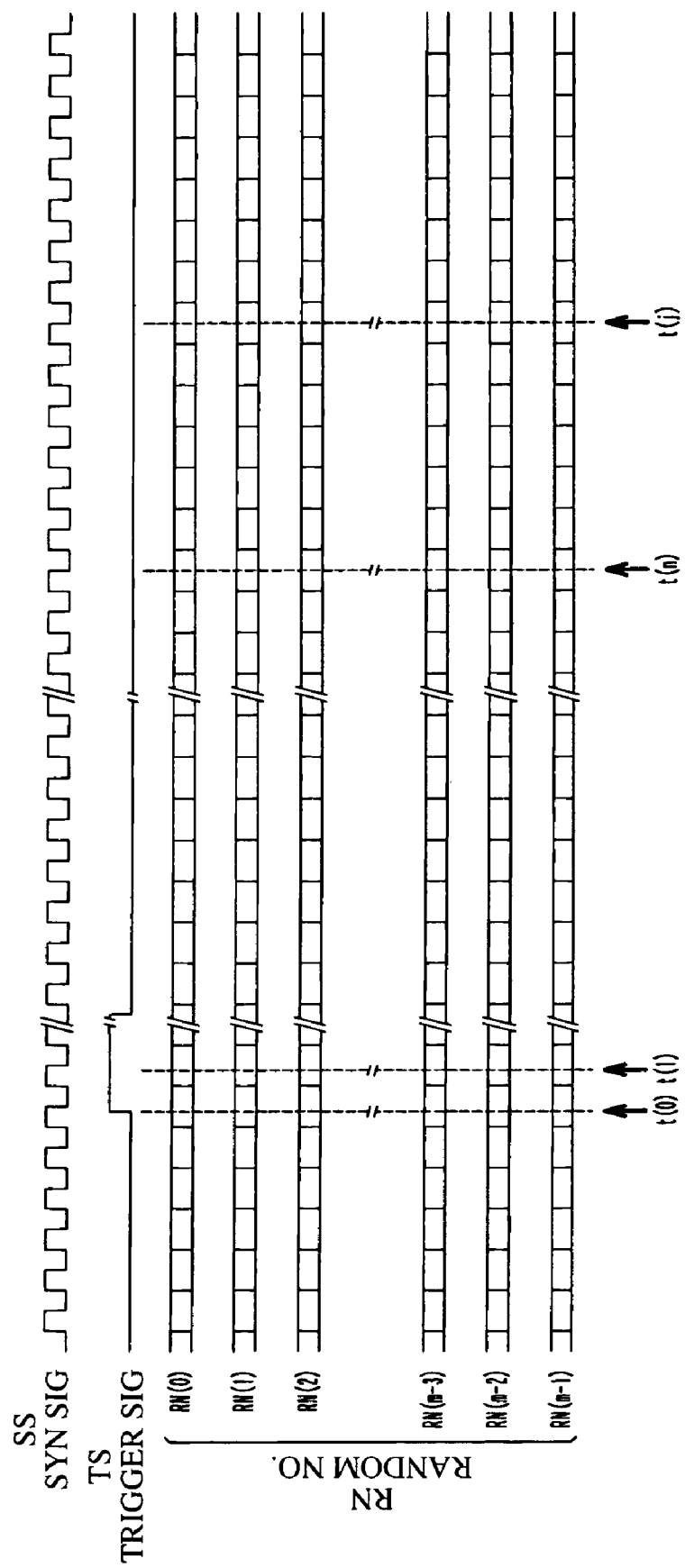
FIG. 86 is a diagram showing generation timings different from those shown in FIG. 85 for the random numbers for generation of range data.

3) A method of obtaining data for generation of range data, comprising using the data (n) generated using, for example, the lower 8 bits of the random number corresponding to the time t(0) when the trigger signal is generated or the random number corresponding to the timing t(1) obtained by adding the offset value to the trigger signal, as well as data (j) generated using, for example, the upper 8 bits of the same random number, to scramble the n-th and j-th random numbers from the one at the time t(0) or t(1) which numbers correspond to the times t(n) and t(j), thus obtaining random number data set as a random number for generation of range data, as shown in FIG. 86.

The phrase "scrambling data" as used herein means that arbitrary ones of a plurality of data lines are subjected to a logical calculation (e.g. an exclusive OR or an exclusive OR of two other exclusive ORs) and thus converted into data different from original data. Thus, although not shown, scrambling data requires a register that sets a random number at the time t(n), another register that sets a random number at the time t(j), an exclusive OR circuit for these set data, and the like. Uniform random numbers remain uniform even after the data has been scrambled.

Figure 87:
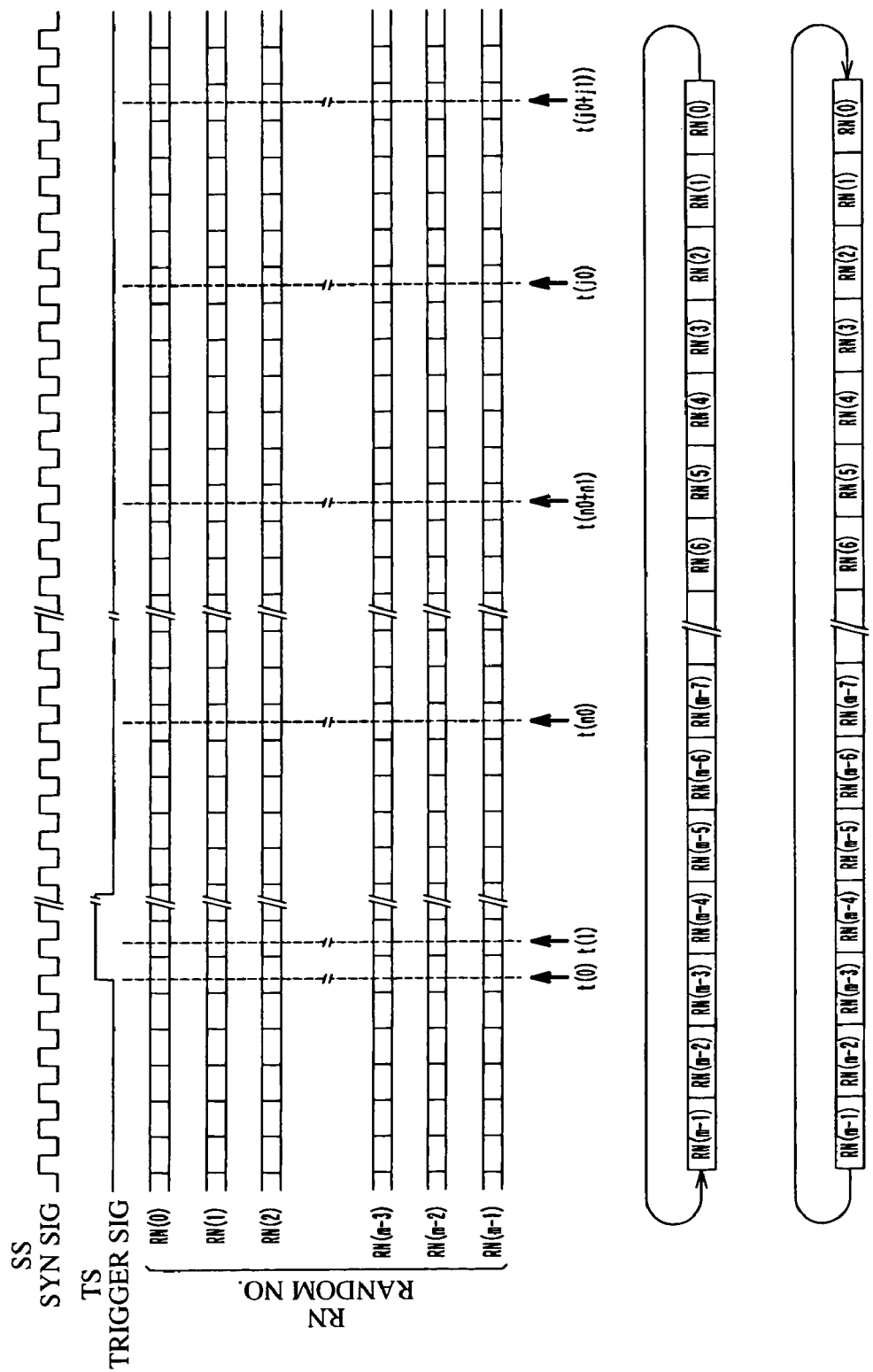
FIG. 87 is a diagram showing generation timings different from those shown in FIG. 86 for the random numbers for generation of range data.

4) A method of obtaining data for generation of range data, comprising using data (n0) generated using, for example, the lower 8 bits of the random number corresponding to the time t(0) when the trigger signal is generated or the random number corresponding to the timing t(1) obtained by adding the offset value to the trigger signal as well as data (j0) generated using, for example, the upper 8 bits of the same random number, and using data (n1, j1) generated using, for example, the lower 8 bits of each of the n0-th and j0-th random numbers from the one at the time t(0) or t(1) which numbers correspond to the time t(n0) and t(j0), respectively, as well as data (n1, j1) generated using, for example, the upper 5 bits of each the same random numbers, to rotate the (n0+n1)-th and (j0+j1)-th random numbers from the one at the time t(0) or t(1) which numbers correspond to the time t(n0+n1) and t(j0+j1), respectively, using a rotating direction and a rotation length set on the basis of the data (n2, j2), and then scrambling the rotated random number data, thus obtaining random number data as a random number for generation of range data as shown in FIG. 87.

With this method, the arbitrary timing is used to sequentially vary the position where the range data is set, within the probability setting range. Correspondingly, win data varies which is contained in the random number data for generation of probability which data provides a specified probability. This variation, in combination with the already described fluctuating operation, enhances unexpectedness, and the player thus has more hope of prizewinning and gets more of a thrill out of the game.

As described above, according to the present invention, the range data to be compared with the data for generation of probability in generating probability fluctuates in accordance with the predetermined cycle. Accordingly, the probability value obtained varies in accordance with the predetermined fluctuation cycle (for example, in game machines or the like, the period in which more prizewinning occurs and the period in which less prizewinning occurs appear periodically). Therefore, the player has more hope of prizewinning and gets more of a thrill out of the game.

Furthermore, according to the present invention, the fluctuation width or fluctuation rate, the fluctuation cycle, the fluctuation waveform, or the like is varied sequentially. Accordingly, a totally unpredicted fluctuating operation for a win or loss is preformed. Therefore, the player has more hope of prizewinning and gets more of a thrill out of the game.

The invention claimed is:

1. A probability generating apparatus (1) comprising:
   a parallel random number generator (2) configured and dimensioned for offering uniformity of random numbers (RN), the parallel random number generator (2) generating random numbers in synchronization with a synchronous signal (SS), each of the random numbers generated being composed of consecutive n bits RN (0) to RN (n-1);
   a register (4) having a first register portion (4*a*) and a second register portion (4*b*);
   a counter (7);
   a shift register (5);
   a control circuit (3) configured and dimensioned for utilizing predetermined bits of set data (k) in register (4) to determine direction and speed of rotation of data and for utilizing timing t(n) to control shift direction and number of random number data set in the shift register (5); and
   a comparator (6) having a first comparator portion (6*a*) and a second comparator portion (6*b*);
   the first comparator portion (6*a*) configured and dimensioned to compare a set data value (n) in the first register portion (4*a*) with a count in the counter (7), in which matching comparison output operates as a trigger signal (TS) to set a random number for generation of probability in the second register portion (4*b*), thereby generating data for generation of probability, the second comparator portion (6*b*) configured and dimensioned to compare the data for generation of probability with range data, the range data including probability lower limit data (DL) and probability upper limit data (DU), in which comparison output obtained is a probability signal (PS), whereby data for generation of probability is the random number (RN) at a time t(n) after t(0) the trigger signal is generated, the data varying every time the trigger signal (TS) is generated and is indeterminate.

2. The probability generating apparatus according to claim 1, in which the apparatus is configured and dimensioned to generate data for generation of probability by inverting or non-inverting data in accordance with the random number obtained using the trigger signal (TS) as a start point.

3. The probability generating apparatus according to claim 1, in which the apparatus is configured and dimensioned to obtain the random number data by utilizing data (x) generated on a basis of the random number obtained using the trigger signal (TS) as a start point to set an (x)-th random number from this random number as the random number data and to output the random number data together with the probability signal (PS).

4. The probability generating apparatus according to claim 1, in which the apparatus is configured and dimensioned to time generation of the trigger signal (TS), wherein timing for generation the trigger signal (TS) is obtained by adding a preset variable offset value to a timing for generating said trigger signal (TS).

5. The probability generating apparatus according to claim 1, wherein the parallel random generator (2) includes a 1-bit serial random number generator and a register circuit configured and dimensioned to retain predetermined bit lengths of serial random numbers generated and to output the serial random numbers in parallel.

* * * * *